(12) United States Patent
Bandou et al.

(10) Patent No.: US 8,493,927 B2
(45) Date of Patent: Jul. 23, 2013

(54) CONTROL APPARATUS, CONTROL METHOD AND CONTROL PROGRAM

(75) Inventors: Akira Bandou, Hitachi (JP); Masamitsu Kobayashi, Hitachi (JP); Masahiro Shiraishi, Hitachi (JP); Akihiro Onozuka, Hitachi (JP); Takashi Umehara, Hitachi (JP); Shin Kokura, Hitachi (JP); Eiji Kobayashi, Hitachinaka (JP); Masakazu Ishikawa, Hitachi (JP); Yasuyuki Furuta, Naka (JP); Naoya Mashiko, Hitachiota (JP); Satoru Funaki, Hitachi (JP); Yuusuke Seki, Hitachi (JP); Tatsuyuki Ootani, Hitachi (JP); Wataru Sasaki, Hitachiota (JP); Yusaku Otsuka, Hitachiota (JP); Akihiro Nakano, Iwaki (JP); Shoichi Ozawa, Hitachi (JP); Takēnori Kasahara, Naka (JP); Yu Iwasaki, Hitachi (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 1763 days.

(21) Appl. No.: 11/769,862

(22) Filed: Jun. 28, 2007

(65) Prior Publication Data

US 2008/0013475 A1 Jan. 17, 2008

(30) Foreign Application Priority Data

Jun. 30, 2006 (JP) ................................. 2006-180645
Jun. 30, 2006 (JP) ................................. 2006-180650

(51) Int. Cl.
*H04B 7/212* (2006.01)

(52) U.S. Cl.
USPC ........................................... 370/331; 370/324

(58) Field of Classification Search
USPC .............. 455/423–425; 702/57–65, 182–186; 340/3.1–3.9
See application file for complete search history.

(56) References Cited

U.S. PATENT DOCUMENTS

| 4,622,551 | A | * | 11/1986 | Kupersmith et al. | ......... 340/3.21 |
| 7,721,172 | B2 | * | 5/2010 | Wang et al. | .................... 714/729 |
| 2006/0106578 | A1 | * | 5/2006 | Yamada et al. | ............... 702/183 |

FOREIGN PATENT DOCUMENTS

| JP | 05-257852 | 10/1993 |
| JP | 6290066 | 10/1994 |
| JP | 08-016213 | 1/1996 |
| JP | 2003-106840 | 4/2003 |
| JP | 2004-295604 | 10/2004 |
| JP | 2004356955 | 12/2004 |
| JP | 2006-091961 | 4/2006 |
| JP | 2006-139634 | 6/2006 |

* cited by examiner

*Primary Examiner* — Kashif Siddiqui
(74) *Attorney, Agent, or Firm* — Antonelli, Terry, Stout & Kraus, LLP.

(57) ABSTRACT

In a control apparatus which transmits/receives data from a central processing unit via a serial transfer channel to a communication control unit, and groups/distributes data of input/output units from the communication control unit via a parallel transfer channel, the control apparatus initiates a diagnosing unit of the parallel transfer channel in response to an instruction issued from the central processing unit, and diagnosis the input/output units subsequent to the diagnosis of the transmission channel. Data input/output timing of the input/output unit is also instructed from the central processing unit, so that the central processing unit can suppress lowering of response speeds caused by the diagnoses, and can maintain the periodicity of the data input/output.

5 Claims, 34 Drawing Sheets

CONTROL APPARATUS, CONTROL METHOD AND CONTROL PROGRAM

BACKGROUND OF THE INVENTION

The present invention generally relates to a control apparatus, a control method, and a control program. More specifically, the present invention is directed to a control apparatus, a control method, and a control program, which are suitably operable for functional safety.

Very recently, there are many demands capable of realizing such programmable electronic apparatuses capable of securing safety aspects as to human life and environments. In contract to "intrinsic safety", such a safety established under an initial condition of normal operation of an apparatus is referred to as "functional safety." There is no question that enlargements capable of applying the so-called "functional safety" may depend upon considerable improvements in performance and reliability of electronic appliances.

Effects achieved by applying programmable electronic apparatuses are caused not only by such a fact that protection logic equipments constructed of conventional mechanical relays can be realized by compact apparatuses with lighter weight and higher reliability than that of the protection logic equipments, but also by other means. In conventional maintenance checkup systems, operations of plant apparatuses which constitute protection subjects are stopped in a periodic manner so as to check up operations of protection logic equipments. In contrast thereto, based upon self-diagnostic functions utilizing features of electronic apparatuses, the protection logic apparatuses can be diagnosed without stopping the plant apparatuses, which may contribute improvements in operation rates of the plant apparatuses, and also may save man power of maintenance works. Such diagnostic techniques have been described in, for instance, JP-A-6-290066.

In view of target characteristics as to safety protections for human life and environments, standards capable of determining levels of objective functional safety may become major important matters. Establishments of standards started in Europe, and then, nowadays, the international standards such as IEC 61508 are being established. In IEC 61508, while factors for impeding "functional safety" are mainly divided into two impedance factors, the standards of IEC 61508 have defined measures and effects of these impedance factors in detail. The first impeding factor corresponds to a random failure which is caused by hardware, whereas the second impeding factor corresponds to a systematic failure which is usually referred to as a "software bug." Thus, the standards of IEC 61508 defines diagnostic methods of random failures (first impeding factor) and diagnostic rates corresponding thereto, and further defines developing processes capable of preventing the systematic failures (second impeding factor).

Since users use such products, the users can secure required safety levels, while these products have been certified by a third institution which has been independently established based upon the international standard. As previously described, the certification of the products based upon the functional safety, and the international standard thereof, and the international standard may have higher contribution degrees.

On the other hand, communication control apparatuses are equipped with input apparatuses for acquiring equipment data about equipment under control, and a plurality of information processing apparatuses for monitoring, or controlling the appliances based upon the acquired equipment data. These communication control unit have been utilized in monitoring/controlling systems for plants. In these communication control apparatuses, events occurred in the equipment under control are stored; occurrence times of these events are measured by time measuring counters; and event occurrence times (time stamps) are added to contents of these events, and then, the resulting event contents are stored as status data. If the communication control units analyze these stored status data, then occurrences of input events of plural signals can be grasped in a time sequential manner. As a result, even when failures happen to occur in equipments, the communication control units can correctly grasp causes of these failures.

JP-A-2004-356955 discloses such a technical idea capable of defining input event times in correspondence with input status data

SUMMARY OF THE INVENTION

Generally speaking, in order to cut off such an infinite loop that random failures of diagnosing apparatuses installed in accordance with functional safety standards also need to be diagnosed, the following technical ideas have been employed. That is, diagnosing apparatuses constructed of software are diagnosed by software programs which have been developed by a predetermined developing process. As a result, in general, such technical ideas have been employed by which microprocessors are installed not only on logic calculation apparatuses, but also on input/output units, so that the microprocessors execute diagnostic programs. To this end, such diagnostic programs must be executed which execute not only diagnostic functions but also diagnose these diagnostic functions in addition to logic calculations and input/output operations (namely, original functions). Furthermore, the input/output units must execute the diagnostic programs. As a consequence, the below-mentioned trends may appear: That is, periodicities about input/outputs and response times of the electronic apparatuses which perform input operations logic calculations, and output operations for a series of signals are readily impeded.

More specifically, such users cannot ignore such a fact that the response times and the periodicities are impeded which constitute the basic functions as the control apparatuses for securing the functional safety, while these users have secured the predetermined control functions and the safety levels by commonly employing one programmable electronic apparatus which is capable of realizing both the control functions and a part of the protection functions, which may reflect progress in recent techniques of electronic apparatuses.

An object of the present invention is to provide a control apparatus and control method capable of functional safety, while are capable of maintaining basic performance such as response time and periodicity.

Also, in the above-described conventional techniques, counters are employed for each set of the plural input modules. As a result, general-purpose input modules cannot be used without significant modification. Further, since the time stamps are defined in correspondence with each set of these input modules, a large amount of data are required. Thus, there is such a problem that the data transfer performance is deteriorated when the data are transferred, in particular, when the data are transferred via the serial communication channels.

An object of the present invention is to provide a control apparatus, a control method, and a control program, which are capable of managing time instant relative information when an event occurs, while are capable of maintaining transfer performance even when data is transferred via a communication channel.

To achieve the above-described object, a control apparatus, according to the present invention, is arranged as follows: That is, in a control apparatus having a communication control unit communicatably connected to the control apparatus via a first communication channel, at least a portion of which performs a serial transfer operation, in which the communication control unit transmits/receives information with respect to an equipment under control via a second communication channel, a portion of which constitutes a parallel transfer operation; the control apparatus comprised of: a communication channel diagnostic unit for diagnosing an abnormal event such as an open and stuck-at of a parallel transfer portion of the second communication channel under such a condition that a data transfer operation in the second communication channel is interrupted; in which a signal for instructing an initiation of a diagnosis via the first communication channel is transmitted to the communication channel diagnostic unit.

Moreover, a basic arrangement of the control apparatus is arranged by employing: an input unit and an output unit; the input unit transmitting/receiving data from a central processing unit via a first communication channel, at lest a portion of which constitutes a serial transfer operation, with respect to a communication control unit, and grouping, or distributing the data from the communication control unit of the transmission/reception destination so as to measure an equipment under control via a second communication channel, at least a portion of which constitutes a parallel transfer operation; and the output unit outputting to the equipment under control via the second communication channel.

In this control apparatus, a parallel transfer operation which is suitable for a high-speed transfer operation compared to a serial transfer operation is employed in an input/output bus between the communication control unit and the input/output units. To secure the functional safety, a diagnosis of this parallel transfer unit is required. In order to perform a diagnosis, the most reliable method is to diagnose a physical open and stuck-at of the parallel transferring unit, although a data transfer operation must be stopped during a diagnosing period. In order to set start timing of the diagnosing period so as not to give an adverse influence to response times and periodicities as the control apparatus, the diagnosing operation for diagnosing the open and stuck-at event of the parallel transferring unit is initiated via the control bus (communication channel 1) from the central processing unit.

Also, in this control apparatus, such a serial transfer operation having a high freedom degree of a transfer distance is employed in the control bus between the central processing unit and the communication control unit. To secure the functional safety, transfer errors and masquerades of this serial transferring unit must be detected. To this end, transmission/reception stations traveled through this serial transfer path must be confirmed and data identifications are required. In order that a series of serial transfer operations does not give adverse influences to the response times and the periodicities as the control apparatus, such an input buffer is provided which temporarily stores the input data from the input unit and outputs the stored data via the input/output buses (communication channel 2). Then, the input data updating operation is stopped from the central processing unit via the control bus and the input bus so as to secure the periodicity of the input bus. In addition, the data is transferred from the input unit via the input/output buses to the communication control unit, and the serial transfer operation corresponding to the functional safety is carried out between the communication control unit and the central processing unit. When the serial transfer operation is accomplished, the data updating operation of the input buffer is restarted from the central processing unit to the communication control unit, so that both the control performance and the functional safety can be established at the same time.

Also, such an output buffer is provided which temporarily stores the output data from the input/output bus (communication channel 2) and outputs the stored data to the output unit. After the data is written from the central processing unit via the control bus and the input/output bus into the output buffer, the data output of the buffer is held; the serial transfer operation corresponding to the functional safety is continued between the communication control unit and the central processing unit; the transmission/reception stations are confirmed; and also, the data identification is carried out. When the serial transfer operation is confirmed to have been performed under normal condition, the data outputting operation of the output buffer is permitted from the central processing unit to the communication control unit so as to secure the periodicity of the output data of the output unit. As a result, the communication control unit is arranged by that both the control performance and the functional safety can be established at the same time.

Also, a communication control unit, according to another aspect of the present invention, is arranged as follows: That is, while information transmitted/received with respect to an equipment under control is stored in an information storage unit, information related to time instant information is stored in a time instant relative information storage unit; the information stored in the information storage unit is transmitted, or the received information is stored in the information storage unit; and information stored in the information storage unit is related to the information held by the time instant relative information storage unit by transmitting/receiving the information via the communication channel, at least a portion of which constitutes a serial transfer operation.

Concretely speaking, the control apparatus having such a basic arrangement is to solve the above-described problem. The basic arrangement consists of a central processing unit, a communication control unit, a first communication channel, at least a portion of which performs serial transfer operation, a second communication channel, at least a portion of which performs parallel transfer operation, an input unit and an output unit, where the first communication channel transmits and receives data between the central processing unit and the communication control unit, where the second communication channel collects and distributes data between the communication control unit, the input unit and the output unit, where input unit performs measurement of (data input from) the equipment under control and where the output unit performs data output to the equipment under control. A time measuring counter is provided not in either the input unit or the output unit, but is mounted on the communication control unit, which is the transmission/reception destination from the central processor unit. Furthermore, an input buffer for temporarily storing the input data, and a time measuring buffer for temporarily storing the count value of the time measuring counter are provided, and then, the data updating operations of these buffers are permitted at the same time.

Also, a control apparatus is arranged by employing: means for transmitting one time measuring value and a plurality of input values to a communication control unit as a transmission/reception destination; and means for expanding one time measuring value to the plurality of input values in a communication control unit as a transmission/reception source.

While the basic function as to the control apparatus such as either a response time or a periodicity is maintained, the functional safety can be realized. In particular, the control apparatus is suitable to achieve that the high-performance control function and the functional safety capable of realizing the maintenance diagnosis of the equipment without stopping the plant can be established at the same time. The high-performance control function is capable of secure the response time and the periodicity from the control input to the output by combining the serial transfer operation capable of realizing the distributed arrangement of the central processing unit and the input/output units with the parallel transfer operation capable of realizing the high-speed plant input/output operations.

Also, even when data is transferred via a communication channel, the time instant relative information such as the occurrence of the event can be managed. Moreover, such a control apparatus can be realized which can establish a high-performance control function and an acquisition of an input/output time instant (time stamp) at the same time. The high-performance control function is capable of secure the response time and the periodicity from the control input to the output by combining the serial transfer operation capable of realizing the distributed arrangement of the central processing unit and the input/output units with the parallel transfer operation capable of realizing the high-speed plant input/output operation.

Other objects, features and advantages of the invention will become apparent from the following description of the embodiments of the invention taken in conjunction with the accompanying drawings.

DESCRIPTION OF THE INVENTION

Referring now to drawings, various embodiments of the present invention will be described in detail.

First Embodiment

Figure 1:
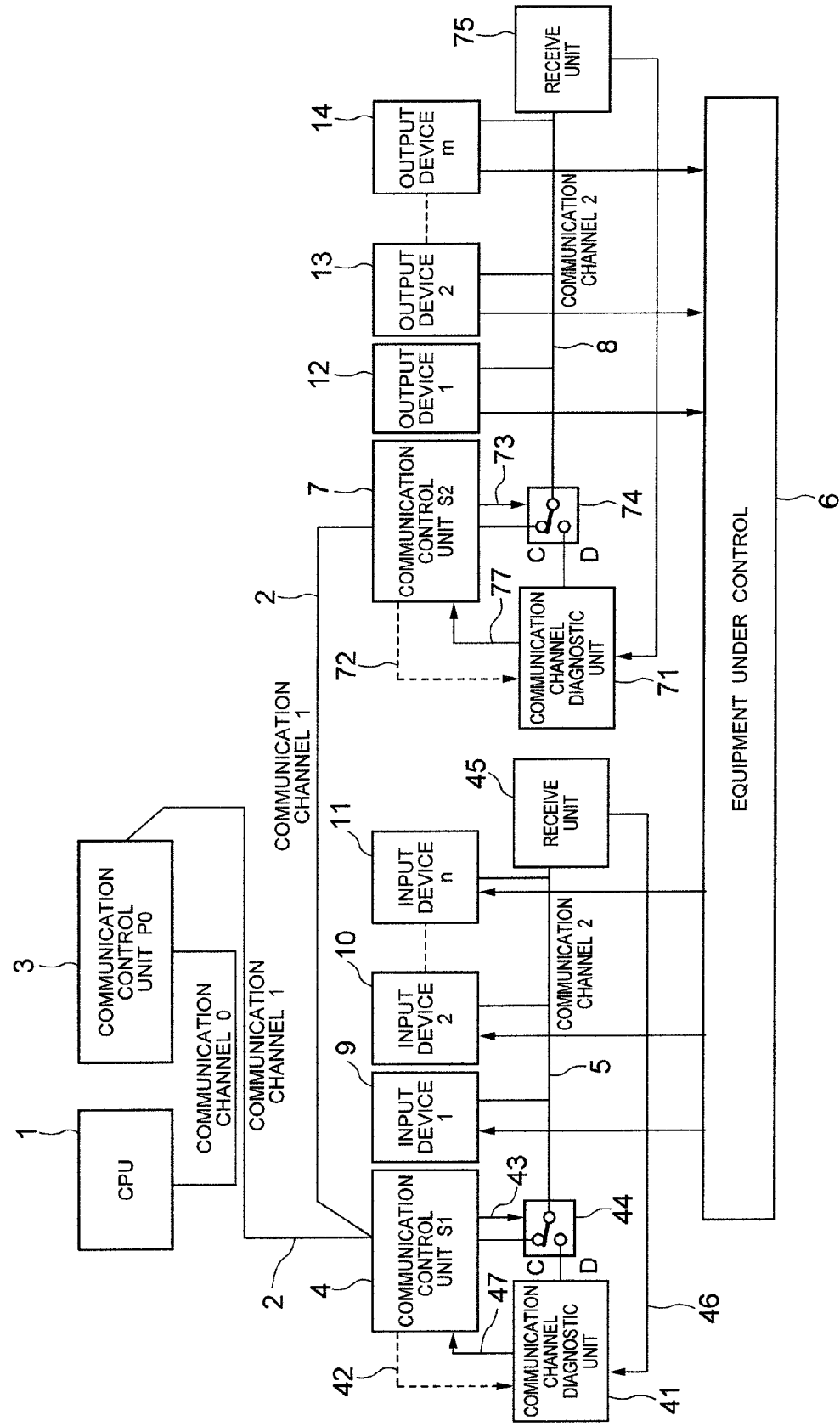
FIG. 1 is a block diagram for showing an arrangement of a control apparatus according to a first embodiment of the present invention.

A control apparatus according to a first embodiment of the present invention is indicated in FIG. 1. A central processing unit (CPU) 1 is connected via a parallel transfer bus 0 (communication channel "0") to a communication control unit 3 ("P0"). The communication control unit 3 ("P0") transmits and/or receives data via a control bus 2 (communication channel "1") using a serial transfer operation with respect to a communication control unit 4 ("S1"), and another communication control unit 7 ("S2").

The communication control unit 4 ("S1") and an input unit transmit and/or receive input data and a control signal supplied from an equipment under control 6 via an input/output bus 5 (communication channel "2") using a parallel transfer operation. The communication control unit 7 ("S2") and an output unit transmit and/or receive input data and a control signal to be supplied to the equipment under control 6 via an input/output bus 8 (communication channel "2") using a parallel transfer operation.

The input unit is constituted by "n" pieces of input devices 9, 10, and 11 (1 to n). The respective input devices transmit and/or receive input data from the equipment under control 6 via the input/output bus 5 (communication channel 2) with respect to the communication control unit 4 (S1). Similarly, the output unit is constituted by "m" pieces of output devices 12, 13, and 14 (1 to m). The respective output devices transmit and/or receive output data to the equipment under control 6 via the input/output bus 8 (communication channel 2) with respect to the communication control unit 7 (S2).

A communication channel diagnostic unit 41 for diagnosing an open or stuck-at failure of the input/output bus 5 (communication channel 2) is activated in response to a control signal 42 supplied from the communication control unit 4 (S1). Also, a selecting switch 44 switches from contact "C" to contact "D" in response to a control signal 43. The communication channel diagnostic unit 41 corresponds to such an unit which is installed on one terminal end of the input/output bus 5 (communication line 2) so as to circuladedly diagnose a parallel transferring circuit of the input/output bus 5 (communication channel 2). For instance, the communication channel diagnosing unit 41 adds a test pattern for diagnosis which switches a signal level of a "k"th transfer path and fixes all levels of other signals to levels "H." Next, the communication channel diagnostic unit 41 fixes the all levels of other signals to levels "L", and again applies the signal pattern for diagnosis to the "k"th transfer path. A receive unit 45 provided at the other end portion serial-converts reception signal patterns for not only the "k"th transfer path, but also all of the communication paths, and then, transfers the serial-converted reception signal patterns via the transfer path 46 to the communication channel diagnostic unit 41. The communication channel diagnostic unit 41 monitors whether or not a "k"th reception signal pattern is identical to the signal pattern for diagnose, and also monitors whether or not signals of other communication paths are not influenced by the signal pattern for diagnosis. A result of the above-described diagnoses is notified via the transfer path 46 to the communication control unit 4 (S1). If the diagnosis result is normal, then the selecting switch 44 is connected to contact "C" in order that the communication of the communication channel diagnostic unit 41 restarts a communication with the input/output bus 5 (communication line 2). Next, when the transfer channel diagnostic unit 41 is activated, the signal pattern for diagnosis is added to a (k+1)th transfer path. As previously explained, a stopping time period of the input/output bus 5 (communication channel 2) can be shortened by circuladedly diagnosing the transfer path.

Another communication channel diagnostic unit 71 which diagnoses an open or stuck-at failure of the input/output bus 8 (communication channel 2) is activated by receiving a control signal 72 supplied from the communication control unit 7 (S2). An operation of the communication channel diagnostic unit 71 and an operation of a receive unit 75 are identical to those of the communication channel diagnostic unit 41 and the receive unit 45, so that descriptions thereof are omitted.

Figure 2:
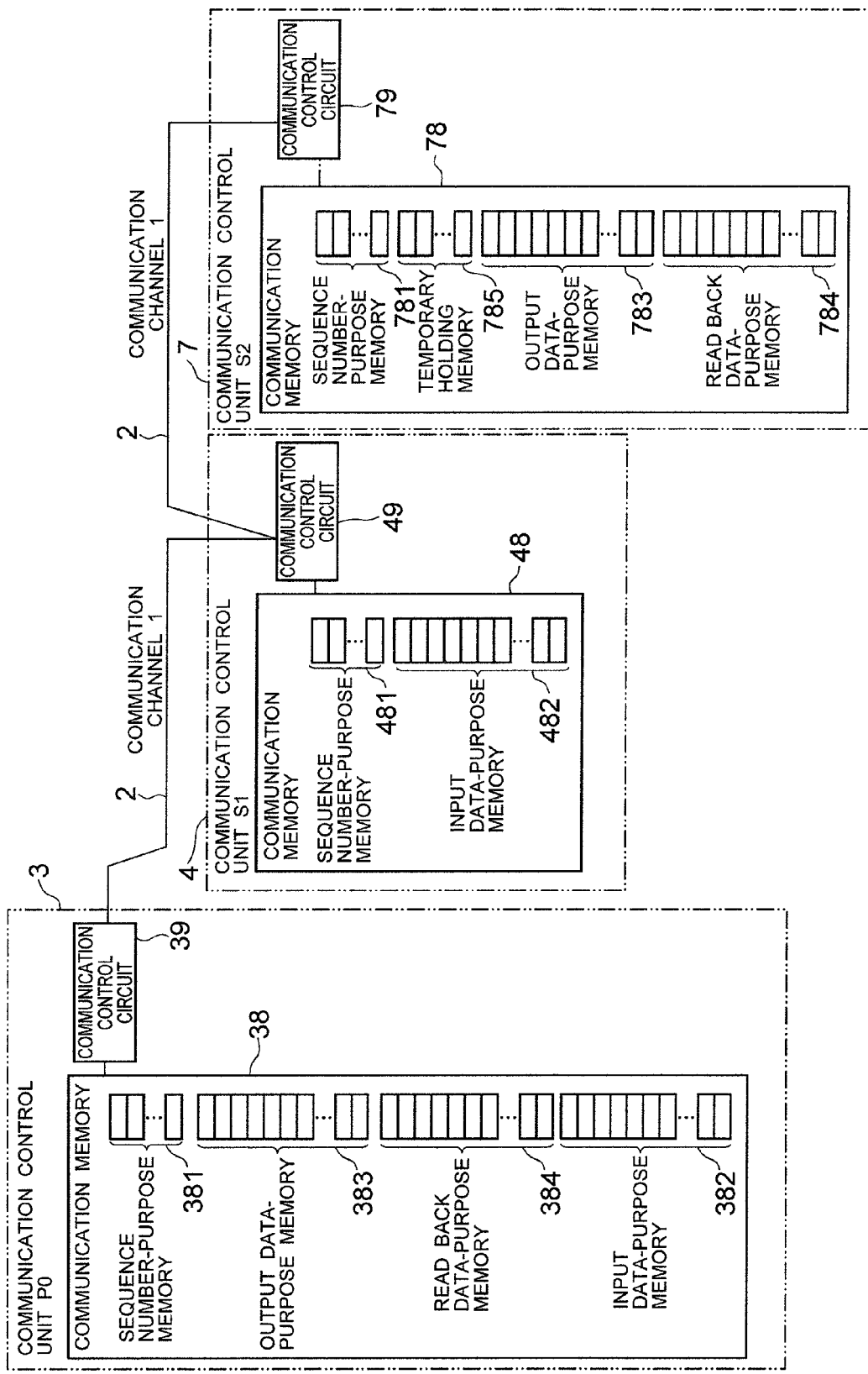
FIG. 2 is a block diagram for representing a path of control bus (communication channel 1) transmission/reception data of the first embodiment of the present invention.

FIG. 2 indicates a path of data transmitted/received between the communication control unit 3 (P0) and the communication control units 4 (S1) and 7 (S2) via the control bus 2 (communication channel 1) using the serial transfer operation. With respect to a communication memory 38 provided in the communication control unit 3 (P0), regions used for a sequence number-purpose memory 381, an input data-purpose memory 382, an output data-purpose memory 383, and a read back data-purpose memory 384 are allocated. Data stored in the communication memory 38 is parallel/serial-converted by a communication control circuit 39, and then, parallel/serial-converted data is transferred via the control bus 2 (communication channel 1) between communication memories 48 and 78 of the communication control units 4 (S1) and 7 (S2).

With respect to the communication memory 48 employed in the communication control unit 4 (S1), regions used for a sequence number-purpose memory 481 and an input data-purpose memory 482 are allocated. Data of the input data-purpose memory 482 within the communication memory 48 is parallel/serial-converted by a communication control circuit 49, and then, the parallel/serial-converted data is mapped to the input data-purpose memory region 382 of the communication memory 38 of the communication control unit 3 (P0) via the control bus 2 (communication channel 1).

With respect to the communication memory 78 provided in the communication control unit 7 (S2), regions used for a sequence number-purpose memory 781, an output data-purpose memory 783, a read back data-purpose memory 784, and a temporary holding memory 785 are allocated. Data stored in the output data-purpose memory region 383 of the communication memory 38 of the communication control device 3 (P0) is parallel/serial-converted by the communication control circuit 79, and then, the parallel/serial-converted data is transferred via the control bus 2 (communication line 1) to the temporary holding memory 785 of the communication memory 78. Data stored in the temporary holding memory 785 is transferred to the output data-purpose memory 783 after such a confirmation is made that a communication between the communication control units 3 (P0) and 7 (S2) is normal. Data stored in the read back data-purpose memory 784 is transferred to the read back-purpose memory 384 of the communication control unit 3 (P0).

Figure 3:
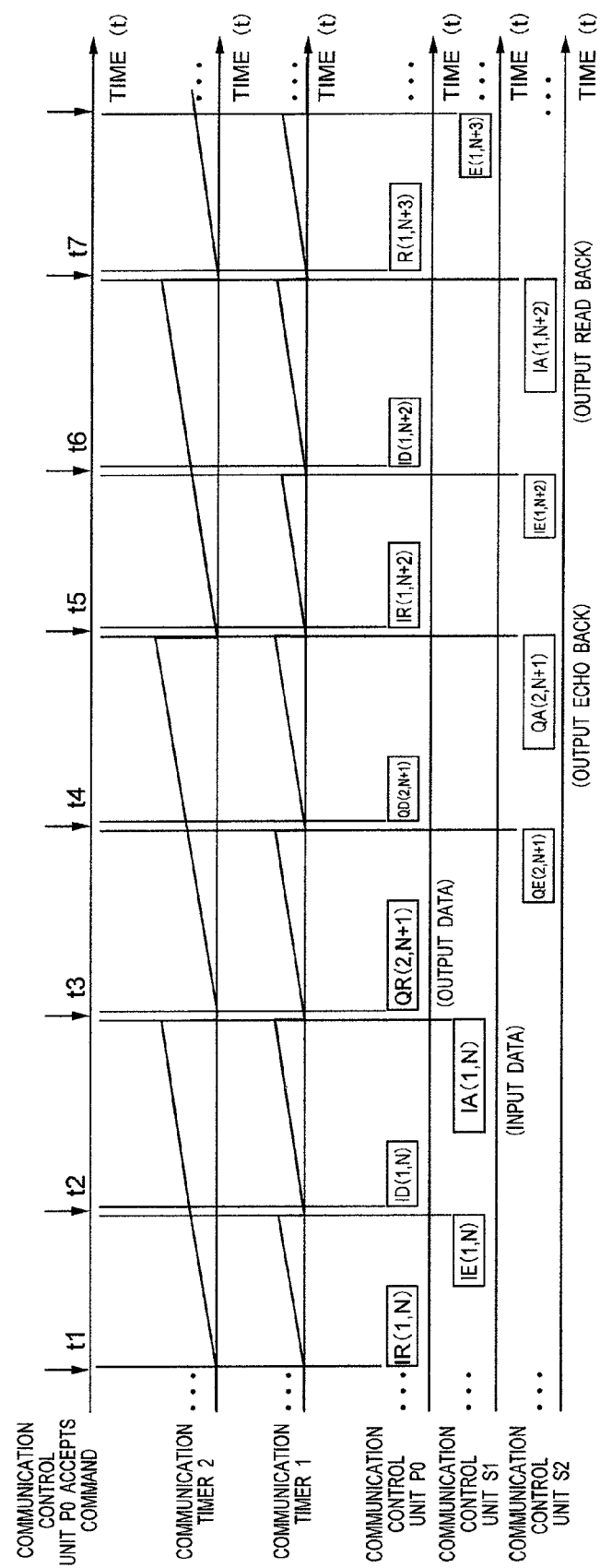
FIG. 3 is a time chart for representing operations as to the control bus (communication channel 1) transmission/reception data of the first embodiment of the present invention.

FIG. 3 indicates a data communication operation sequence executed among the communication control units 3 (P0), 4 (S1), and 7 (S2) via the control bus 2 (communication channel 1).

At a time "t1", an input request "IR (1, N)" from the communication control unit 3 (P0) to the communication control unit 4 (S1) is outputted to the control bus 2 (communication channel 1).

[Expression 1]

$$IR(1, N) = \begin{pmatrix} \text{Command} & \text{Send Key} & \text{Rcv. Key} & \text{Seq. No.} & \text{Dev. Adr.} & \text{Data Size.} \\ \hline IR & \#0 & \#1 & \#(N) & (DA) & (DS) \end{pmatrix} \quad (1)$$

The input request IR (1, N) is made of a data string as to a send key (SendKey=0) corresponding to a sender number 0; a receive key (Rcv.Key=1) corresponding to a receiver number 1; a sequence number (Seq.No.=N) used to confirm a transfer data sequence; input device information (Dev.Adr.) of a transfer destination from the communication control unit 4 (S1); and an input data size (DataSize). In addition, both a start flag and an end flag which are commonly used in all transfer data are added to a head portion and a tail portion of a data string. However, for the sake of simplicity, indications of these flags are omitted. In this case, the input device information (Dev.Adr.) constitutes n-bit ON/OFF data in the first embodiment shown in FIG. 1. For instance, when the input device information is inputted from the input device 1, the n-bit ON/OFF data is transferred while first bit data is set to "1", whereas when the input device information is not inputted from the input device 2, the n-bit ON/OFF data is transferred while second bit data is set to "0."

The communication control unit 4 (S1) recognizes that a request is issued for the own equipment based upon the receive key (Rcv.Key=1) of the input request IR (1, N), and then, outputs an input request echo IE (I, N) to the control bus 2 (communication line 1).

[Expression 2]

$$IE(1, N) = \begin{pmatrix} \text{Command} & \text{Send Key} & \text{Rcv. Key} & \text{Seq. No.} \\ \hline IR & \#1 & \#0 & \#(N) \end{pmatrix} \quad (2)$$

The input request echo IE (1, N) is constituted by a data string as to an input request echo command (IE), a send key (SendKey=1) corresponds to a sender number 1, a receive key (Rcv.Key=0) corresponding to a receiver number 0, and a sequence number (Seq.No.=N) used to confirm a transfer data sequence.

The communication control unit 3 (P0) confirms that the input request IR (1, N) has been transferred to the communication control unit 4 (S1) under normal condition by checking that the send key and the receive key of the input request echo IE (1, N) are reversed to those of the input request IR (1, N), and the sequence number (Seq.No.=N) thereof is not changed.

As previously explained, the reversed send key and the reversed receive key are used in order to monitor a camouflage (masquerade) of a communication. Also, a time out of a transfer operation is monitored by a communication timer 1 which is operated by sending the input request IR (1, N) and receiving the input request echo IE (1, N).

At a time instant "t2", an input access request ID (1, N) from the communication control unit 3 (P0) to the communication control unit 4 (S1) is outputted to the control bus 2 (communication channel 1).

[Expression 3]

$$ID(1, N) = \begin{pmatrix} \text{Command} & \text{Send Key} & \text{Rcv. Key} & \text{Seq. No.} \\ \hline IA & \#0 & \#1 & \#(N) \end{pmatrix} \quad (3)$$

The input access request ID (1, N) is constituted by a data string as to an input request echo command (IA), a send key (SendKey=0) corresponds to a sender number 0, a receive key (Rcv.Key=1) corresponding to a receiver number 1, and a sequence number (Seq.No=N) used to confirm a transfer data sequence.

The communication control unit 4 (S1) recognizes that a request is issued for the own equipment based upon the receive key (Rcv.Key=1) of the input access request ID (1, N), and outputs an input access data IA (1, N) read out from the input data-purpose memory 482 to the control bus 2 (communication channel 1).

The input access data IA (1, N) is constituted by such a data string. That is, the data string is made by an input access request command (IA), a send key (SendKey=1) corresponding to a sender number 1, a receive key (Rcv.Key=0) corresponding to a receiver number 0, a sequence number (Seq.No.=N) for confirming a transfer data sequence, input device information (Dev.Adr.) and an input data size (DataSize) equal to the input request IR (1, N), and finally, input data (InputData).

[Expression 4]

$$IA(1, N) =$$

$$\begin{pmatrix} \text{Command} & \text{Send Key} & \text{Rcv. Key} & \text{Seq. No.} & \text{Dev. Adr.} & \text{Data Size.} & \text{Input Data} \\ \hline IA & \#1 & \#0 & \#(N) & (DA) & (DS) & (Data) \end{pmatrix} \quad (4)$$

The communication control unit 3 (P0) confirms the send key and the receive key, the sequence number (Seq.No.=N), the input device information (Dev.Adr.), the input data size (DataSize) of the input access data IA (1, N).

When a confirmation result is normal, the input data (InputData) is written in the input data-purpose memory 382 employed in the communication control unit 3 (P0). The sequence number is counted up to become (Seq.No.=N+1). The central processing unit 1 (CPU) can read the input data from the input data-purpose memory 382 at timing controlled by a program.

During the above-described process operation, the communication timer 1 is operated based upon the input access request ID (1, N) and the input access request command IA (1, N). Also, the communication timer 2 monitors a time out of the input communication by sending the input request IR (1, N) and by receiving the input access data IA (1, N).

At a time instant "t3", an output request QR (2, N+1) from the communication control unit 3 (P0) to the communication control unit 7 (S2) is outputted to the control bus 2 (communication channel 1).

[Expression 5]

$$QR(2, N+1) = \begin{pmatrix} \text{Command} & \text{Send Key} & \text{Rcv. Key} & \text{Seq. No.} & \text{Dev. Adr.} & \text{Data Size.} & \text{Output Data} \\ \hline QR & \#0 & \#2 & \#(N) & (DA) & (DS) & (Data) \end{pmatrix} \quad (5)$$

The output request QR (2, N+1) is constituted by such a data string as to an output request command (QR), a send key (SendKey=0) corresponding to a sender number 0, a receive key (Rcv.Key=2) corresponding to a receiver number 2, a sequence number (Seq.No.=N+1), output device information (Dev.Adr.) of a transfer destination from the communication control unit 7 (S2), an output data size (DataSize), and output data (OutputData). The output data (OutputData) is written from the output data-purpose memory 383.

In this case, the output device information (Dev.Adr.) constitutes the m-bit ON/OFF data in the first embodiment of FIG. 1.

The communication control unit 7 (S2) recognizes that a request for the own equipment is issued based upon the receive key (Rcv.Key=2) of the output request QR (2, N+1), and writes the output data (OutputData) to the temporary holding memory 785 provided in the communication control unit 7 (S2). Also, the communication control unit 7 (S2) outputs an output request echo QE (2, N+1) to the control bus 2 (communication channel 1).

[Expression 6]

$$QE(2, N+1) = \begin{pmatrix} \text{Command} & \text{Send Key} & \text{Rcv. Key} & \text{Seq. No.} \\ \hline QR & \#2 & \#0 & \#(N+1) \end{pmatrix} \quad (6)$$

The output request echo QE (2, N+1) is constituted by such a data string as to an output request echo command (QE), a send key (SendKey=2), a receive key (Rcv.Key=0), and a sequence number (Seq.No.=N+1).

The communication control unit 3 (P0) confirms that the output request QR (2, N+1) has been normally transferred to the communication control unit 7 (S2) based upon the output request QR (2, N+1), the send key and the receive key of the output request echo QE (2, N+1), and the sequence number (Seq.No.=N+1). The communication timer 1 is operated based upon the output request QR (2, N+1) and the output request echo QE (2, N+1).
Page 15

[Expression 7]

$$QD(2, N+1) = \begin{pmatrix} \text{Command} & \text{Send Key} & \text{Rcv. Key} & \text{Seq. No.} \\ \hline QA & \#0 & \#2 & \#(N+1) \end{pmatrix} \quad (7)$$

At a time instant "t4", an output access request QD (2, N+1) from the communication control unit 3 (P0) to the communication control unit 7 (S2) is outputted to the control bus 2 (communication channel 1).

The output access request QD (2, N+1) is constituted by such a data string as to an output access request command (QA), a send key (SendKey=0) corresponding to a sender number 0, a receive key (Rcv.Key=2) corresponding to a receiver number 2, a sequence number (Seq.No.=N+1) used to confirm a transfer data sequence.

The communication control unit 7 (S2) recognizes that an output request for the own equipment is issued based upon the receive key (Rcv.Key=2) of the output access request QD (2, N+1) and the sequence number (Seq.No.=N+1), and then, outputs the data stored in the temporary holding memory 785 provided in the communication control unit 7 (S2) to the output data-purpose memory 783. Also, the communication control unit 7 (S2) outputs the output access request data QA (2, N+1) to the control bus 2 (communication channel 1).

[Expression 8]

$$QA(2, N+1) = \begin{pmatrix} \text{Command} & \text{Send Key} & \text{Rcv. Key} & \text{Seq. No.} & \text{Dev. Adr.} & \text{Data Size.} & \text{Output Echoback} \\ \hline QA & \#2 & \#0 & \#(N+1) & (DA) & (DS) & (Data) \end{pmatrix} \quad (8)$$

The output request echo QA (2, N+1) is constituted by such a data string as to an output access request command (QA), a send key (SendKey=2), a receive key (Rcv.Key=0), and a sequence number (Seq.No.=N+1), an output access request QA (2, N+1), output device information (Dev.Adr.), an output data size (DataSize), and finally, an output echo back (OutputEchoback) written from the temporary holding memory 785.

The communication control unit 3 (P0) confirms the send key and the receive key of the output access data QA (2, N+1), the sequence number (Seq.No.=N+1), the output device information (Dev.Adr.), and the output data size (DataSize). When a confirmation result becomes normal, the sequence number is counted up (Seq.No.=N+2).

During the above-described process operation, the communication timer 1 is operated based upon the output access request QD (2, N+1) and the output access data QA (2, N+1). Also, the communication timer 2 monitors a time out of the output communication by sending the output request QR (2, N+1) and by receiving the output access data QA (1, N+1).

In the first embodiment of FIG. 1, since the output echo back (OutputEchoback) is added to the output access data QA (2, N+1), the communication control unit 3 (P0) can compare the added data with the output data (OutputData), so that the communication control unit 3 (P0) can confirm that the output data has been transferred under the normal condition.

A time period defined from a time instant "t5" to a time instant "t7" indicates an input communication in the case that an output read back function is provided with a portion, or all of the output devices 12, 13, 14 (1 to m) of the output unit.

A difference between the above-described input communication of the time period from the time instant "t1" to the time instant "t3" and this input communication of the time period from the time instant "t5" to the time instant "t7" is given as follows in addition to the sequence numbers: That is, the counter party of the communication control unit 3 (P0) is the communication control unit 7 (S2) with respect to the communication control unit 4 (S1); and the input device information (Dev.Adr.) is the m-bit ON/OFF data with respect to the n-bit ON/OFF data; and the output read back data (OutputEchoback) corresponds to the input data (InputData). Also, the m-bit data of the input device information (Dev.Adr.) indicates whether or not the output read back data of the output devices 12, 13, 14 (1 to m) are present. Other aspects of the input communication are identical to those of the input communication defined from the time instant t1 to the time instant t3. Concrete data strings are given as follows:

[Expression 9]

$$IR(2, N+2) = \begin{pmatrix} \text{Command} & \text{Send Key} & \text{Rcv. Key} & \text{Seq. No.} & \text{Dev. Adr.} & \text{Data Size.} \\ \hline IR & \#0 & \#2 & \#(N+2) & (DA) & (DS) \end{pmatrix} \quad (9)$$

[Expression 10]

$$QE(2, N+1) = \begin{pmatrix} \text{Command} & \text{Send Key} & \text{Rcv. Key} & \text{Seq. No.} \\ \hline QR & \#2 & \#0 & \#(N+2) \end{pmatrix} \quad (10)$$

[Expression 11]

$$IA(2, N+2) = \begin{pmatrix} \text{Command} & \text{Send Key} & \text{Rcv. Key} & \text{Seq. No.} & \text{Dev. Adr.} & \text{Data Size.} & \text{Output Readback} \\ \hline IA & \#2 & \#0 & \#(N+2) & (DA) & (DS) & (Data) \end{pmatrix} \quad (11)$$

[Expression 12]

$$ID(2, N+2) = \begin{pmatrix} \text{Command} & \text{Send Key} & \text{Rcv. Key} & \text{Seq. No.} \\ \hline IA & \#0 & \#2 & \#(N+2) \end{pmatrix} \quad (12)$$

With execution of the above-described communication operations, the data communication among the communication control units 3 (P0), 4 (S1), and 7 (S2) via the control bus 2 (communication channel 1) is circulatedly carried out, and then, at the time instant t7, the same operation as that of the time instant t1 is commenced. It should also be noted that this communication operation is the same as that of the time instant t1 except that a sequence number becomes (Seq.No.=N+3). As previously explained, the data transferring operation via the control bus 2 (communication channel 1) corresponds to the memory transferring operation executed in a predetermined periodic operation sequence, and the operation sequence from the time instant t1 to the time instant t6 is not reversed, but also is not omitted. As a result, the sequential control of the data strings is not required, so that idle times between the data strings can be minimized, and the transfer efficiency can be increased.

It should be understood that in the reset timing (t1, t2, - - - , t6) of the communication timer 1, other communication commands may be alternatively interrupted. Also, in this alternative case, an operation sequence of a memory transferring operation is not reversed, but also is not omitted except that a completion of the interrupted communication command is merely waited.

Figure 4:
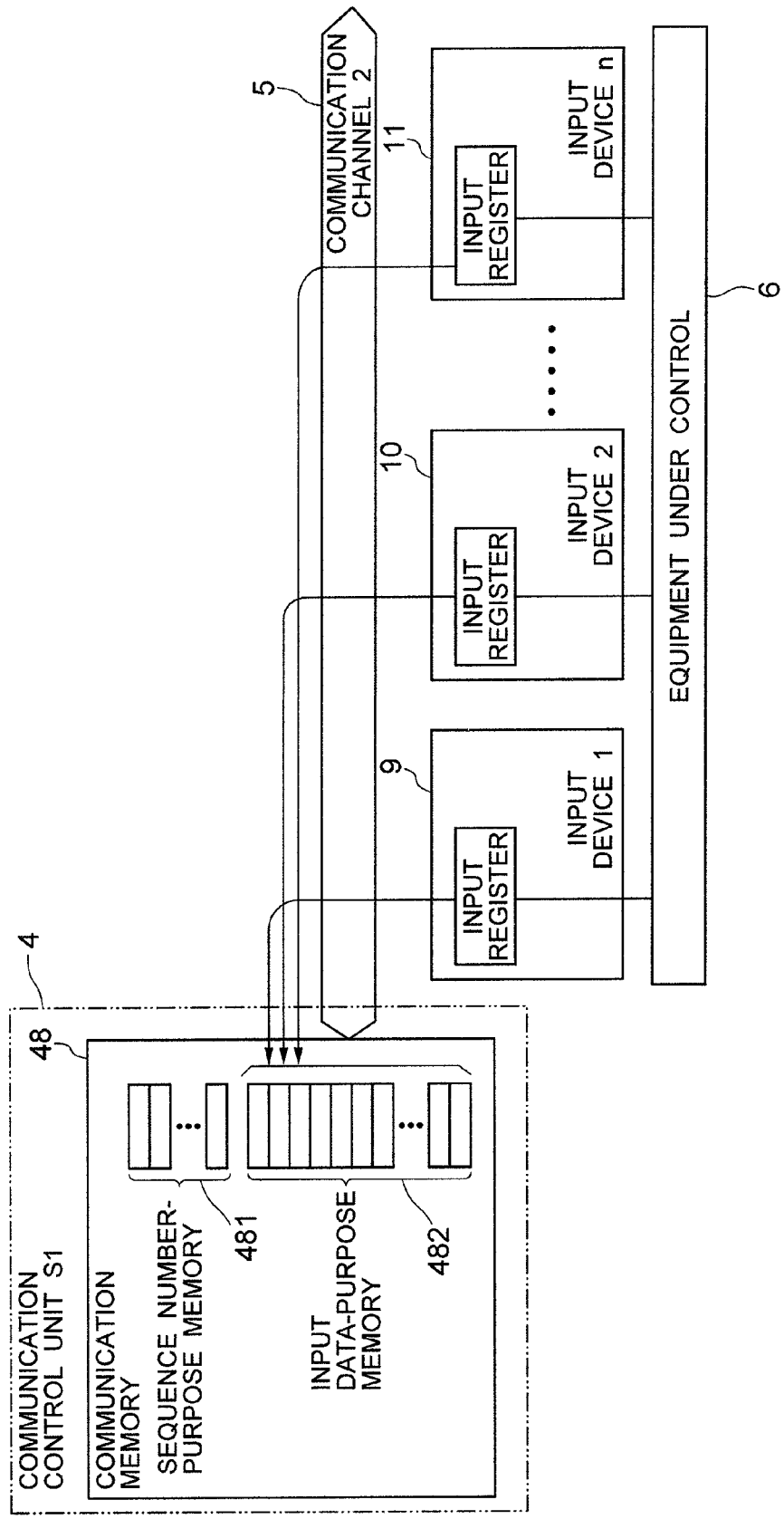
FIG. 4 is a block diagram for indicating an input/output bus (communication channel 2), and a data path of an input unit of the first embodiment of the present invention.

FIG. 4 indicates a path of data transmitted/received between the communication control unit 4 (S1) and an input unit via the input/output bus 5 (communication channel 2). Each of "n" pieces of the input devices 9, 10, 11 (1 to n) which constitute the input unit is equipped with an input register 91, another input register 101, and a further input register 111 respectively, while measurement data from the equipment under control 6 is written into the input registers 91, 101, 111 in either timing or a time period in correspondence with structures of these input devices 91, 101, 111. The measurement data stored in the input registers 91, 101, 111 are transferred in a periodic manner via the input/output bus 5 (communication channel 2) to the input data-purpose memory region 482 of the communication memory 48 of the communication control unit 4 (S1). It should be understood that while the input/output bus is under stopping condition, for example, while the communication channel diagnostic equipment 41 is under operation, the data transferring operation is also stopped. Generally speaking, a data transfer time period via the input/output bus 5 (communication channel 2) is considerably shorter than a data transfer time period via the control bus 2 (communication channel 1). As a result, after the data transfer operation is again initiated, the data transfer operation may be continuously commenced from a specific input register, for example, the input register 91. As a consequence, a buffer function of the input/output bus 5 (communication channel 2) as to the data transfer operation may be simplified.

Figure 5:
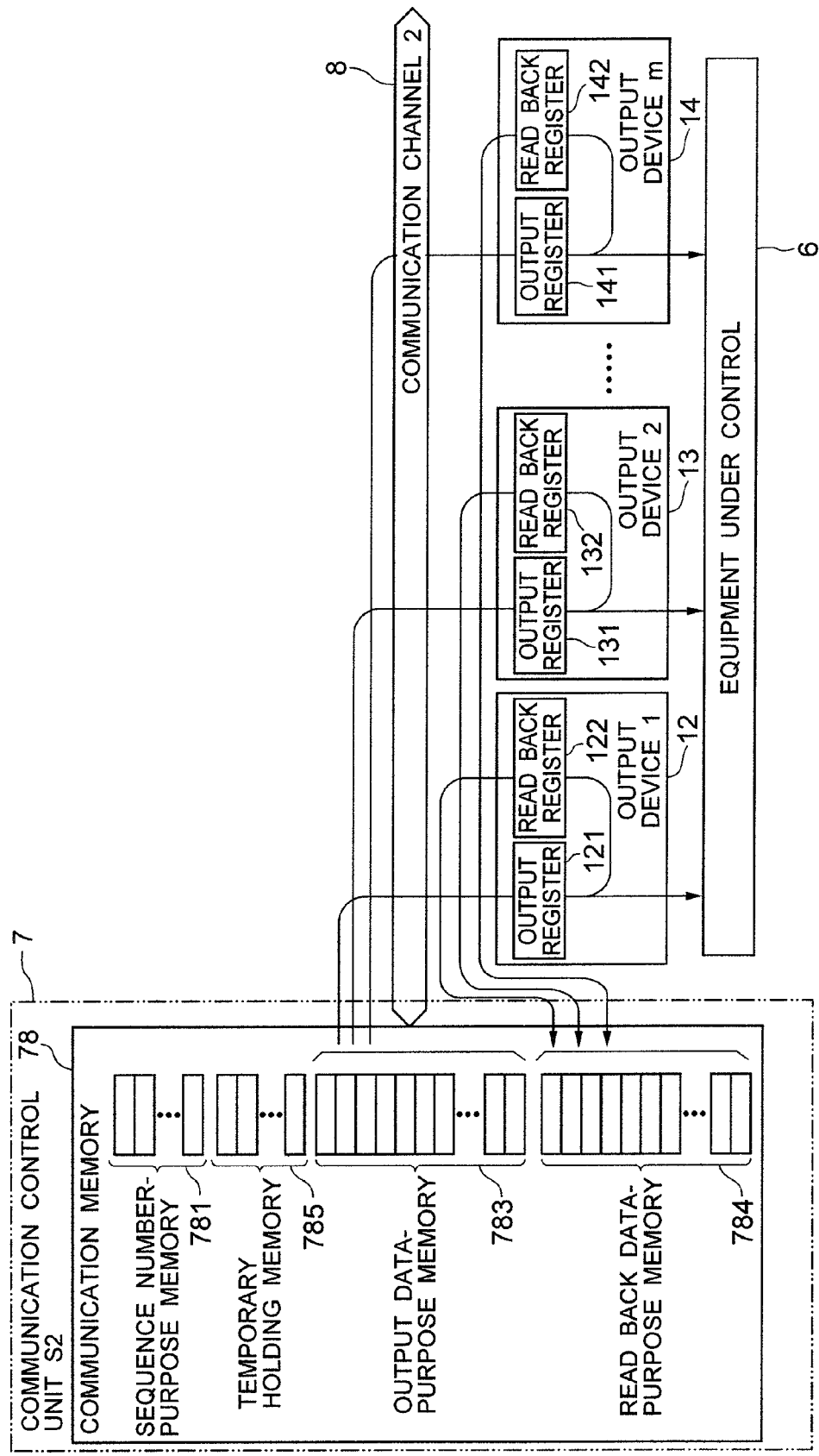
FIG. 5 is a block diagram for representing the input/output bus (communication channel 2), and a data path of an output unit of the first embodiment of the present invention.

FIG. 5 indicates a path of data transmitted/received between the communication control unit 7 (S2) and an output unit via the input/output bus 8 (communication channel 2). Each of "m" pieces of the output devices 12, 13, 14 (1 to m) which constitute the output unit is equipped with an output register 121, another output register 131, and a further output register 141 respectively, while data is outputted to the equipment under control 6 in either timing or a time period in correspondence with structures of the output devices 12, 13, 14 (1 to m). Data stored in the output data-purpose memory region 783 of the communication memory 78 of the communication control unit 7 (S2) is transferred via the input/output bus 8 (communication channel 2) to the output registers 121, 131, 141 in a periodic manner. On the other hand, in the first embodiment of FIG. 5, the respective output devices 12, 13, 14 (1 to m) have been equipped with the functions capable of reading back outputs to the equipment under control 6. The read back results are written in the read back registers 122, 132, 142, and are transferred via the input/output bus 8 (communication channel 2) to the read back data-purpose memory region 784 of the communication memory 78 of the communication control unit 7 (S2) in a periodic manner. It should also be understood that while the input/output bus is under stopping condition, for example, while the communication channel diagnostic unit 71 is under operation, the data transferring operation is also stopped. Similar to the input/output bus 5 (communication channel 2), generally speaking, a data transfer time period via the input/output bus 5 (communication channel 2) is considerably shorter than a data transfer time period via the control bus 8 (communication channel 1). As a result, after the data transfer operation is again initiated, the data transfer operation may be continuously commenced from a specific output register, for example, the output register 121.

As indicated in FIG. 2, FIG. 3, FIG. 4, and FIG. 5, any of the control bus 2 (communication channel 1), the input/output bus 5 (communication channel 2), and the input/output bus 8 (communication channel 2) have been made of such a basic structure that the specific memory transferring operations can be independently carried out.

Figure 6:
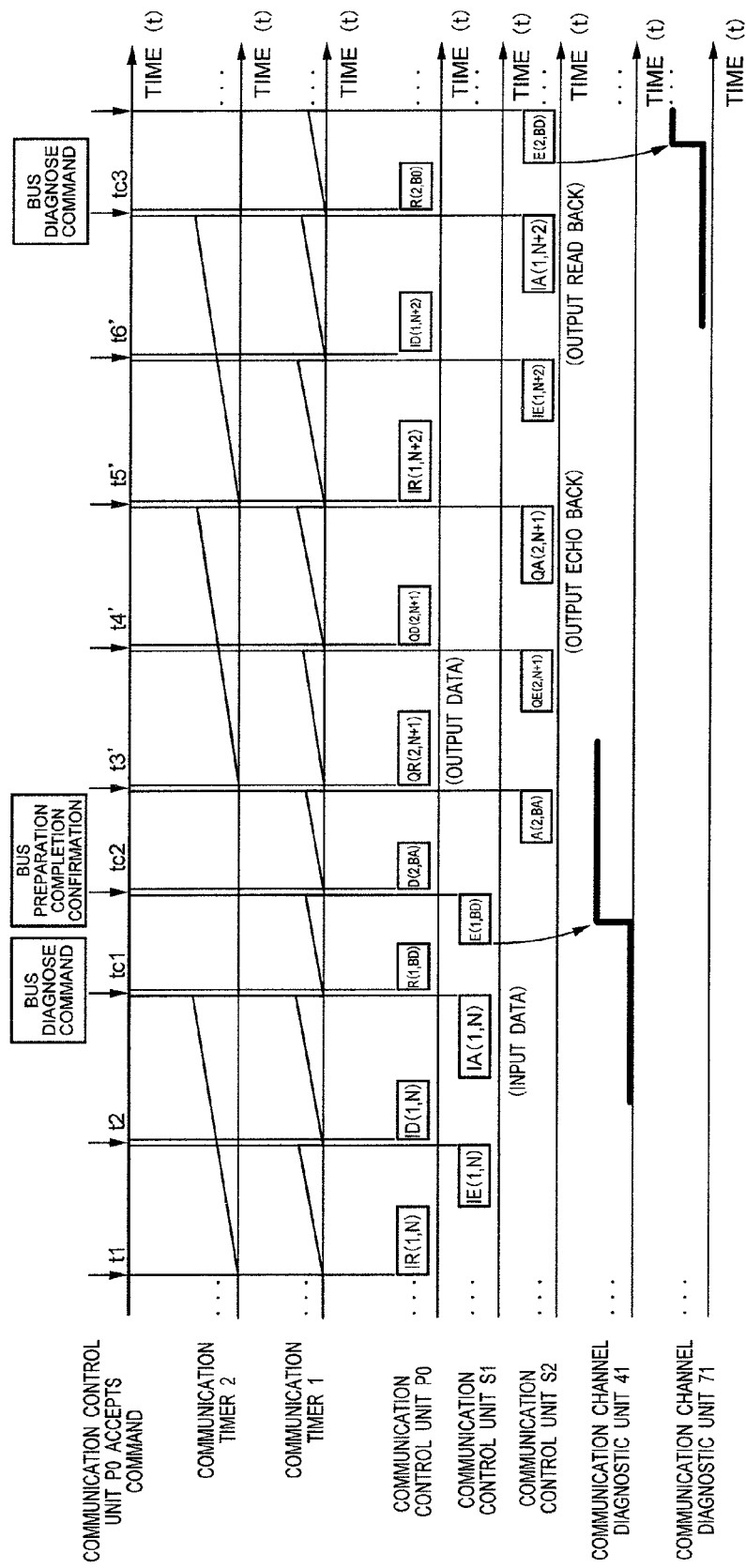
FIG. 6 is a time chart for representing a bus diagnostic instruction operation performed via the control bus (communication channel 1) of the first embodiment of the present invention.

FIG. 6 indicates an operation sequence for activating both the communication channel diagnostic unit 41 of the input unit and the communication channel diagnostic unit 71 of the output unit via the control bus 2 (communication channel 1).

It should be understood that since the same symbols as to the data strings and the timing shown in FIG. 3 as those indicated in FIG. 6 represent the same contents, descriptions thereof are omitted in order to avoid overlapped explanations.

In the first embodiment of FIG. 6, in accordance with the communication control program of the communication control unit 3 (P0), the communication channel diagnostic unit 41 is activated after an input data communication from the communication control unit 7 (S2) has been accomplished, and the communication channel diagnostic unit 71 is activated after an output read back data communication from the communication control unit 7 (S2) has been initiated. Also, the first embodiment of FIG. 6 has been constructed as follows: That is, a confirmation is made that the input/output bus 5 (communication channel 2) can be operated (completion of preparation) before the input data communication from the communication control unit 4 (S1) is commenced, and also, a confirmation is made that the input/output bus 8 (communication channel 2) can be operated (completion of preparation) before the output data communication to the communication control unit 7 (S2) is commenced.

At a time instant "tc1", a bus diagnosis command "R (1, BD)" is transferred to the communication control unit 4 (S1) in accordance with the communication control program of the above-described communication control unit 3 (P0).
Page 18

[Expression 13]

$$R(1, BD) = \left( \begin{array}{|c|c|c|} \hline \text{Command} & \text{Send Key} & \text{Rcv. Key} \\ \hline \text{BD} & \#0 & \#1 \\ \hline \end{array} \right) \quad (13)$$

The bus diagnosis command R (1, BD) is constituted by a diagnosis request command (BD), a send key (SendKey=0), and a receive key (Rcv.Key=1). This is no sequence number for a transfer operation which is inserted as an interrupt.

The communication control unit 4 (S1) recognizes a request for the own equipment based upon the receive key (Rcv.Key=1) of the bus diagnosis command R (1, BD), and outputs a diagnosis request echo "E (1, BD)" to the control bus 2 (communication channel 1).

[Expression 14]

$$E(1, BD) = \left( \begin{array}{|c|c|c|} \hline \text{Command} & \text{Send Key} & \text{Rcv. Key} \\ \hline \text{BD} & \#1 & \#0 \\ \hline \end{array} \right) \quad (14)$$

The diagnosis request echo E (1, BD) is constituted by a diagnosis request command (BD), a send key (SendKey=1), and a receive key (Rcv.Key=0).

The communication channel diagnostic unit 41 is activated by a control signal 42 at the same time when the diagnosis request echo E (1, BD) is issued, and the selecting switch 44 is connected to the side D by the control signal 43. With execution of the above-described process operation, the communication channel diagnosis of the input unit is commenced.

At a time instant "tc2", a bus preparation completion access confirmation "D (2, BA)" is transferred to the communication control unit 7 (S2).

[Expression 13]

$$D(2, BA) = \left( \begin{array}{|c|c|c|} \hline \text{Command} & \text{Send Key} & \text{Rcv. Key} \\ \hline \text{BA} & \#0 & \#2 \\ \hline \end{array} \right) \quad (15)$$

The bus preparation completion access confirmation D (2, BA) is constituted by a bus access command (BA), a send key (SendKey=0), and a receive key (Rcv.Key=2).

The communication control unit 7 (S2) confirms a request for the own equipment based upon the receive key (Rcv.Key=2) of the bus preparation completion access confirmation D (2, BA), and outputs a diagnosis request echo A (2, BA) to the control bus 2 (communication channel 1).

[Expression 16]

$$A(2, BA) = \left( \begin{array}{|c|c|c|c|} \hline \text{Command} & \text{Send Key} & \text{Rcv. Key} & \text{Status} \\ \hline \text{BA} & \#2 & \#0 & \text{Rdy} \\ \hline \end{array} \right) \quad (16)$$

The diagnosis request echo A (2, BA) is constituted by a bus access command (BA), a send key (SendKey=2), a receive key (Rcv.Key=0), and subsequently a status signal (Status). The status signal is made of an (m+1)-bit ON/OFF signal, while the respective bits indicate diagnostic operation statuses of the communication channel diagnostic unit 71, and diagnostic operation statuses of the output devices 12, 13, 14 (1 to m). A diagnostic status becomes 1, and a normal operation status becomes 0. As a consequence, when all of these bits become 0, a preparation of an output unit which is connected to the communication control unit 7 (S2) is completed.

From a time instant t3' to a time instant t6', a data transfer operation is continuously carried out, which is identical to that from the time instant t3 to the time instant t6 of FIG. 2.

At a time instant "tc3", a bus diagnosis command "R (2, BD)" is transferred to the communication control unit 7 (S2) in accordance with the communication control program of the above-described communication control unit 3 (P0) so as to activate the communication channel diagnostic unit 71. The operation is identical to the above-described operation when the communication channel diagnostic unit 41 is activated at the time instant "tc1", and thus, only a data string is indicated in order to avoid the duplicated explanation.

[Expression 17]

$$R(2, BD) = \left( \begin{array}{|c|c|c|} \hline \text{Command} & \text{Send Key} & \text{Rcv. Key} \\ \hline \text{BD} & \#0 & \#2 \\ \hline \end{array} \right) \quad (17)$$

[Expression 18]

$$E(2, BD) = \left( \begin{array}{|c|c|c|} \hline \text{Command} & \text{Send Key} & \text{Rcv. Key} \\ \hline \text{BD} & \#2 & \#0 \\ \hline \end{array} \right) \quad (18)$$

Figure 7:
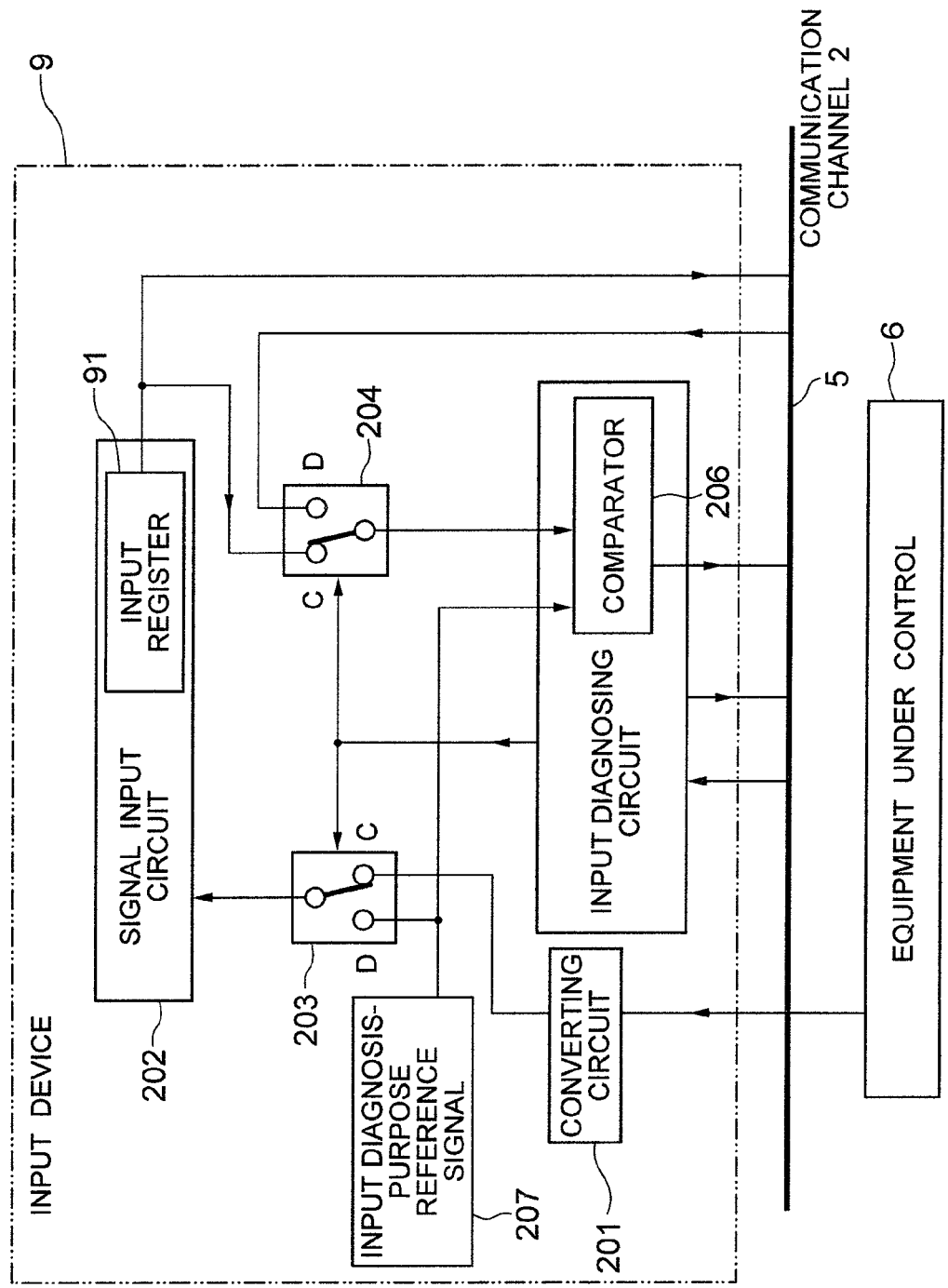
FIG. 7 is a block diagram for showing a normal input operation of the input unit according to the first embodiment of the present invention.

FIG. 7 indicates an internal arrangement of the input device 9 of the first embodiment. A measurement signal derived from the equipment under control 6 is converted by a converting circuit 201, and then, the converted measurement signal is written in an input register 91 employed in a signal input circuit 202. A memory transfer operation from the input register 91 via the input/output bus 5 (communication channel 2) to the communication control unit 4 (S1) is similar to that as previously described with reference to FIG. 4. In the above-described basic arrangement, when the normal data input operation is performed, both the switch 203 and the switch 204 are connected to the sides C.

Figure 8:
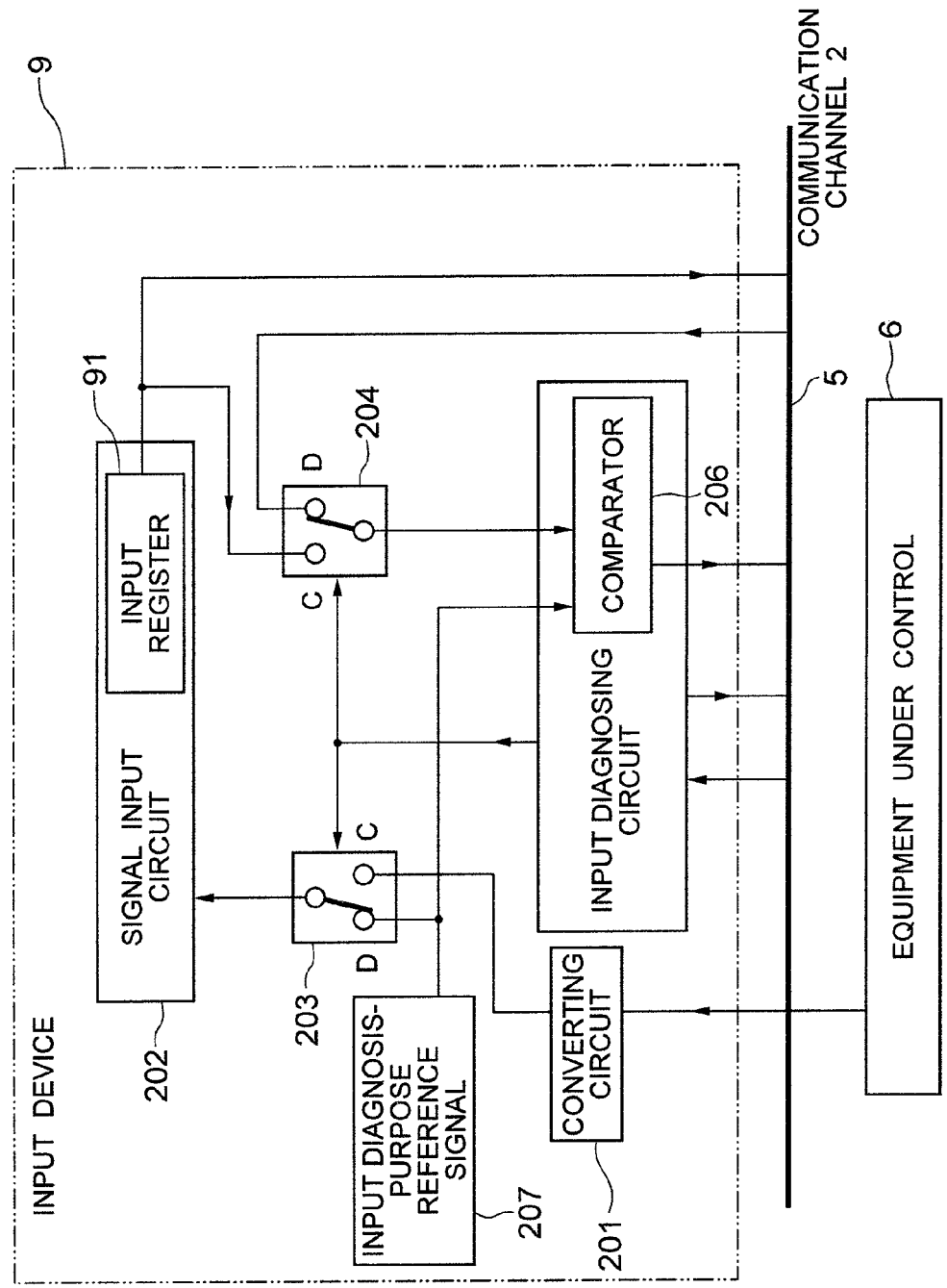
FIG. 8 is a block diagram for representing a test operation of the input unit according to the first embodiment of the present invention.

FIG. 8 shows a test of an input diagnosis circuit 205 provided in the input device 9, according to the first embodiment. The test of the input diagnosis circuit 205 is carried out after the diagnosis by the communication channel diagnostic unit (otherwise, will also be referred to as "bus diagnostic equipment") 41 activated in the operation sequence of FIG. 6 has been accomplished. Both the selecting switch 203 and the selecting switch 204 are connected to the sides D. A comparator 206 employed in the input diagnosis circuit 205 compares an input diagnosis-purpose signal 207 with such a signal which is produced by a program of the communication control unit 4 (S1) and then is inputted to this comparator 206 via the input/output bus 5 (communication line 2). From the program, both a coincident signal and a non-coincident signal by the comparator 206 are produced, so that such a diagnosis can be carried out by the comparator 206, which includes a check for judging whether or not an output stuck-at failure is present.

Figure 9:
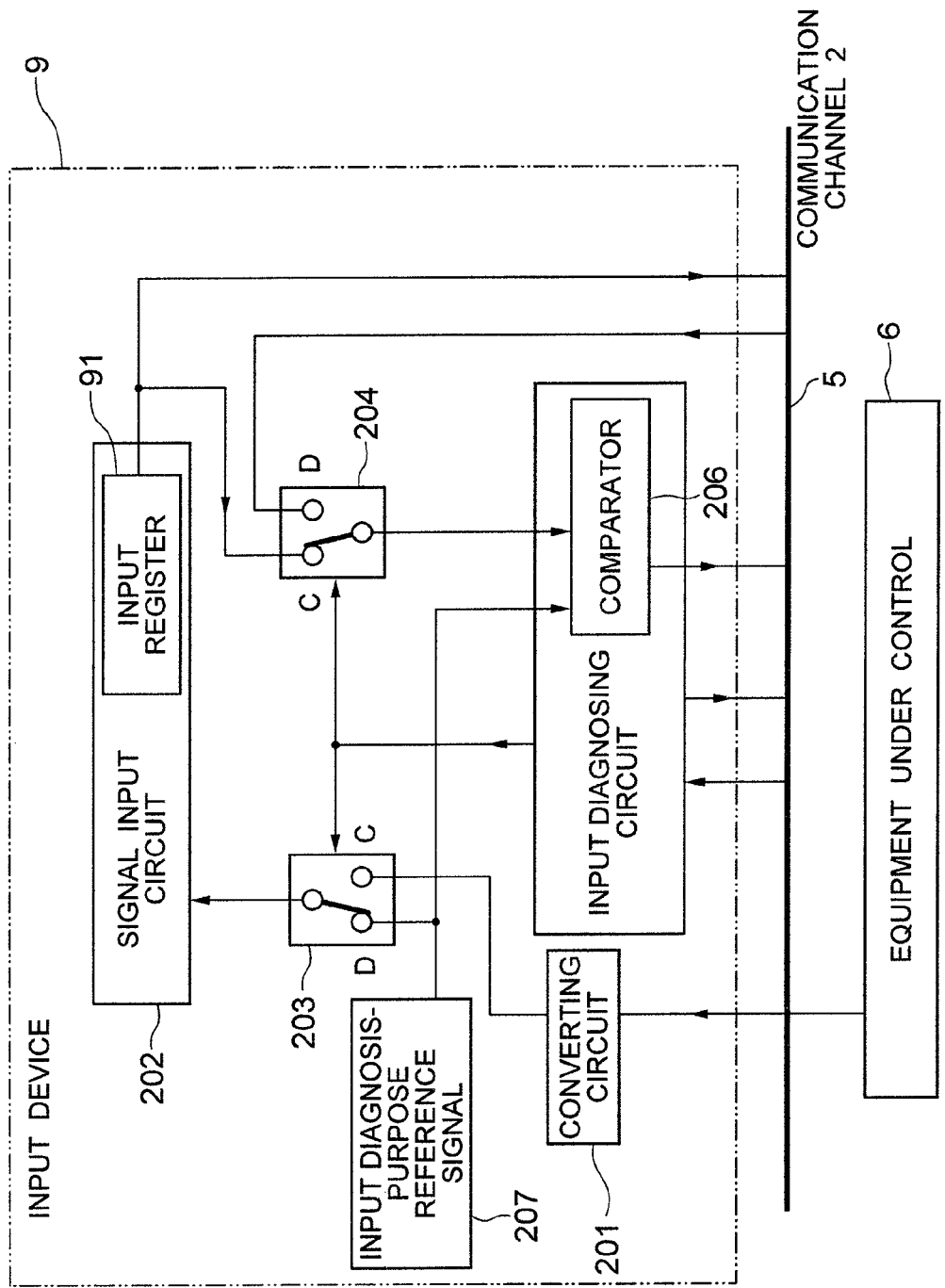
FIG. 9 is a block diagram for indicating a diagnostic operation of the input unit according to the first embodiment of the present invention.

FIG. 9 indicates an input diagnosis executed by the input diagnosis circuit 205 provided in the input device 9, according to the first embodiment. The input diagnosis is carried out after the test of FIG. 8 has been accomplished. The selecting switch 203 is connected to the side D, and the switch 204 is connected to the side C. The input diagnosis-purpose reference signal 207 and a signal derived from the input register 91 are inputted to the comparator 206 for a comparison purpose. If the input device 9 is operated under normal condition, then these signals are coincident with each other. As the input diagnosis-purpose reference signal 207, it is so arranged that a plurality of reference signals are sequentially outputted. That is to say, in the case of digital inputs, both an ON signal and an OFF signal are generated, whereas in the case of analog inputs, reference signals having a plurality of levels are generated. As a result, such a diagnosis including the output stuck-at failure of the signal input circuit 202 can be carried out.

When the test of FIG. 8 and the diagnosis of FIG. 9 are accomplished, the bit of the diagnosis operation status signal which is transmitted to the communication control unit 4 (S1) becomes "0" indicative of the normal operation status. In response to an activation instruction issued from the communication control unit 4 (S1) via the input/output bus 5 (communication channel 2), the diagnosis operation can be returned to the normal input operation.

Figure 10:
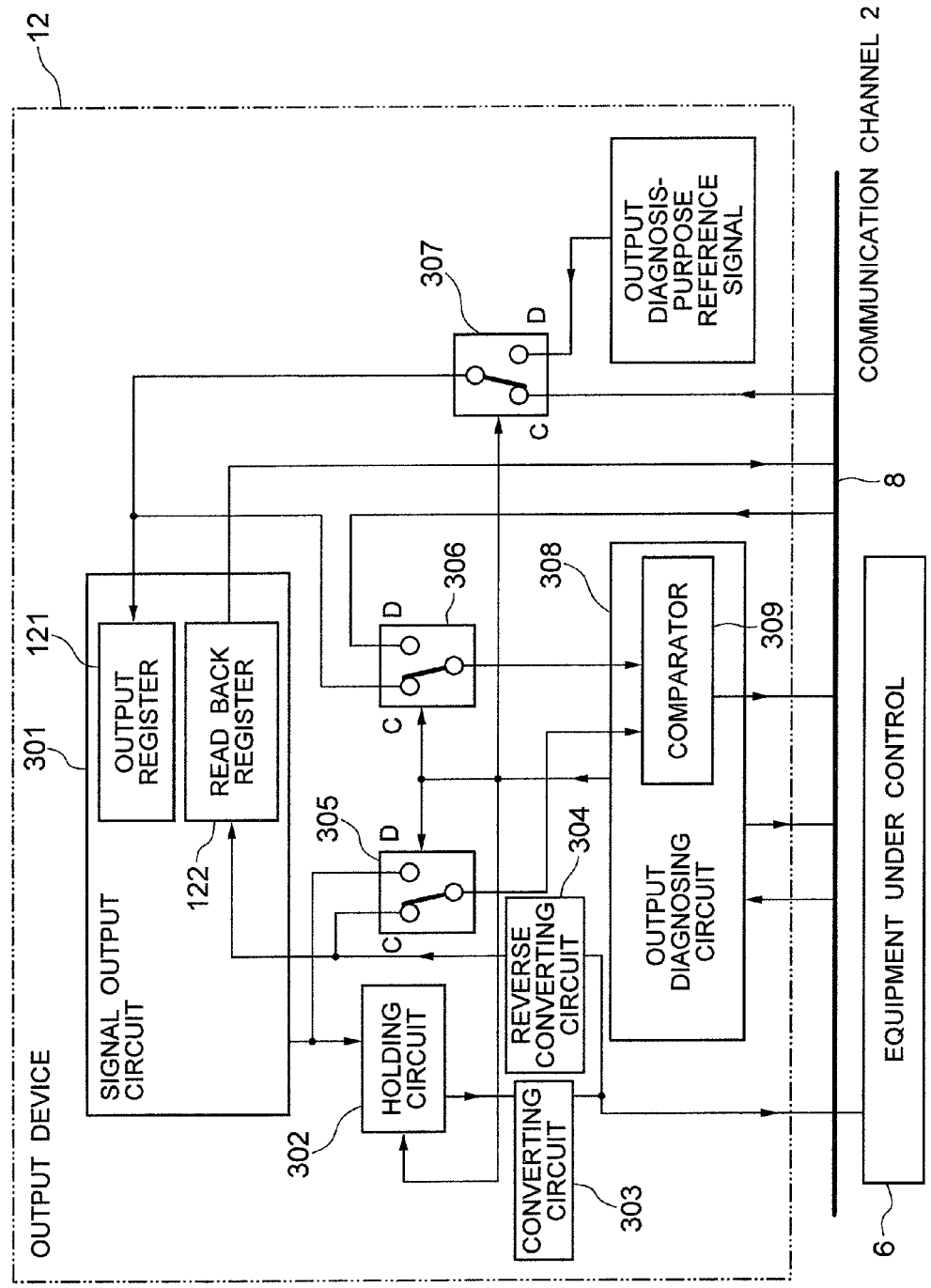
FIG. 10 is a block diagram for showing a normal input operation of the output unit according to the first embodiment of the present invention.

FIG. 10 represents an internal arrangement of the output device 12, according to the first embodiment. A memory transfer from the communication control unit 7 (S2) via the input/output bus 8 (communication channel 2) to an output register 121 employed in the signal output circuit 301 is similar to that as explained in FIG. 5. Data of the output register 121 is supplied via a data holding circuit 302 so as to be converted by a converting circuit 303, and then, the converted data is written in a read back register 122. In the above-described basic arrangement, when a normal data output operation is performed, the data holding circuit 302 is not operated, and an input signal is identical to an output signal. Also, any of selecting switches 305, 306, and 307 are connected to sides C.

Figure 11:
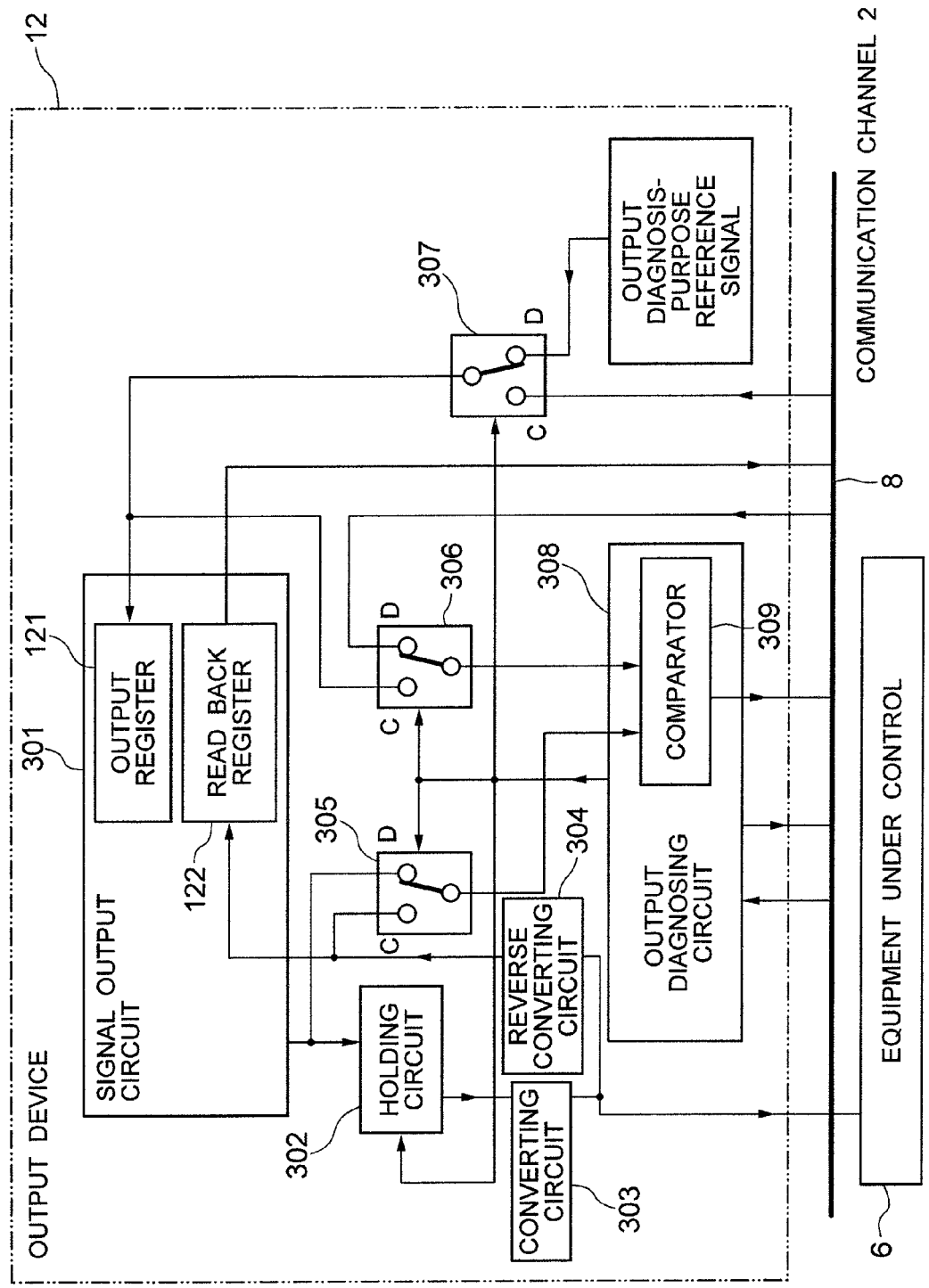
FIG. 11 is a block diagram for representing a test operation of the output unit according to the first embodiment of the present invention.

FIG. 11 shows a test of an output diagnosis circuit 308 produced in the output device 12, according to the first embodiment. The test of the output diagnosis circuit 308 is carried out after the diagnosis by the communication channel diagnostic unit 71 activated in the operation sequence of FIG. 6 has been accomplished. Any of the selecting switches 305, 306, 307 are connected to sides D. The data holding circuit 302 is switched to an operation condition so as to hold an output just before the test is carried out. A comparator 309 employed in the output diagnosis circuit 308 compares an output diagnosis-purpose signal 310 with such a signal which is produced by a program of the communication control unit 7 (S2) and then is inputted to this comparator 309 via the input/output bus 8 (communication line 2). From the program, both a coincident signal and a non-coincident signal by the comparator 309 are produced, so that such a diagnosis can be carried out by the comparator 309, which includes a check for judging whether or not an output stuck-at failure is present.

Figure 12:
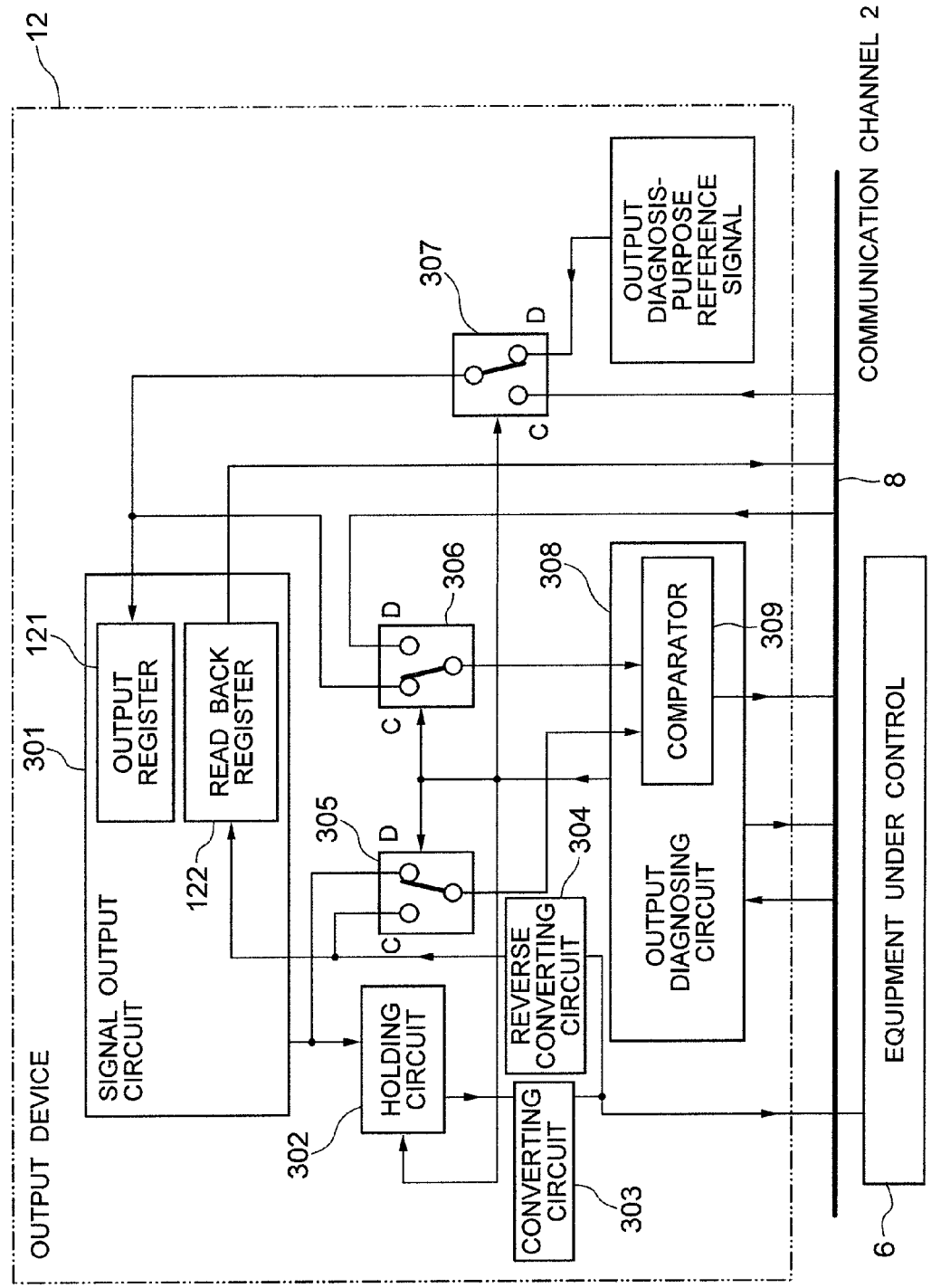
FIG. 12 is a block diagram for indicating a diagnostic operation of the output unit according to the first embodiment of the present invention.

FIG. 12 indicates an output diagnosis executed by the output diagnosis circuit 309 provided in the input device 12, according to the first embodiment. The input diagnosis is carried out after the test of FIG. 11 has been accomplished. The selecting switch 305, 307 are connected to the sides D, and the switch 306 is connected to the side C. The data holding circuit 302 continues the operation status so as to hold an output just before the test is carried out. An output diagnosis-purpose reference signal 310 and an output signal of a signal output circuit 301 which is supplied via an output register 121 are inputted to the comparator 309 for a comparison purpose. If the output device 12 is operated under normal condition, then these signals are coincident with each other. As the output diagnosis-purpose reference signal 310, it is so arranged that a plurality of reference signals are sequentially outputted. That is to say, in the case of digital inputs, both an ON signal and an OFF signal are generated, whereas in the case of analog inputs, reference signals having a plurality of levels are generated. As a result, such a diagnosis including the output stuck-at failure of the signal output circuit 301 can be carried out.

When the test of FIG. 11 and the diagnosis of FIG. 12 are accomplished, the bit of the diagnosis operation status signal which is transmitted to the communication control unit 7 (S2) becomes "0" indicative of the normal operation status. In response to an activation instruction issued from the communication control unit 7 (S2) via the input/output bus 8 (communication channel 2), the diagnosis operation can be returned to the normal input operation.

In accordance with the first embodiment shown in FIG. 7 to FIG. 12, subsequent to the diagnosis of the input/output bus, both the input device and the output device are tested and diagnosed, so that the input unit and output unit can be diagnosed without deteriorating the control performance. Also, the plurality of input devices and the plurality of output devices can be tested and diagnosed based upon the programs which are executed by the communication control unit 4 (S1) and the communication control unit 7 (S2). As a consequence, it is not required to provide diagnose-purpose microprocessors in the respective input devices and the respective output devices.

Second Embodiment

Figure 13:
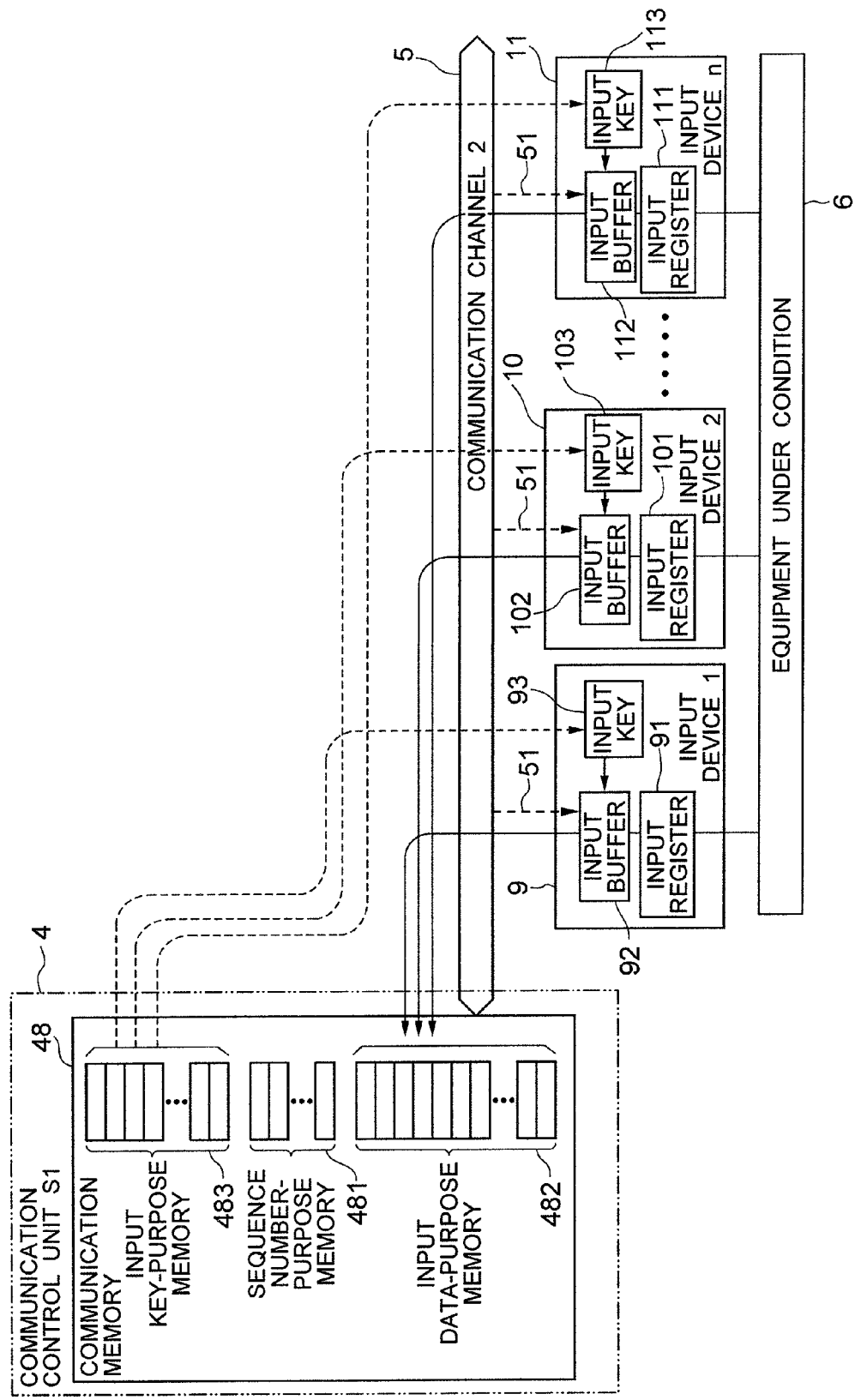
FIG. 13 is a block diagram for showing an arrangement of an input unit according to a second embodiment of the present invention.

FIG. 13 indicates a control apparatus according to a second embodiment of the present invention. It should be understood that the same reference numerals shown in FIG. 4 will be employed as those for denoting the same, or similar structural elements of FIG. 13, and descriptions thereof are omitted.

An input key-purpose memory region 483 is provided in the communication memory 48 of the communication control unit 4 (S1). Next, a description is made of input keys.

Configuration information of the control apparatus contains information for indicating whether or not the communication control unit 4 (S1) and the communication control unit 7 (S2) are connected; and both sorts and sequences of the input devices 9, 10, 11 (1 to n), and the output devices 12, 13, 14 (1 to m), which are connected to these communication control units 4 (S1) and 7 (S2). In the second embodiment of the present invention, combinations of such devices among the input devices 9, 10, 11 (1 to n), into which data are wanted to be simultaneously inputted from the equipment under control 6, are also added to the configuration information. This information is indicated by a combination between an input key and a device address. When the control apparatus is initiated, the information is written via the control bus 2 (communication channel 1) into the input key-purpose memory region 483 of the communication control unit 4 (S1). Furthermore, among the input keys 93, 103, 113 (1 to n) which are provided in the respective input devices 9, 10, 11 (1 to n) via the input/output bus 5 (communication channel 2), statuses of input keys of such input devices which are wanted to be entered are set to "opens." When the control apparatus is activated after the control apparatus has been set to the above-described statuses, if an input freeze signal line 51 added to the input/output bus 5 (communication channel 2) becomes a level "H", then only such an input device that an input key is under open status among the input buffers 92, 102, 112 (1 to n) provided in the respective input devices 9, 10, 11 (1 to n) stops updating of data input from the input registers 91, 101, and 111 (1 to n), and also, outputs such a data whose level is kept constant to the input/output bus 5 (communication channel 2). When the level of the input freeze signal line 51 becomes a level "L", the input buffers 92, 102, 112 (1 to n) of the input devices where the input keys are under open statuses also restart the data inputs from the input registers 91, 101, 111 (1 to n), and thus, directly output the data from the input registers 91, 101, 111 (1 to n) to the input/output bus 5 (communication channel 2).

Figure 14:
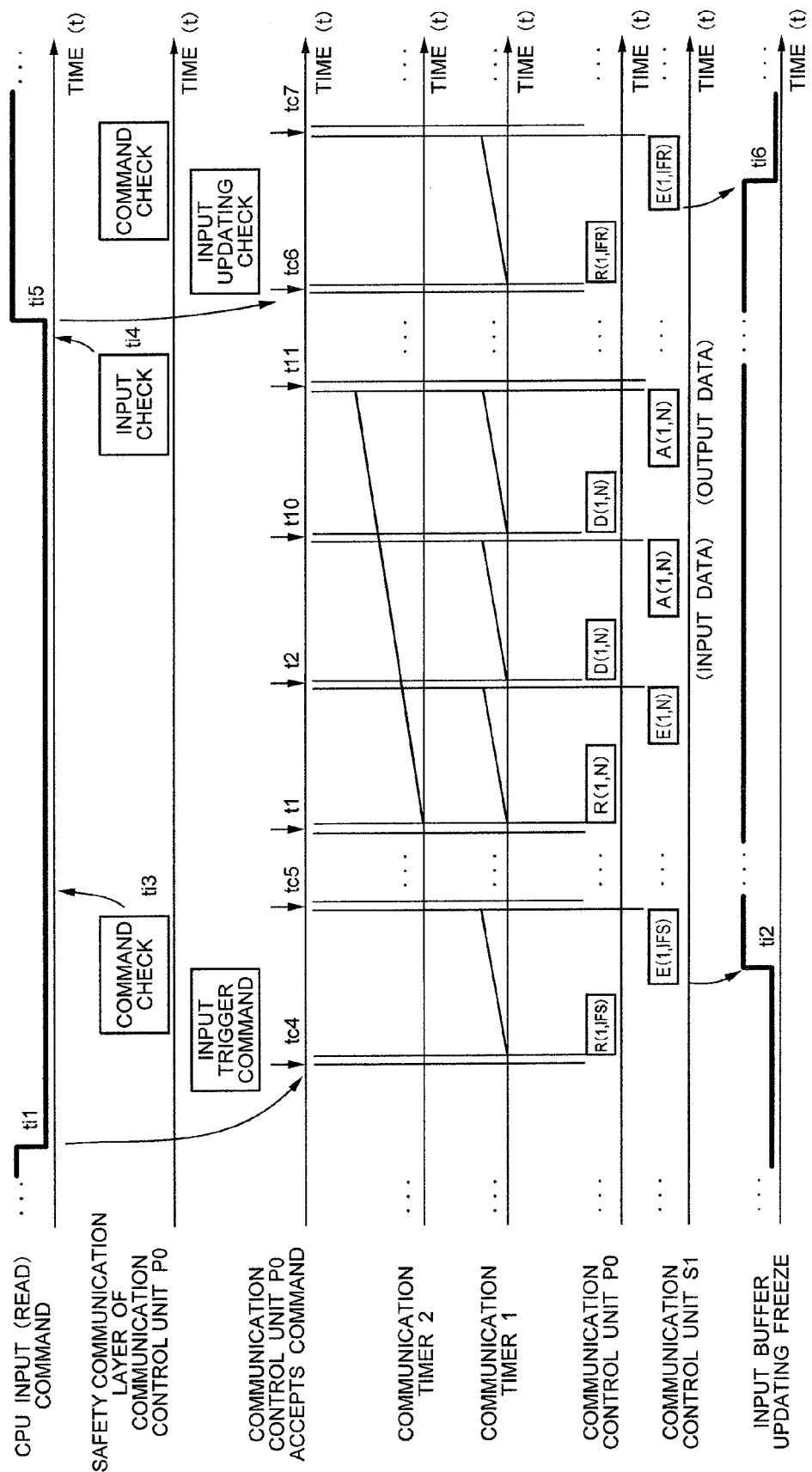
FIG. 14 is a time chart for representing an input operation according to the second embodiment of the present invention.

FIG. 14 indicates operation sequences for permitting/stopping data updating operations with respect to the input buffers 92, 102, 112 (1 to n) via the control bus 2 (communication channel 1) and the input/output bus 5 (communication channel 2).

Among data strings and symbols of time instants shown in the drawing, the same names imply the same contents as those shown in FIG. 3 and FIG. 6, and descriptions thereof are omitted.

At a time "ti1", when an input command of the central processing unit 1 (CPU) is changed to a level "L", an input trigger command "R (1, IES)" is transferred as an interrupt at a time instant "tc4" when the communication control unit 3 (P0) accepts a communication command.

[Expression 19]

$$R(1, \text{IFS}) = \left( \begin{array}{|c|c|c|c|c|} \hline \text{Command} & \text{Send Key} & \text{Rcv. Key} & \text{Input Key} & \text{Input Device} \\ \hline \text{IFS} & \#0 & \#1 & (\text{IKey}) & (\text{Dev}) \\ \hline \end{array} \right) \quad (19)$$

IFS: Input Freeze Start

The input trigger command R (1, IFS) contains a combined input key (IKey) and a device address (Dev) of a device, which are wanted to be inputted. The device address constitutes the n-bit ON/OFF data in the first embodiment of FIG. 1; for instance, when the device address is inputted from the input device 1, data of a first bit is transferred as 1, whereas when the device address is not inputted from the input device 2, data of a second bit is transferred as 0. These data have been previously written as the configuration information into the communication memory 48 of the communication control unit 4 (S1). However, every time these data are transferred, the transferred data are compared with each other, so that reliability can be increased.

The communication control unit 4 (S1) recognizes that an instruction is issued for the own equipment, and transfers an echo "E (1, IFS)."

[Expression 20]

$$E(1, \text{IFS}) = \left( \begin{array}{|c|c|c|c|c|} \hline \text{Command} & \text{Send Key} & \text{Rcv. Key} & \text{Input Key} & \text{Input Device} \\ \hline \text{IFS} & \#1 & \#0 & (\text{IKey}) & (\text{Dev}) \\ \hline \end{array} \right) \quad (20)$$

Also, the communication control unit 4 (S1) sets the input freeze signal line 51 of the input/output bus 5 (communication channel 2) to a level H. As a result, the input buffers 92, 102, 112 (1 to n) of such input devices that input keys are under open statuses stop data input updating operation, and output the data kept constant to the input/output bus 5 (communication channel 2).

In the second embodiment of FIG. 14, the control apparatus is arranged as follows: That, in a safety communication layer provided in the communication control unit 3 (P0), the input trigger command "R (1, IFS)" is compared with the echo command "E (1, IFS)." Assuming now that an abnormal condition occurs, an input update command R (1, IFR) (will be discussed later) is issued, and thus, updating operation of the input buffer is restarted.

Thereafter, at time instants t1 and t2, the input data is transferred from the communication control unit 4 (S1) to the communication control unit 3 (P0).

In the second embodiment of FIG. 14, at a time instant t10, the input data is again transmitted, and the input data are compared with each other 2 times in the safety communication layer in order to increase the safety characteristic of the data. When the input data comparison is accomphed at a time instant "ti14", a data input completion signal is transferred to the central processing unit 1 (CPU).

Thereafter, at a time "ti5", when an input command of the central processing unit 1 (CPU) is changed to a level "H", an input update command "R (1, IFR)" is transferred as an interrupt at a time instant "tc6" when the communication control unit 3 (P0) accepts a communication command.

[Expression 21]

$$R(1, \text{IFR}) = \left( \begin{array}{|c|c|c|c|c|} \hline \text{Command} & \text{Send Key} & \text{Rcv. Key} & \text{Input Key} & \text{Input Device} \\ \hline \text{IFR} & \#0 & \#1 & (\text{IKey}) & (\text{Dev}) \\ \hline \end{array} \right) \quad (21)$$

IFR: Input Freeze Release

The input update command R (1, IFR) contains a device address (Dev) at which updating operation of an input buffer is wanted to be restarted.

The communication control unit 4 (S1) recognizes that an instruction is issued for the own equipment, and transfers an echo "E (1, IFS)."

[Expression 22]

$$E(1, IFR) = \begin{pmatrix} \text{Command} & \text{Send Key} & \text{Rcv. Key} & \text{Input Key} & \text{Input Device} \\ \text{IFR} & \#1 & \#0 & (\text{IKey}) & (\text{Dev}) \end{pmatrix} \quad (22)$$

Also, the communication control unit 4 (S1) sets the input freeze signal line 51 of the input/output bus 5 (communication channel 2) to a level L. As a result, the input buffers 92, 102, 112 (1 to n) of such input devices that input keys are under open statuses restart data input updating operation, and directly output the data of the input registers 91, 101, 111 (1 to n) to the input/output bus 5 (communication channel 2).

In accordance with the above-described operation sequences, the input trigger command of the central processing unit 1 (CPU) is transferred via the control bus 2 (communication channel 1) and the input/output bus 5 (communication channel 2) to the input unit so as to stop/permit the data updating operations of the input buffers. As a result, the data can be inputted at the same time with having a minimum delay from the input trigger command.

Also, subsequent to the input updating command R (1, IFR), at a time instant "tc7", the bus diagnosis command R (1, BD) of FIG. 6 is transferred. As a consequence, the input/output bus 5 (communication channel 2), and the input devices 9, 10, 11 (1 to n) can be tested and diagnosed at such a timing that an influence given to the control performance becomes the smallest value.

Third Embodiment

Figure 15:
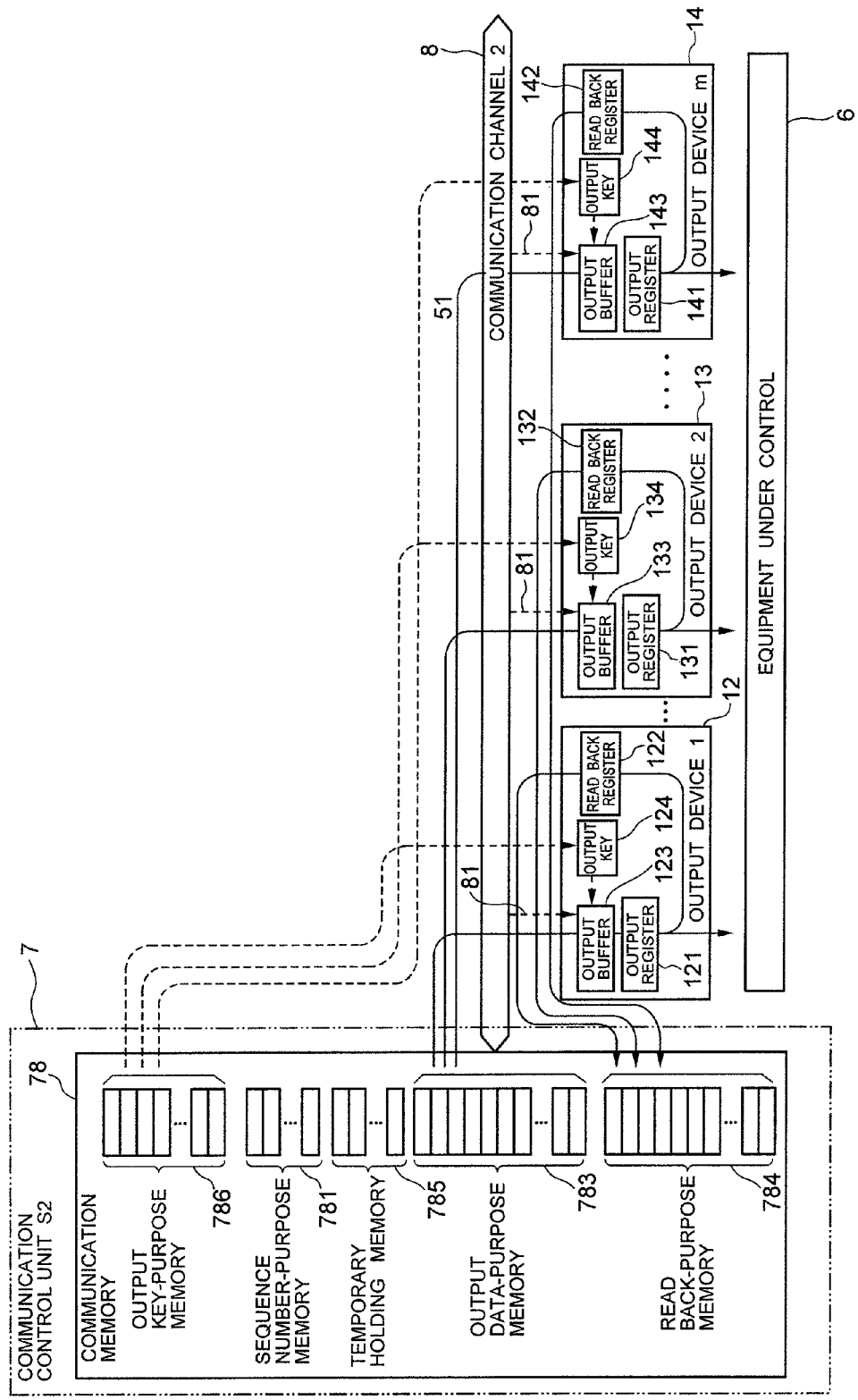
FIG. 15 is a block diagram for indicating an arrangement of an output unit according to a third embodiment of the present invention.

FIG. 15 indicates a control apparatus according to a third embodiment of the present invention. It should be understood that the same reference numerals shown in FIG. 5 will be employed as those for denoting the same, or similar structural elements of FIG. 15, and descriptions thereof are omitted.

An output key-purpose memory region 786 is provided in the communication memory 48 of the communication control unit 7 (S2). Next, a description is made of output keys. In addition to basic configuration information of the control apparatus, combinations of output devices among the output devices 12, 13, 14 (1 to m), which are wanted to be outputted at the same time to the equipment under control 6, are added to the configuration information. This information is indicated by a combination between an output key and a device address. When the control apparatus is initiated, the information is written via the control bus 2 (communication channel 1) into the output key-purpose memory region 786 of the communication control unit 7 (S2). Furthermore, among the output keys 124, 134, 144 (1 to m) which are provided in the respective output devices 12, 13, 14 (1 to m) via the input/output bus 8 (communication channel 2), statuses of output keys of such output devices which are wanted to be entered are set to "opens." When the control apparatus is activated after the control apparatus has been set to the above-described statuses, if an output freeze signal line 81 added to the input/output bus 5 (communication channel 2) becomes a level "H", then only such an output device that an output key is under open status among the output buffers 123, 133, 143 (1 to m) provided in the respective output devices 12, 13, 14 (1 to m) stops updating operation of data output to the output registers 121, 131, 141 (1 to m), and also, outputs such a data whose level is kept constant to the equipment under control 6. It should also be understood that the output buffers 123, 133, 143 (1 to m) themselves are continuously updated from the output data memory region 783 via the input/output bus 8 (communication channel 2). When the level of the data output freeze signal line 81 becomes a level "L", the output registers 121, 131, 141 (1 to m) of the output devices where the output keys are under open statuses also restart the data updating operations from the output buffers 123, 133, 143 (1 to m), and thus, directly outputs the data of the output data memory region 783 to the equipment under control 6.

Figure 16:
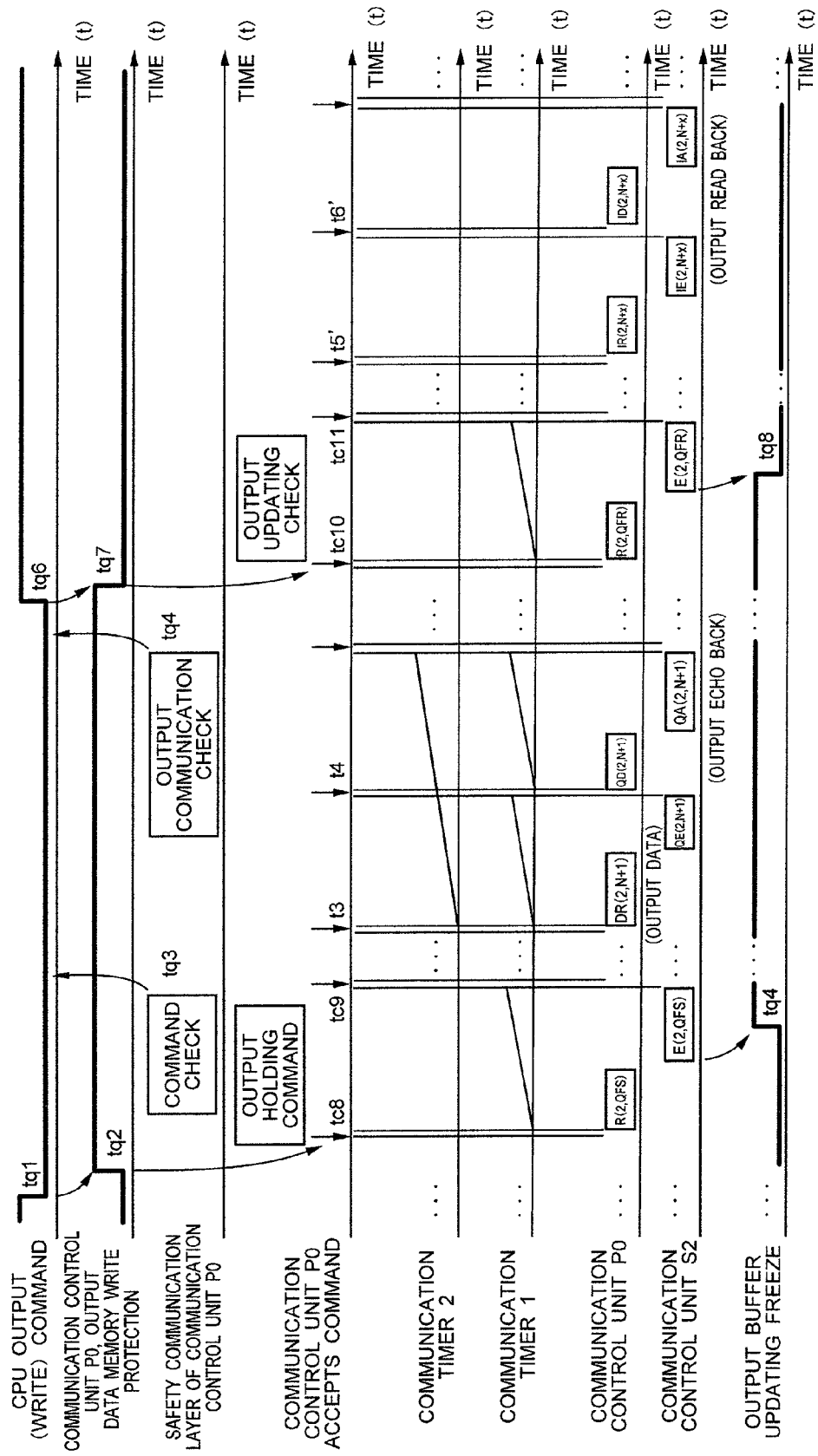
FIG. 16 is a time chart for representing an output operation according to the third embodiment of the present invention.

FIG. 16 indicates operation sequences for permitting/holding data updating with respect to the output buffers 123, 133, 143 (1 to m) via the control bus 2 (communication channel 1) and the input/output bus 5 (communication channel 2).

Among data strings and symbols of time instants shown in the drawing, the same names imply the same contents as those shown in FIG. 3 and FIG. 6, and descriptions thereof are omitted.

At a time instant "tq1", when an output command of the central processing unit 1 (CPU) is changed to a level L, a write protection of the communication control unit 3 (P0) via a parallel transfer bus 0 (communication channel 0) becomes valid (level H). As a result, writing of data into the relevant memory region within the output data memory region 383 of the communication memory 38 can be protected. Next, at a time instant "tc8" when the communication control unit 3 (P0) accepts a communication command, an output trigger command "R (2, QFS)" is transferred as an interrupt.

[Expression 23]

$$R(2, QFS) = \begin{pmatrix} \text{Command} & \text{Send Key} & \text{Rcv. Key} & \text{Input Key} & \text{Input Device} \\ \text{QFS} & \#0 & \#2 & (\text{QKey}) & (\text{Dev}) \end{pmatrix} \quad (23)$$

QFS: Output Freeze Start

The output trigger command R (2, QFS) contains a combined output key (QKey) and a device address (Dev) of a device, which are wanted to be simultaneously outputted. The device address constitutes the m-bit ON/OFF data in the first embodiment of FIG. 1; for instance, when the device address is inputted from the output device 1, data of a first bit is transferred as 1, whereas when the device address is not inputted from the input device 2, data of a second bit is transferred as 0. These data have been previously written as the configuration information into the communication memory 78 of the communication control unit 7 (S2). However, every time these data are transferred, the transferred data are compared with each other, so that reliability can be increased.

The communication control unit 7 (S2) recognizes that an instruction is issued for the own equipment, and transfers an echo "E (2, QFS)."

[Expression 24]

$$E(2, QFS) = \begin{pmatrix} \text{Command} & \text{Send Key} & \text{Rcv. Key} & \text{Output Key} & \text{Input Device} \\ \text{QFS} & \#2 & \#0 & \text{(QKey)} & \text{(Dev)} \end{pmatrix} \quad (24)$$

Also, the communication control unit 7 (S2) sets the output freeze signal line 81 of the input/output bus 8 (communication channel 2) to a level H. As a result, the output buffers 123, 133, 143 (1 to m) of such output devices that output keys are under open statuses stop data output updating operation, and output the data kept constant to the equipment under control 6.

In the third embodiment of FIG. 16, a control apparatus is arranged as follows: That, in a safety communication layer provided in the communication control unit 3 (P0), the output trigger command "R (2, QFS)" is compared with the echo command "E (2, QFR)." Assuming now that an abnormal condition occurs, an output update command R (2, QFR) (will be discussed later) is issued, and thus, updating of the output buffer is restarted.

Thereafter, at time instant t3 and t4, the output data is transferred from the communication control unit 3 (P0) to the communication control unit 7 (S2).

In the third embodiment of FIG. 14, at a time instant "tq5", the output data is compared with the output echo back so as to increase the safety characteristic of the data. When the input/output data comparison is accomplished, at a time instant "tq4", an output data completion signal is transferred to the central processing unit 1 (CPU).

Thereafter, at a time instant "tq6", when an output command of the central processing unit 1 (CPU) is changed to a level H, the write protection of the communication control unit 3 (P0) is released (namely, level L) at a time instant "tc7." Also, an output update command "R (2, QFR)" is transferred as an interrupt at a time instant "tc10" when the communication control unit 3 (P0) accepts a communication command.

[Expression 25]

$$R(2, QFR) = \begin{pmatrix} \text{Command} & \text{Send Key} & \text{Rcv. Key} & \text{Output Key} & \text{Input Device} \\ \text{QFR} & \#0 & \#2 & \text{(QKey)} & \text{(Dev)} \end{pmatrix} \quad (25)$$

QFR: Output Freeze Release

The output update command R (2, QFR) contains a device address (Dev) at which updating operation of an output buffer is wanted to be restarted.

The communication control unit 7 (S2) recognizes that an instruction is issued for the own equipment, and transfers an echo "E (2, QFR)."

[Expression 26]

$$E(2, QFR) = \begin{pmatrix} \text{Command} & \text{Send Key} & \text{Rcv. Key} & \text{Output Key} & \text{Input Device} \\ \text{QFR} & \#2 & \#0 & \text{(QKey)} & \text{(Dev)} \end{pmatrix} \quad (26)$$

Also, the communication control unit 7 (S2) sets the output freeze signal line 81 of the input/output bus 8 (communication channel 2) to a level L. As a result, the communication control unit 7 (S2) restarts output updating operations of the output buffers 123, 133, 143 (1 to m) of such output devices that output keys are under open statuses, and directly outputs the output data via the output registers 121, 131, 141 (1 to m) to the equipment under control 6.

In accordance with the above-described operation sequences, the output trigger command of the central processing unit 1 (CPU) is transferred via the control bus 2 (communication channel 1) and the input/output bus 8 (communication channel 2) to the output unit so as to stop/permit the output updating operations of the output buffers. As a result, the data can be outputted at the same time with having a minimum delay from the output trigger command.

Also, subsequent to the output updating command R (2, QFR), at a time instant "tc11", the bus diagnosis command R (2, BD) of FIG. 6 is transferred. As a consequence, the input/output bus 8 (communication channel 2), and the respective output devices 12, 13, 14 (1 to m) can be tested and diagnosed at such a timing that an influence given to the control performance becomes the smallest value. In this case, the reading time instant "t5'" and "t6'" of the output read back succeed the time instant "tc11." The result of the output read back constitutes the data of the preceding time period. However, in accordance with this system, programming can be executed by the central processing unit 1 (CPU) without paying an attention to the data input timing.

Fourth Embodiment

Figure 17:
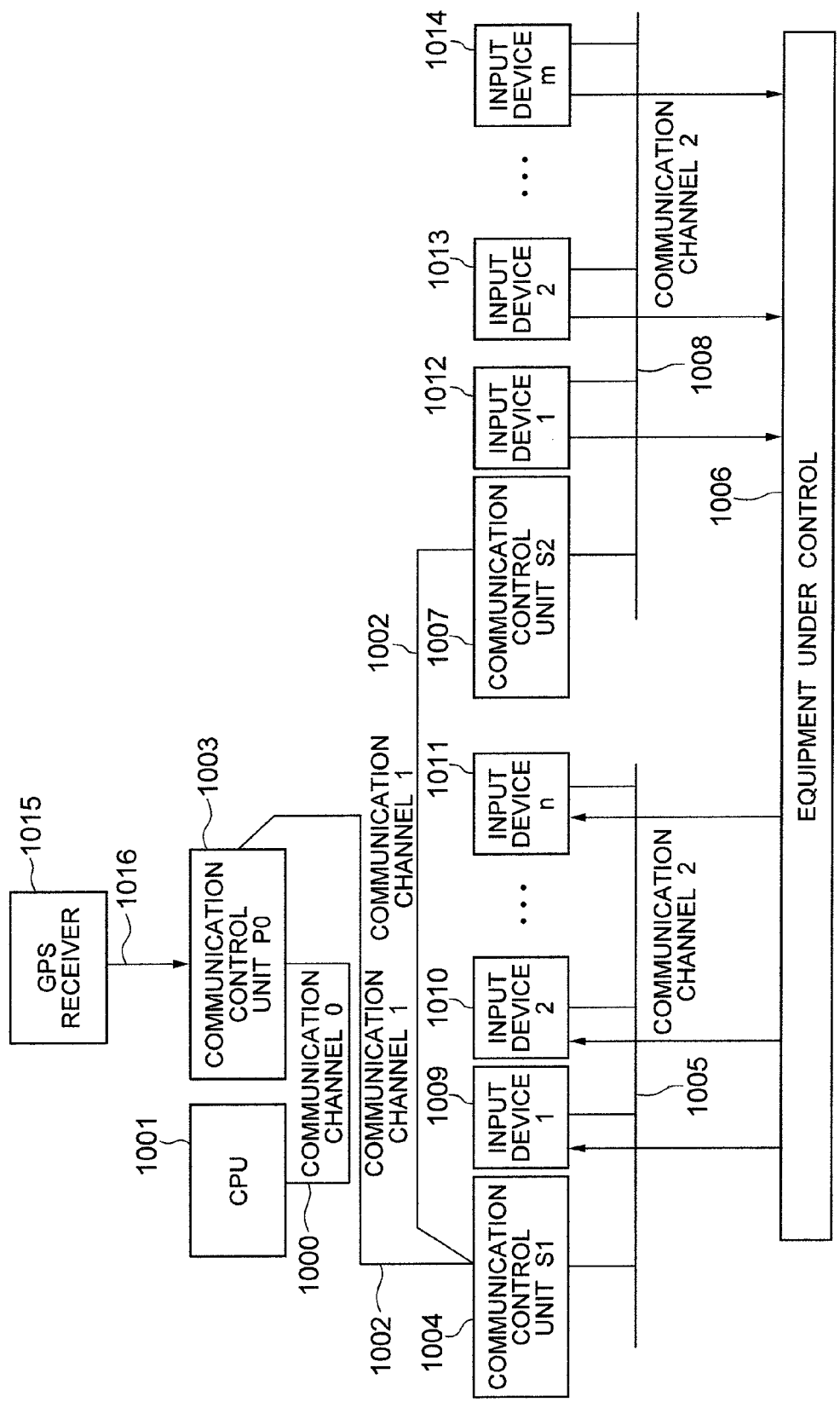
FIG. 17 is a block diagram for showing an arrangement of a control apparatus according to a fourth embodiment of the present invention.

A control apparatus according to a fourth embodiment of the present invention is indicated in FIG. 17. A central processing unit (CPU) 1001 is connected via a parallel transfer bus 1000 (communication channel "0") to a communication control unit 1003 ("P0"). The communication control unit 1003 ("P0") transmits and/or receives data via a control bus 1002 (communication channel "1") using a serial transfer operation with respect to a communication control unit 1004 ("S1"), and another communication control unit 1007 ("S2").

The communication control unit 1004 ("S1") and an input unit transmit and/or receive input data and a control signal supplied from an equipment under control 1006 via an input/output bus 1005 (communication channel "2") using a parallel transfer operation. The communication control unit 1007 ("S2") and an output unit transmit and/or receive input data and a control signal to be supplied to the equipment under control 1006 via an input/output bus 1008 (communication channel "2") using a parallel transfer operation.

The input unit is constituted by "n" pieces of input devices 1009, 1010, and 1011 (1 to n). The respective input devices transmit and/or receive input data from the equipment under control 1006 via the input/output bus 1005 (communication channel 2) with respect to the communication control unit 1004 (S1). Similarly, the output unit is constituted by "m" pieces of output devices 1012, 1013, and 1014 (1 to m). The respective output devices transmit and/or receive output data to the equipment under control 1006 via the input/output bus 1008 (communication channel 2) with respect to the communication control unit 1007 (S2).

Both the communication control unit 1003 (P0) and a GPS (Global Positioning System) unit 1015 transmit/receive a reference time instant via a reference time instant signal 1016.

Figure 18:
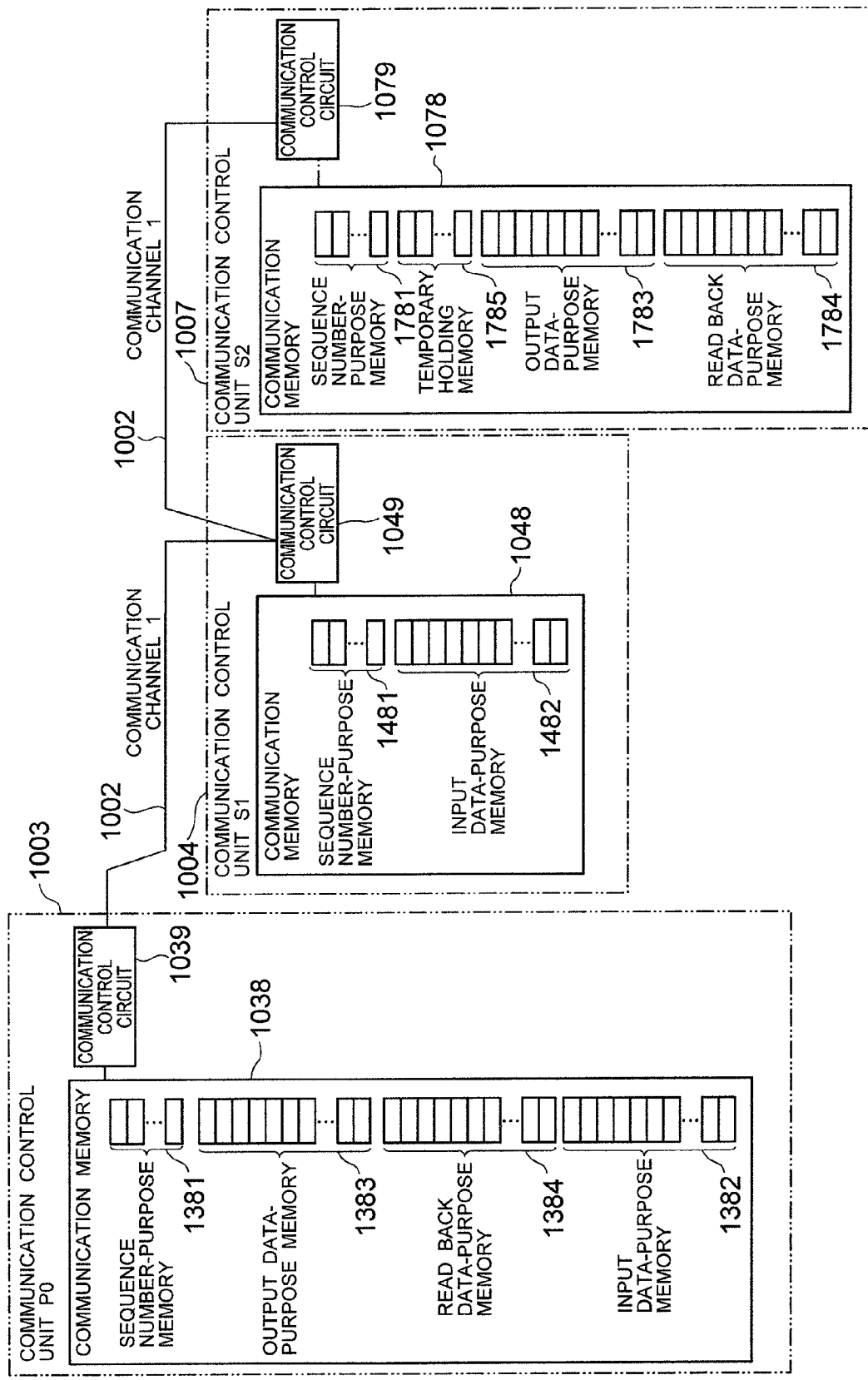
FIG. 18 is a block diagram for representing a path of control bus (communication channel 1) transmission/reception data of the fourth embodiment of the present invention.

FIG. 18 indicates a path of data transmitted/received between the communication control unit 1003 (P0) and the communication control units 1004 (S1) and 1007 (S2) via the control bus 1002 (communication channel 1) using the serial transfer operation. With respect to a communication memory 1038 provided in the communication control unit 1003 (P0), regions used for a sequence number-purpose memory 1381, an input data-purpose memory 1382, an output data-purpose memory 1383, and a read back data-purpose memory 1344 are allocated. Data stored in the communication memory 1038 is parallel/serial-converted by a communication control circuit 1039, and then, parallel/serial-converted data is transferred via the control bus 1002 (communication channel 1) between communication memories 1048 and 1078 of the communication control units 1004 (S1) and 1007 (S2).

With respect to the communication memory 1048 employed in the communication control unit 1004 (S1), regions used for a sequence number-purpose memory 1481 and an input data-purpose memory 1482 are allocated. Data of the input data-purpose memory 1482 within the communication memory 1048 is parallel/serial-converted by a communication control circuit 1049, and then, the parallel/serial-converted data is mapped to the input data-purpose memory region 1382 of the communication memory 1038 of the communication control unit 1003 (P0) via the control bus 1002 (communication channel 1).

With respect to the communication memory 1078 provided in the communication control unit 1007 (S2), regions used for a sequence number-purpose memory 1781, an output data-purpose memory 1781, a read back data-purpose memory 1784, and a temporary holding memory 1785 are allocated. Data stored in the output data-purpose memory region 1383 of the communication memory 1038 of the communication control device 1003 (P0) is parallel/serial-converted by the communication control circuit 1079, and then, the parallel/serial-converted data is transferred via the control bus 1002 (communication line 1) to the temporary holding memory 1785 of the communication memory 1078. Data stored in the temporary holding memory 1785 is transferred to the output data-purpose memory 1783 after such a confirmation is made that a communication between the communication control units 1003 (P0) and 1007 (S2) is normal. Data stored in the read back data-purpose memory 1784 is transferred to the read back-purpose memory 1384 of the communication control unit 1003 (P0).

Figure 19:
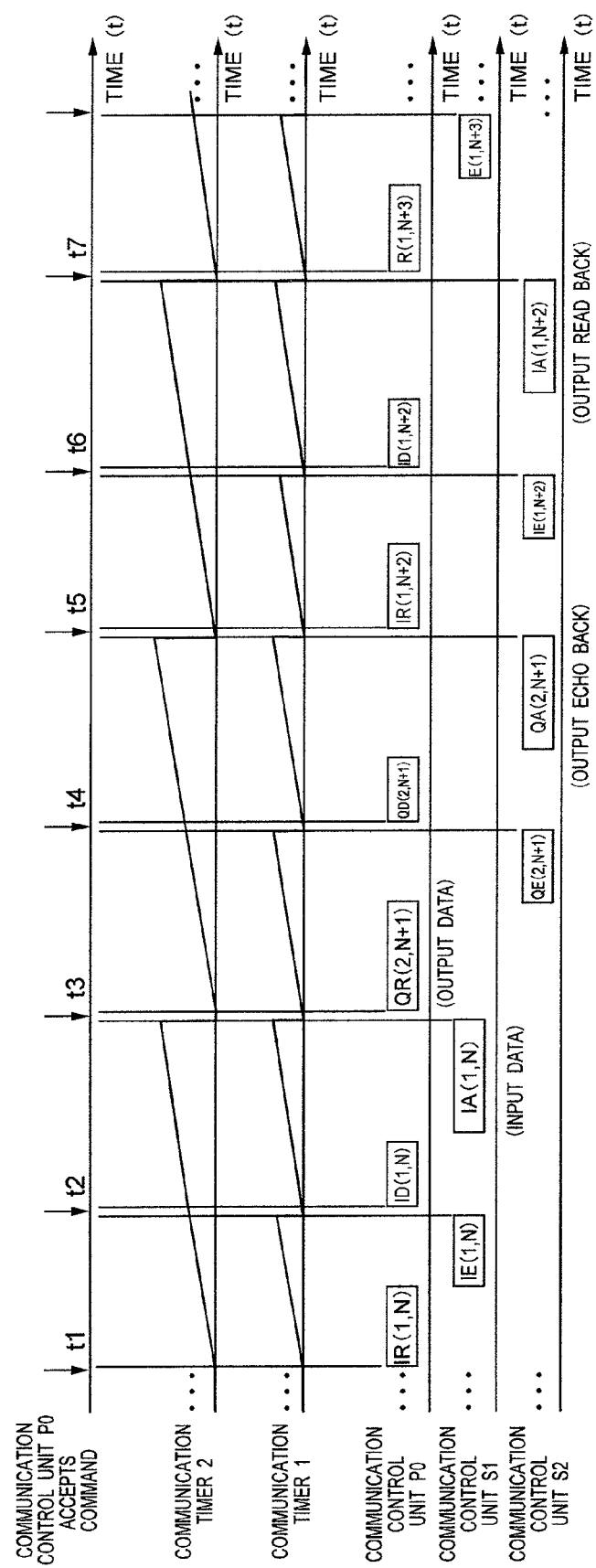
FIG. 19 is a time chart for representing operations as to the control bus (communication channel 1) transmission/reception data of the fourth embodiment of the present invention.

FIG. 19 indicates a data communication operation sequence executed among the communication control units 1003 (P0), 1004 (S1), and 1007 (S2) via the control bus 1002 (communication channel 1).

At a time "t1", an input request "IR (1, N)" is outputted from the communication control unit 1003 (P0) to the communication control unit 1004 (S1) to the control bus 1002 (communication channel 1).

[Expression 27]

$$IR(1, N) = \left( \begin{array}{|c|c|c|c|c|c|} \hline \text{Command} & \text{Send Key} & \text{Rcv. Key} & \text{Seq. No.} & \text{Dev. Adr.} & \text{Data Size.} \\ \hline IR & \#0 & \#1 & \#(N) & (DA) & (DS) \\ \hline \end{array} \right) \quad (27)$$

The input request IR (1, N) is made of a data string as to a send key (SendKey=0) corresponding to a sender number 0; a receive key (Rcv.Key=1) corresponding to a receiver number 1; a sequence number (Seq.No.=N) used to confirm a transfer data sequence; input device information (Dev.Adr.) of a transfer destination from the communication control unit 1004 (S1); and an input data size (DataSize). In addition, both a start flag and an end flag which are commonly used even in any transfer data are added to a head portion and a tail portion of a data string. However, for the sake of simplicity, indications of these flags are omitted. In this case, the input device information (Dev.Adr.) constitutes n-bit ON/OFF data in the first embodiment shown in FIG. 14. For instance, when the input device information is inputted from the input device 1001, the n-bit ON/OFF data is transferred while first bit data is set to "1", whereas when the input device information is not inputted from the input device 1002, the n-bit ON/OFF data is transferred while second bit data is set to "0."

The communication control unit 1004 (S1) recognizes that a request is issued for the own equipment based upon the receive key (Rev.Key=1) of the input request IR (1, N), and then, outputs an input request echo IE (I, N) to the control bus 1002 (communication line 1).

[Expression 28]

$$IE(1, N) = \left( \begin{array}{|c|c|c|c|} \hline \text{Command} & \text{Send Key} & \text{Rcv. Key} & \text{Seq. No.} \\ \hline IR & \#1 & \#0 & \#(N) \\ \hline \end{array} \right) \quad (28)$$

The input request echo IE (1, N) is constituted by a data string as to an input request echo command (IE), a send key (SendKey=1) corresponds to a sender number 1, a receive key (Rcv.Key=0) corresponds to a receiver number 0, and a sequence number (Seq.No.=N) used to confirm a transfer data sequence.

The communication control unit 1003 (P0) confirms that the input request IR (1, N) has been transferred to the communication control unit 1004 (S1) under normal condition by checking that the send key and the receive key of the input request echo IE (1, N) are reversed to those of the input request IR (1, N), and the sequence number (Seq.No.=N) thereof is not changed.

As previously explained, the reversed send key and the reversed receive key are used in order to monitor a camouflage (masquerade) of a communication. Also, a time out of a transfer operation is monitored by a communication timer 1 which is operated by sending the input request IR (1, N) and receiving the input request echo IE (1, N).

At a time instant "t2", an input access request ID (1, N) from the communication control unit 1003 (P0) to the communication control unit 1004 (S1) is outputted to the control bus 1002 (communication channel 1).

[Expression 29]

$$ID(1, N) = \begin{pmatrix} \text{Command} & \text{Send Key} & \text{Rcv. Key} & \text{Seq. No.} \\ \hline IA & \#0 & \#1 & \#(N) \end{pmatrix} \quad (29)$$

The input access request ID (1, N) is constituted by a data string as to an input request echo command (IA), a send key (SendKey=0) corresponds to a sender number 0, a receive key (Rcv.Key=1) corresponding to a receiver number 1, and a sequence number (Seq.No=N) used to confirm a transfer data sequence.

The communication control unit 1004 (S1) recognizes that a request is issued for the own equipment based upon the receive key (Rcv.Key=1) of the input access request ID (1, N), and outputs an input access data IA (1, N) read out from the input data-purpose memory 1482 to the control bus 1002 (communication channel 1).

The input access data IA (1, N) is constituted by such a data string. That is, the data string is made by an input access request command (IA), a send key (SendKey=1) corresponding to a sender number 1, a receive key (Rcv.Key=0) corresponding to a receiver number 0, a sequence number (Seq.No.=N) for confirming a transfer data sequence, input device information (Dev.Adr.) and an input data size (DataSize) equal to the input request IR (1, N), and finally, input data (InputData).

[Expression 30]

$$IA(1, N) = \begin{pmatrix} \text{Com-} & \text{Send} & \text{Rcv.} & \text{Seq.} & \text{Dev.} & \text{Data} & \text{Input} \\ \text{mand} & \text{Key} & \text{Key} & \text{No.} & \text{Adr.} & \text{Size.} & \text{Data} \\ \hline IA & \#1 & \#0 & \#(N) & (DA) & (DS) & (Data) \end{pmatrix} \quad (30)$$

The communication control unit 1003 (P0) confirms the send key and the receive key, the sequence number (Seq.No.=N), the input device information (Dev.Adr.), the input data size (DataSize) of the input access data IA (1, N).

When a confirmation result is normal, the input data (InputData) is written in the input data-purpose memory 11382 employed in the communication control unit 1003 (P0). The sequence number is counted up to become (Seq.No.=N+1). The central processing unit 1001 (CPU) can read the input data from the input data-purpose memory 1382 at timing controlled by a program.

During the above-described process operation, the communication timer 1 is operated based upon the input access request ID (1, N) and the input access request command IA (1, N). Also, the communication timer 2 monitors a time out of the input communication by sending the input request IR (1, N) and by receiving the input access data IA (1, N).

At a time instant "t3", an output request QR (2, N+1) from the communication control unit 1003 (P0) to the communication control unit 1007 (S2) is outputted to the control bus 1002 (communication channel 1).

[Expression 31]

$$QR(2, N+1) = \begin{pmatrix} \text{Com-} & \text{Send} & \text{Rcv.} & \text{Seq.} & \text{Dev.} & \text{Data} & \text{Output} \\ \text{mand} & \text{Key} & \text{Key} & \text{No.} & \text{Adr.} & \text{Size.} & \text{Data} \\ \hline QR & \#0 & \#2 & \#(N+1) & (DA) & (DS) & (Data) \end{pmatrix} \quad (31)$$

The output request QR (2, N+1) is constituted by such a data string as to an output request command (QR), a send key (SendKey=0) corresponding to a sender number 0, a receive key (Rcv.Key=2) corresponding to a receiver number 2, a sequence number (Seq.No.=N+1), output device information (Dev.Adr.) of a transfer destination from the communication control unit 1007 (S1), an output data size (DataSize), and output data (OutputData). The output data (OutputData) is written from the output data-purpose memory 1383.

In this case, the output device information (Dev.Adr.) constitutes the m-bit ON/OFF data in the fourth embodiment of FIG. 17.

The communication control unit 1007 (S2) recognizes that a request for the own equipment is issued based upon the receive key (Rcv.Key=2) of the output request QR (2, N+1), and writes the output data (OutputData) to the temporary holding memory 1785 provided in the communication control unit 1007 (S2). Also, the communication control unit 1007 (S2) outputs an output request echo QE (2, N+1) to the control bus 1002 (communication channel 1).

[Expression 32]

$$QE(2, N+1) = \begin{pmatrix} \text{Command} & \text{Send Key} & \text{Rcv. Key} & \text{Status} \\ \hline QR & \#2 & \#0 & \#(N+1) \end{pmatrix} \quad (32)$$

The output request echo QE (2, N+1) is constituted by such a data string as to an output request echo command (QE), a send key (SendKey=2), a receive key (Rcv.Key=0), and a sequence number (Seq.No.=N+1).

The communication control unit 1003 (P0) confirms that the output request QR (2, N+1) has been normally transferred to the communication control unit 1007 (S2) based upon the output request QR (2, N+1), the send key and the receive key of the output request echo QE (2, N+1), and the sequence number (Seq.No.=N+1). The communication timer 1 is operated based upon the output request QR (2, N+1) and the output request echo QE (2, N+1).

[Expression 33]

$$QD(2, N+1) = \begin{pmatrix} \text{Command} & \text{Send Key} & \text{Rcv. Key} & \text{Seq. No.} \\ \hline QA & \#0 & \#2 & \#(N+1) \end{pmatrix} \quad (33)$$

At a time instant "t4", an output access request QD (2, N+1) from the communication control unit 1003 (P0) to the communication control unit 1007 (S2) is outputted to the control bus 1002 (communication channel 1).

The output access request QD (2, N+1) is constituted by such a data string as to an output access request command (QA), a send key (SendKey=0) corresponding to a sender number 0, a receive key (Rcv.Key=2) corresponding to a receiver number 2, a sequence number (Seq.No.=N+1) used to confirm a transfer data sequence.

The communication control unit 1007 (S2) recognizes that an output request for the own equipment is issued based upon the receive key (Rcv.Key=2) of the output access request QD (2, N+1) and the sequence number (Seq.No.=N+1), and then, outputs the data stored in the temporary holding memory 1785 provided in the communication control unit 1007 (S2) to the output data-purpose memory 1783. Also, the communication control unit 1007 (S2) outputs the output access request data QA (2, N+1) to the control bus 1002 (communication channel 1).

[Expression 34]

$$QA(2, N+1) = \begin{pmatrix} \text{Command} & \text{Send Key} & \text{Rcv. Key} & \text{Seq. No.} & \text{Dev. Adr.} & \text{Data Size} & \text{Output Echoback} \\ \hline QR & \#2 & \#0 & \#(N+1) & (DA) & (DS) & (Data) \end{pmatrix} \tag{34}$$

The output request echo QA (2, N+1) is constituted by such a data string as to an output access request command (QA), a send key (SendKey=2), a receive key (Rcv.Key=0), and a sequence number (Seq.No.=N+1), an output access request QA (2, N+1), output device information (Dev.Adr.), an output data size (DataSize), and finally, an output echo back (OutputEchoback) written from the temporary holding memory 1785.

The communication control unit 1003 (P0) confirms the send key and the receive key of the output access data QA (2, N+1), the sequence number (Seq.No.=N+1), the output device information (Dev.Adr.), and the output data size (DataSize). When a confirmation result becomes normal, the sequence number is counted up (Seq.No.=N+2).

During the above-described process operation, the communication timer 1 is operated based upon the output access request QD (2, N+1) and the output access data QA (2, N+1). Also, the communication timer 2 monitors a time out of the output communication by sending the output request QR (2, N+1) and by receiving the output access data QA (1, N+1).

In the fourth embodiment of FIG. 17, since the output echo back (OutputEchoback) is added to the output access data QA (2, N+1), the communication control unit 1003 (P0) can compare the added data with the output data (OutputData), so that the communication control unit 1003 (P0) can confirm that the output data has been transferred under the normal condition.

A time period defined from a time instant "t5" to a time instant "t7" indicates an input communication in the case that an output read back function is provided with a portion, or all of the output devices 1012, 1013, 1014 (1 to m) of the output unit.

A difference between the above-described input communication of the time period from the time instant "t1" to the time instant "t3" and this input communication of the time period from the time instant "t5" to the time instant "t7" is given as follows in addition to the sequence numbers: That is, the counter party of the communication control unit 1003 (P0) is the communication control unit 1007 (S2) with respect to the communication control unit 1004 (S1); and the input device information (Dev.Adr.) is the m-bit ON/OFF data with respect to the n-bit ON/OFF data; and the output read back data (OutputEchoback) corresponds to the input data (InputData). Also, the m-bit data of the input device information (Dev.Adr.) indicates whether or not the output read back data of the output devices 1012, 1013, 1014 (1 to m) are present. Other aspects of the input communication are identical to those of the input communication defined from the time instant t1 to the time instant t3. Concrete data strings are given as follows:

[Expression 35]

$$IR(2, N+2) = \begin{pmatrix} \text{Command} & \text{Send Key} & \text{Rcv. Key} & \text{Seq. No.} & \text{Dev. Adr.} & \text{Data Size} \\ \hline IR & \#0 & \#2 & \#(N+2) & (DA) & (DS) \end{pmatrix} \tag{35}$$

[Expression 36]

$$IE(2, N+2) = \begin{pmatrix} \text{Command} & \text{Send Key} & \text{Rcv. Key} & \text{Seq. No.} \\ \hline IR & \#2 & \#0 & \#(N+2) \end{pmatrix} \tag{36}$$

[Expression 37]

$$ID(2, N+2) = \begin{pmatrix} \text{Command} & \text{Send Key} & \text{Rcv. Key} & \text{Seq. No.} \\ \hline IA & \#0 & \#2 & \#(N+2) \end{pmatrix} \tag{37}$$

[Expression 38]

$$IA(2, N+2) = \begin{pmatrix} \text{Command} & \text{Send Key} & \text{Rcv. Key} & \text{Seq. No.} & \text{Dev. Adr.} & \text{Data Size} & \text{Output Readback} \\ \hline IA & \#2 & \#0 & \#(N+2) & (DA) & (DS) & (Data) \end{pmatrix} \tag{38}$$

With execution of the above-described communication operations, the data communication among the communication control units 1003 (P0), 1004 (S1), and 1007 (S2) via the control bus 1002 (communication channel 1) is circulatedly carried out, and then, at the time instant t7, the same operation as that of the time instant t1 is commenced. It should also be noted that this communication operation is the same as that of the time instant t1 except that a sequence number becomes (Seq.No.=N+3). As previously explained, the data transferring operation via the control bus 1002 (communication channel 1) corresponds to the memory transferring operation executed in a predetermined periodic operation sequence, and the operation sequence from the time instant t1 to the time instant t6 is not reversed, but also is not omitted. As a result, the sequential control of the data strings is not required, so that idle times between the data strings can be minimized, and the transfer efficiency can be increased.

It should be understood that in the reset timing (t1, t2, - - - , t6) of the communication timer 1, other communication commands may be alternatively interrupted. Also, in this alternative case, an operation sequence of a memory transferring operation is not reversed, but also is not omitted except that a completion of the interrupted communication command is merely waited.

Figure 20:
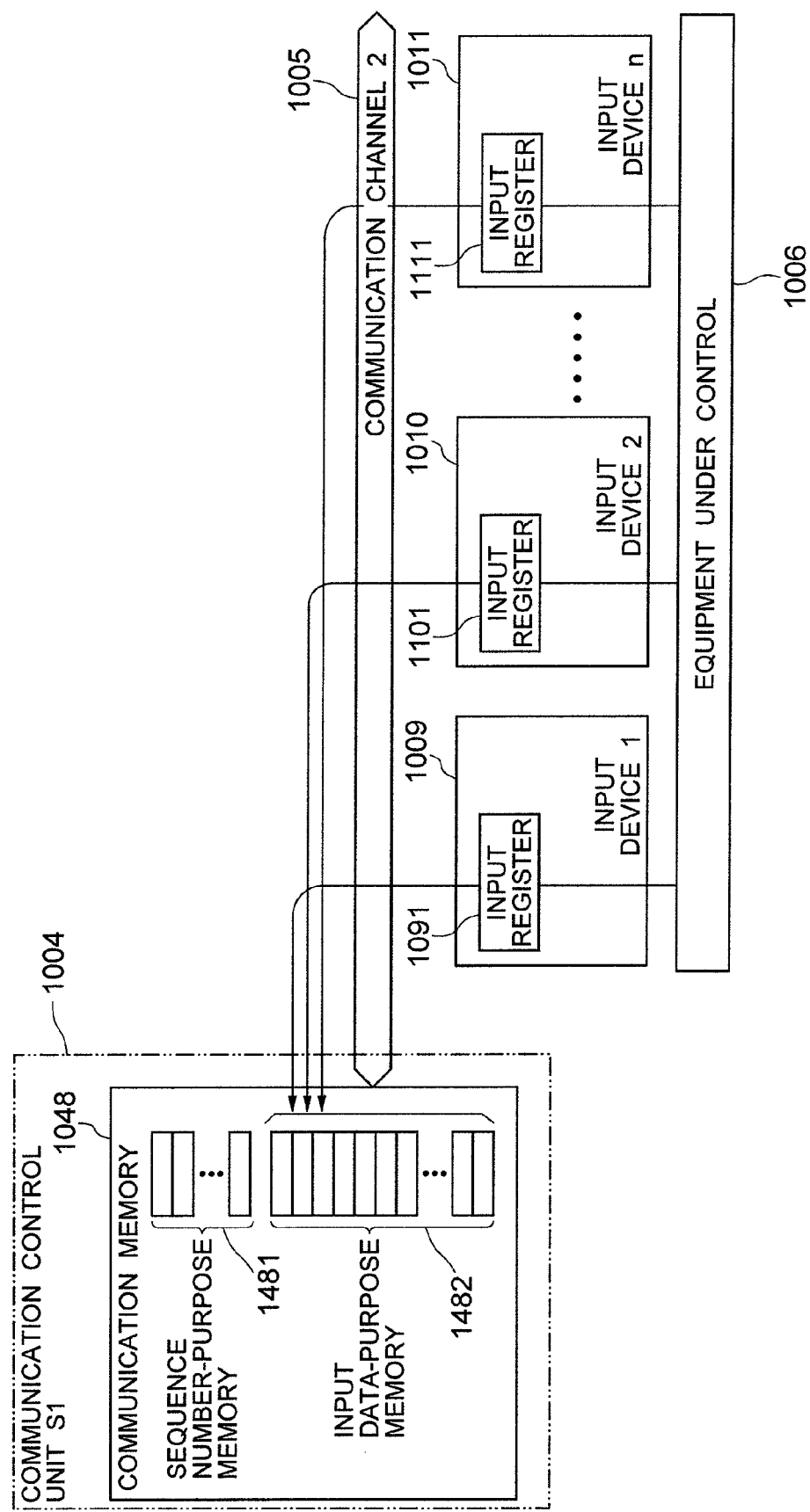
FIG. 20 is a block diagram for indicating an input/output bus (communication channel 2), and a data path of an input unit of the fourth embodiment of the present invention.

FIG. 20 indicates a path of data transmitted/received between the communication control unit 1004 (S1) and an input unit via the input/output bus 1005 (communication channel 2). Each of "n" pieces of the input devices 1009, 1010, 1011 (1 to n) which constitute the input unit is equipped with an input register 1091, another input register 1101, and a further input register 1111 respectively, while measurement data from the equipment under control 1006 is written into the input registers 1091, 1101, 1111 in either timing or a time period in correspondence with structures of these input devices 1091, 1101, 1111. The measurement data stored in the input registers 1091, 1101, 1111 are transferred in a periodic manner via the input/output bus 1005 (communication channel 2) to the input data-purpose memory region 1482 of the communication memory 1048 of the communication control unit 1004 (S1).

Figure 21:
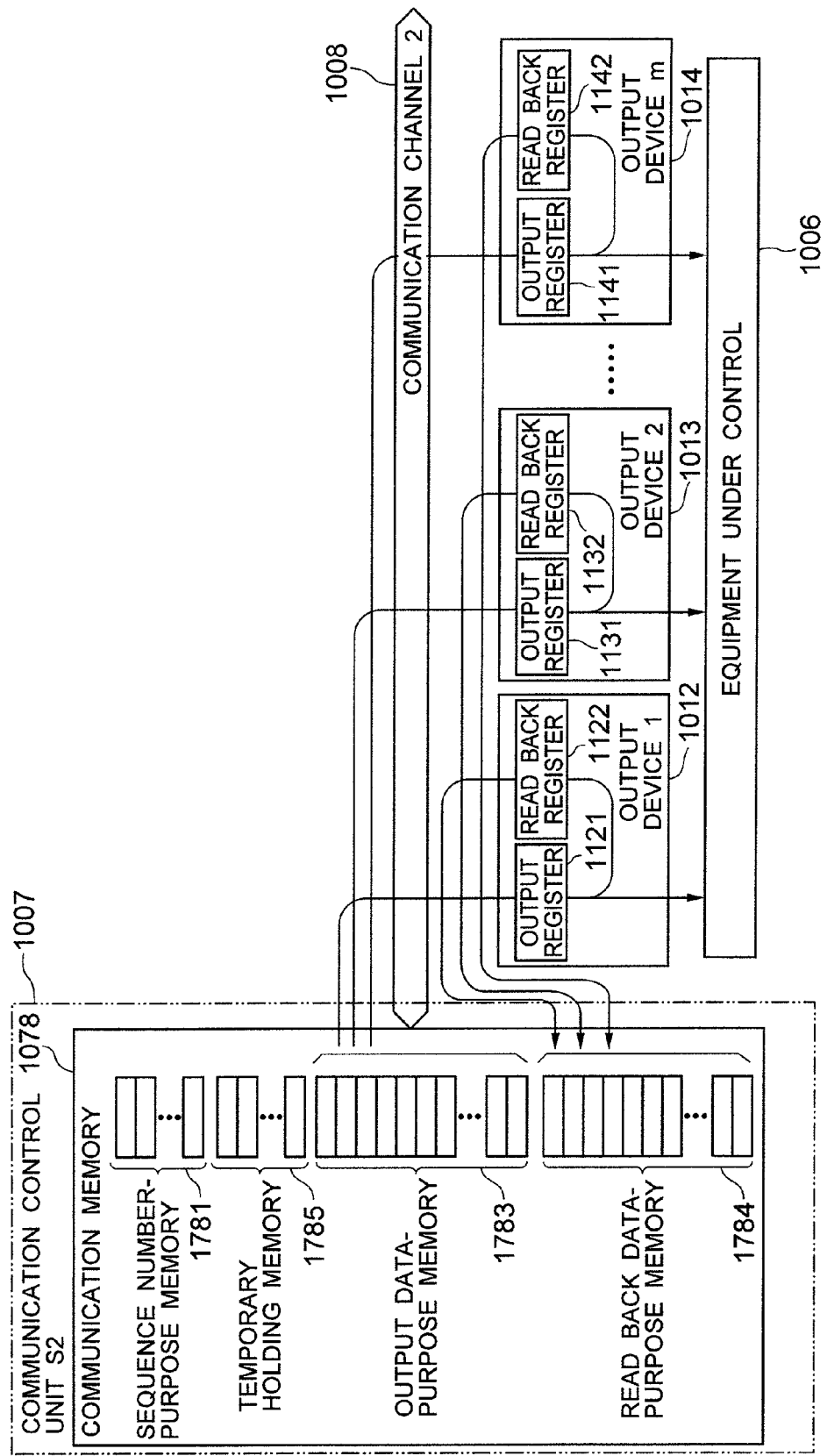
FIG. 21 is a block diagram for representing the input/output bus (communication channel 2), and a data path of an output unit of the fourth embodiment of the present invention.

FIG. 21 indicates a path of data transmitted/received between the communication control unit 1007 (S2) and an output unit via the input/output bus 1008 (communication channel 2). Each of "m" pieces of the output devices 1012, 1013, 1014 (1 to m) which constitute the output unit is equipped with an output register 1121, another output register 1131, and a further output register 1141 respectively, while data is outputted to the equipment under control 1006 in either timing or a time period in correspondence with structures of the output devices 1012, 1013, 1014 (1 to m). Data stored in the output data-purpose memory region 1783 of the communication memory 1078 of the communication control unit 1007 (S2) is transferred via the input/output bus 1008 (communication channel 2) to the output registers 1121, 1131, 1141 in a periodic manner. On the other hand, in the fourth embodiment of FIG. 5, the respective output devices 1012, 1013, 1014 (1 to m) have been equipped with the functions capable of reading back outputs to the equipment under control 1006. The read back results are written in the read back registers 1122, 1132, 1142, and are transferred via the input/output bus 1008 (communication channel 2) to the read back data-purpose memory region 1784 of the communication memory 1078 of the communication control unit 1007 (S2) in a periodic manner.

As indicated in FIG. 18, FIG. 19, FIG. 20, and FIG. 21, any of the control bus 1002 (communication channel 1), the input/output bus 1005 (communication channel 2), and the input/output bus 1008 (communication channel 2) have been made of such a basic structure that the specific memory transferring operations can be independently carried out.

Figure 22:
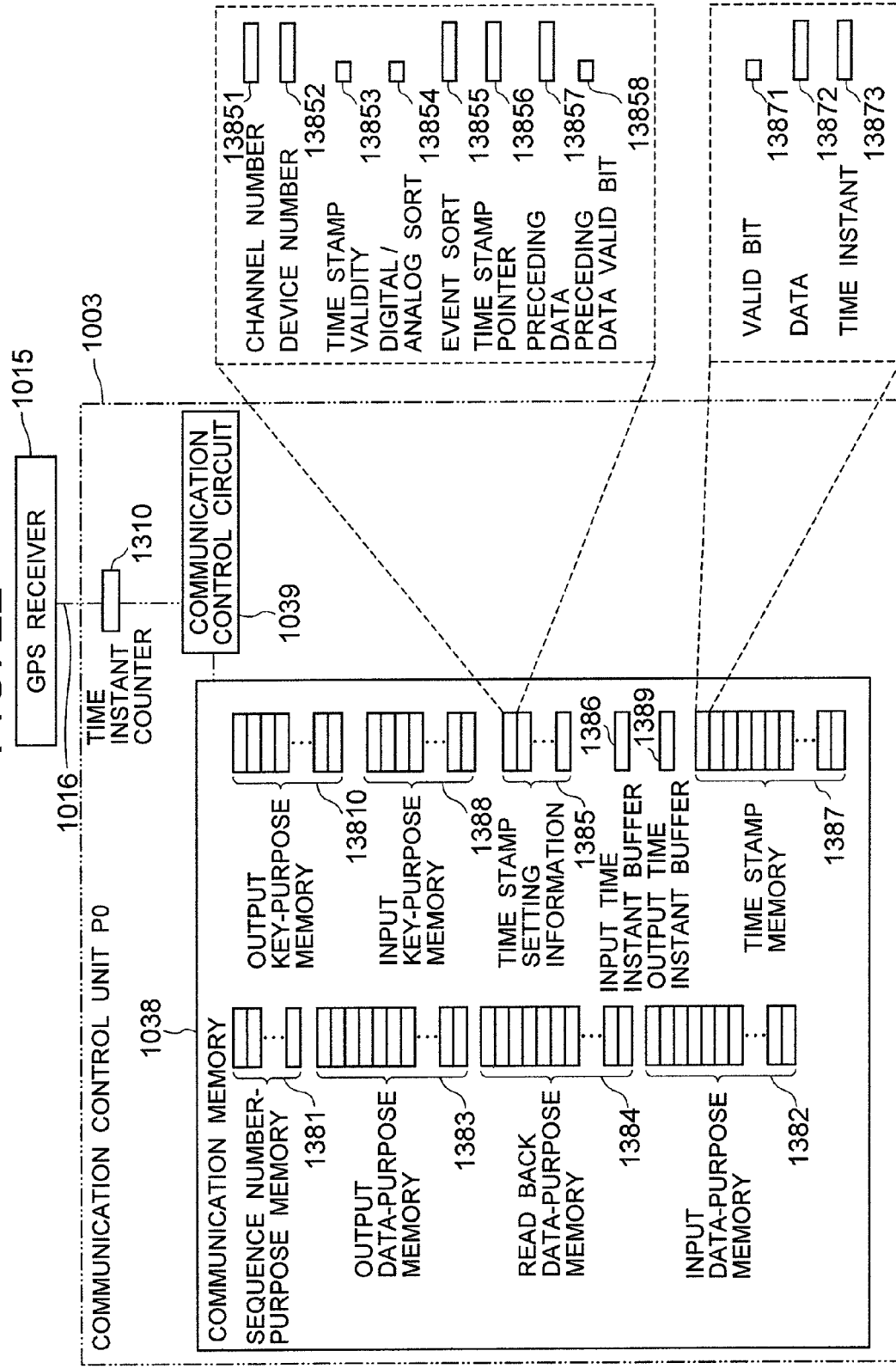
FIG. 22 is a block diagram for showing an arrangement of a communication control unit "P0" according to the fourth embodiment of the present invention.
Figure 23:
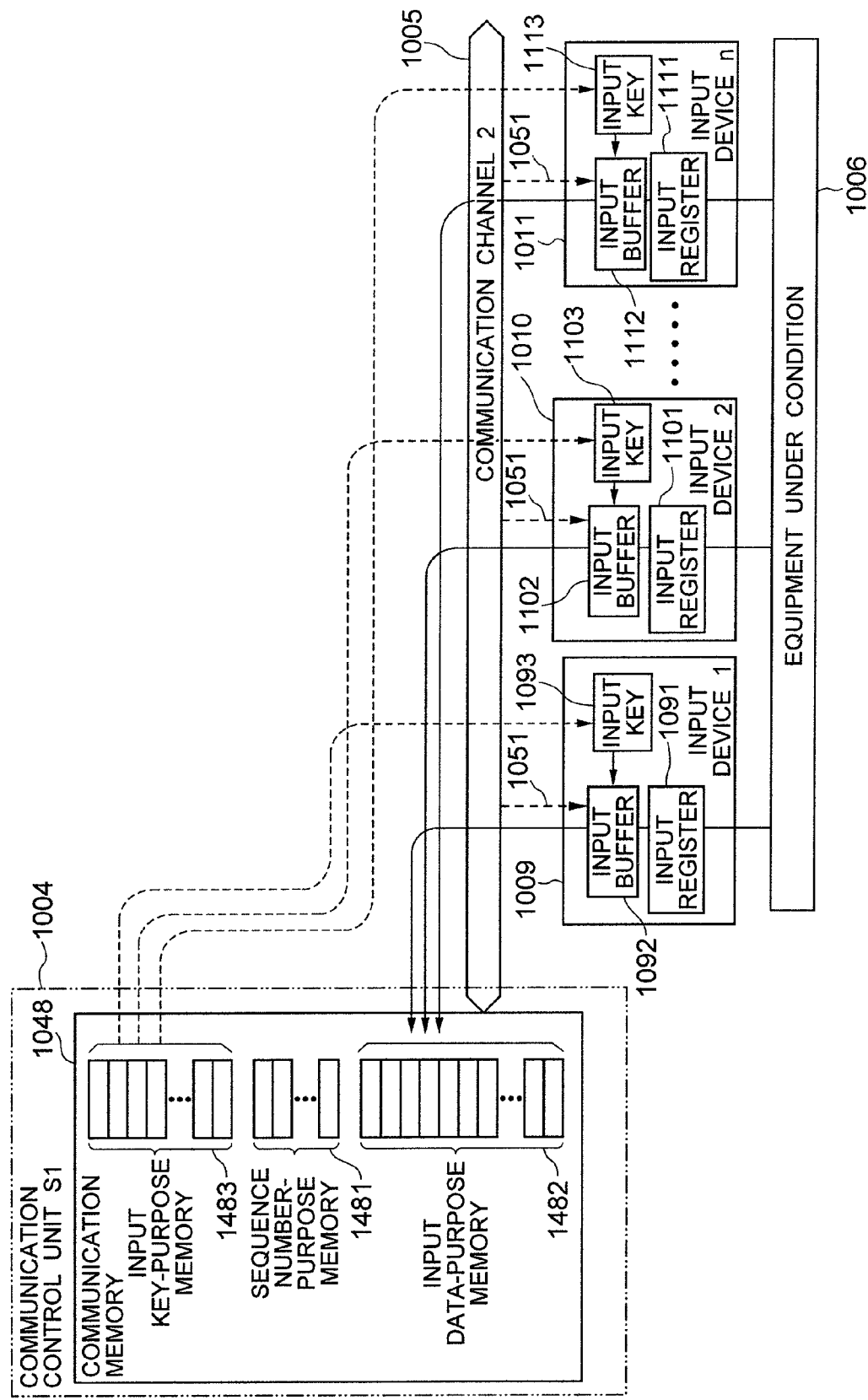
FIG. 23 is a block diagram for showing an arrangement of the input unit according to the fourth embodiment of the present invention.
Figure 24:
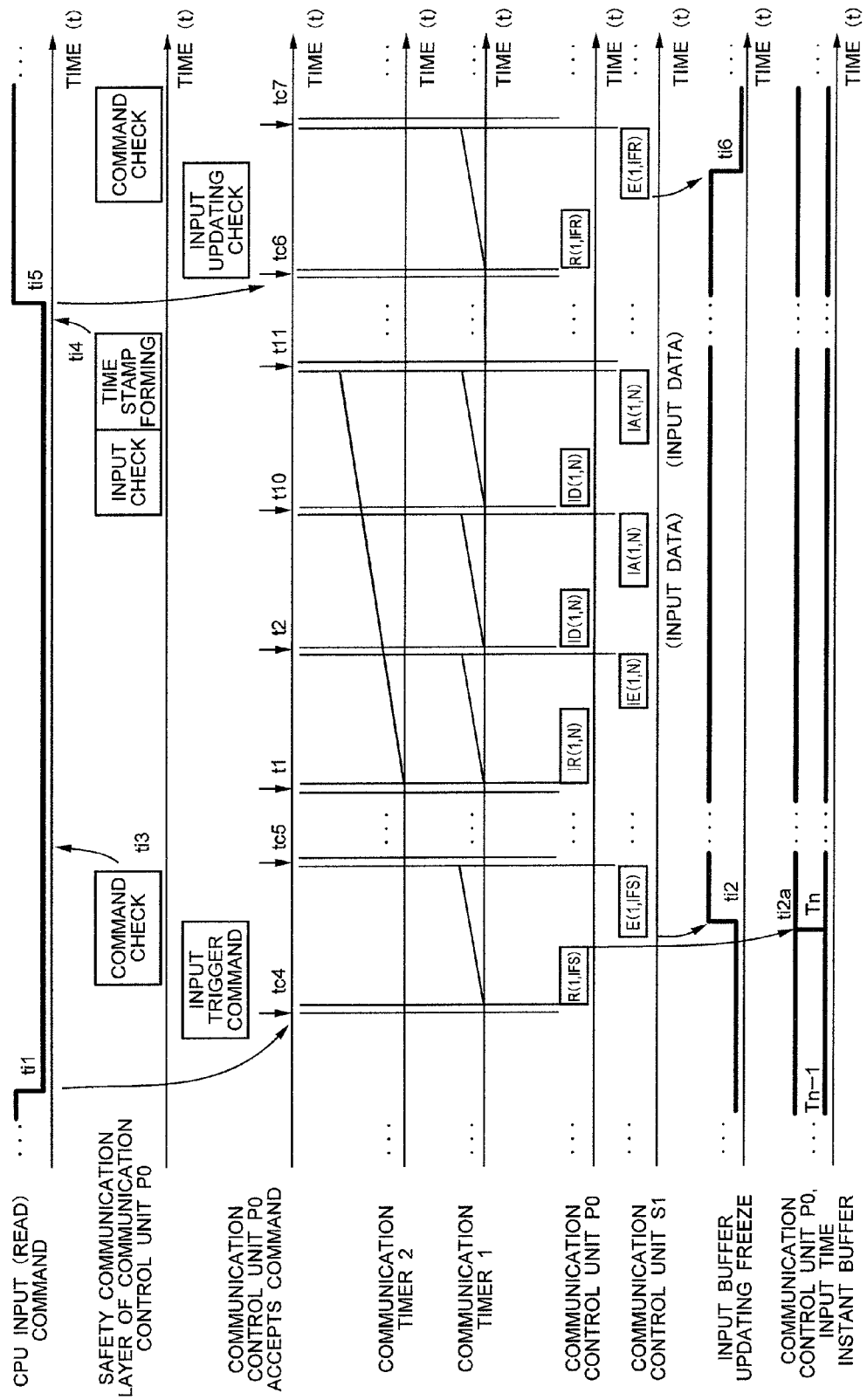
FIG. 24 is a time chart for representing an input operation according to the fourth embodiment of the present invention.

Referring now to FIG. 22, FIG. 23, and FIG. 24, a description is made of a method for capable of realizing that a time stamp is added to input data in the above-described basic arrangement, corresponding to the fourth embodiment of the present invention.

FIG. 22 indicates an internal arrangement of the communication control unit 1003 (P0). A reference time instant is transmitted/received from the GPS receiver 1015 to the communication control unit 1003 (P0) via a reference time instant signal 1016. The reference time instant signal 1016 corresponds to such a signal whose bit is correctly inverted every 1 second. A time counter 1310 is such a counter which counts up a count value every 1 millisecond. The reference time instant signal 1016 is inputted to the time counter 1310, and is used in order to correct a time instant. Concretely speaking, in response to change the time instant signal 1016, digits of the time counter 1310, which are smaller than 1 second, are rounded off, or discarded.

Time stamp setting information 1385 indicates such an information related to time stamps as to one of the input devices 1009, 1010, 1111 (1 to n), and one of the output devices 1012, 1013, 1014 (1 to m). The time stamp setting information 1385 is constituted by a station number 13851, a device number 13852, a time stamp validity 13853, a digital/analog sort 13854, an event sort 13855, a time stamp pointer 13856, preceding data 13857, and a preceding data valid bit 13858.

The station number 13851 corresponds to such a station number in the control bus 1002 of a communication control unit to which the relevant device has been connected via the input/output bus 1008 (communication channel 2). The device number 13852 corresponds to such a device number in the input/output bus 1008 to which the relevant device has been connected. The time stamp validity 13853 corresponds to such a bit for selecting whether or not a time stamp is formed. The digital/analog sort 13854 indicates that input/output data of the input devices 1009, 1010, 1011 (1 to n), and of the output devices 1012, 1013, 1014 (1 to m) are either digital data or analog data. The event sort 13855 corresponds to a condition under which time stamp data is formed. In a digital signal, an event is selected from "0→1", "1→0", or "both 0→1 and 1→0" In an analog signal, both boundary value data and an event are selected. This event is selected from "when input data is increased to exceed boundary value"; "when input data is decreased to exceed boundary value"; or "when input data exceeds boundary value irrespective of increased/decreased input data." The time stamp pointer 13856 represents such an address of the time stamp memory 1387 where time stamps have been stored, at which the latest time stamp has been stored. The preceding data 13857 implies that in order to save such a preceding data which is compared with the latest data when an occurrence of an event is judged, when data is inputted, the latest data is written in the preceding data when the event is judged. The preceding data valid bit 13858 indicates that the preceding data is valid, or invalid.

When a control apparatus is initiated, the central processing unit 1001 (CPU) sets the time stamp device setting information 1385.

The input time instant buffer 1386 corresponds to such a buffer which is employed so as to temporarily save an input time instant.

The time stamp memory 1387 corresponds to such a region which forms a time stamp and then stores thereinto the formed time stamp. The time stamp memory 1387 is constituted by an invalid bit 13871, data 13872, and a time instant 13873 every input signal and every output signal. The valid bit 13871 indicates that the time stamp is valid, or invalid. The data 13872 represents such a data when an event set by the event sort 13855 occurs. When an input signal is produced, the data 13872 indicates input data, whereas when an output signal is produced, the data 13872 indicates read back data. The time instant 13873 indicates such a time instant when an event set by the event sort 13855 happens to occur.

The central processing unit 1001 (CPU) can read out both a time instant when the latest event occurs and another time instant when an event preceding to the latest event occurs from the time stamp memory 1387 indicated by the time stamp pointer 13856. The central processing unit 1001 (CPU) writes "invalid statuses" into the valid bit 13871 and the preceding data valid bit 13858 before input/output data communication is carried out.

A detailed structure of an input key-purpose memory region 1388 will be now described with reference to FIG. 23.

FIG. 23 represents a communication structure of a peripheral region of the input/output bus 1008 (communication channel 2). It should be understood that the same reference numerals shown in FIG. 4 will be employed as those for denoting the same, or similar structural elements of FIG. 20, and descriptions thereof are omitted.

An input key-purpose memory region 1483 is provided in the communication memory 1048 of the communication control unit 1004 (S1). Next, a description is made of input keys.

Configuration information of the control apparatus contains information for indicating whether or not the communication control unit 1004 (S1) and the communication control unit 1007 (S2) are connected; and both sorts and sequences of the input devices 1009, 1010, 1011 (1 to n), and the output devices 1012, 1013, 1014 (1 to m), which are connected to these communication control units 1004 (S1) and 1007 (S2). In the fourth embodiment of the present invention, combinations of such devices among the input devices 1009, 1010, 1011 (1 to n), into which time stamps are wanted to be added from the equipment under control 1006, are also added to the configuration information. This information is indicated by a combination between an input key and a device address. When the control apparatus is initiated, the information is written via the control bus 1002 (communication channel 1) into the input key-purpose memory region 1483 of the communication control unit 1004 (S1). Furthermore, among the input keys 1093, 1103, 1113 (1 to n) which are provided in the respective input devices 1009, 1010, 1011 (1 to n) via the input/output bus 1005 (communication channel 2), statuses of input keys of such input devices to which the time stamps are wanted to be added are set to "opens." When the control apparatus is activated after the control apparatus has been set to the above-described statuses, if an input freeze signal line 1051 added to the input/output bus 1005 (communication channel 2) becomes a level "H", then only such an input device that an input key is under open status among the input buffers 1092, 1102, 1112 (1 to n) provided in the respective input devices 1009, 1010, 1011 (1 to n) stops updating of data input from the input registers 1091, 1101, and 1111 (1 to n), and also, outputs such a data whose level is kept constant to the input/output bus 1005 (communication channel 2). When the level of the input freeze signal line 1051 becomes a level "L", the input buffers 1092, 1102, 1112 (1 to n) of the input devices where the input keys are under open statuses also restart the data inputs from the input registers 1091, 1101, 1111 (1 to n), and thus, directly output the data from the input registers 1091, 1101, 1111 (1 to n) to the input/output bus 1005 (communication channel 2).

FIG. 24 indicates operation sequences for permitting/stopping data updating operations with respect to the input buffers 1092, 1102, 1112 (1 to n) via the control bus 1002 (communication channel 1) and the input/output bus 1005 (communication channel 2).

Among data strings and symbols of time instants shown in the drawing, the same names imply the same contents as those shown in FIG. 19 and descriptions thereof are omitted.

At a time "ti1", when an input command of the central processing unit 1001 (CPU) is changed to a level "L", an input trigger command "R (1, IFS)" is transferred as an interrupt at a time instant "tc4" when the communication control unit 1003 (P0) accepts a communication command.

[Expression 39]

$$R(1, \text{IFS}) = \left( \begin{array}{|c|c|c|c|c|} \hline \text{Command} & \text{Send Key} & \text{Rcv. Key} & \text{Input Key} & \text{Input Device} \\ \hline \text{IFS} & \#0 & \#1 & (\text{IKey}) & (\text{Dev}) \\ \hline \end{array} \right) \quad (39)$$

IFS: Input Freeze Start

The input trigger command R (1, IFS) contains a combined input key (IKey) and a device address (Dev) of a device, to which the time stamps are wanted to be inputted. The device address constitutes the n-bit ON/OFF data in the fourth embodiment of FIG. 17; for instance, when the device address is inputted from the input device 1, data of a first bit is transferred as 1, whereas when the device address is not inputted from the input device 2, data of a second bit is transferred as 0. These data have been previously written as the configuration information into the communication memory 1048 of the communication control unit 1004 (S1). However, every time these data are transferred, the transferred data are compared with each other, so that reliability can be increased.

In order to save such a present time instant when the input freezing operation is commenced in the input device after the transmission of the input trigger command R (1, IFS) is accomplished (namely, time instant "ti2a"), the communication control circuit 1039 stores the present time ("Tn") which has been stored in the time instant counter 1310 into the input time instant buffer 1386.

The communication control unit 1004 (S1) recognizes that an instruction is issued for the own equipment, and transfers an echo "E (1, IFS)."

[Expression 40]

$$E(1, \text{IFS}) = \left( \begin{array}{|c|c|c|c|c|} \hline \text{Command} & \text{Send Key} & \text{Rcv. Key} & \text{Input Key} & \text{Input Device} \\ \hline \text{IFS} & \#1 & \#0 & (\text{IKey}) & (\text{Dev}) \\ \hline \end{array} \right) \quad (40)$$

Also, the communication control unit 1004 (S1) sets the input freeze signal line 1051 of the input/output bus 1005 (communication channel 2) to a level H. As a result, the input buffers 1092, 1102, 1112 (1 to n) of such input devices that input keys are under open statuses stop data input updating operation, and output the data kept constant to the input/output bus 1005 (communication channel 2).

In the fourth embodiment of FIG. 24, a control apparatus is arranged as follows: That, in a safety communication layer provided in the communication control unit 1003 (P0), the input trigger command "R (1, IFS)" is compared with the echo command "E (1, IFS)." Assuming now that an abnormal condition occurs, an input update command R (1, IFR) (will be discussed later) is issued, and thus, updating operation of the input buffer is restarted.

Thereafter, at time instants t1 and t2, the input data is transferred from the communication control unit 1004 (S1) to the communication control unit 1003 (P0).

In the fourth embodiment of FIG. 24, at a time instant t10, the input data is again transmitted, and the input data are compared with each other 2 times in the safety communication layer in order to increase the safety characteristic of the data.

If the input data are coincident with each other at a time instant "ti4", then the central processing unit 1001 (CPU) judges whether or not a time stamp is produced with reference to the time stamp device setting information 1385.

In the case that the time stamp is produced, the central processing unit 1001 (CPU) compares the digital/analog sort 13854, the event sort 13855 with the preceding data 13857 and the input data with reference to the time stamp setting information 1385 so as to judge whether or not an event happens to occur.

In the case of a digital device, if the below-mentioned equations can be established, then the central processing unit 1001 (CPU) judges that the event occurs. It is so assumed that the preceding data 13857=d0, and the input data=d1.

In the case that the event sort 13855="0→1", $$(d0=0)\cdot(d1=1) \tag{Equation 1}$$

In the case that the event sort 13855="1→0", $$(d0=1)\cdot(d1=0) \tag{Equation 2}$$

In the case that the event sort 13855="both 0→1 and 1→0", $$(d0=0)\cdot(d1=1)+(d0=1)\cdot(d1=0) \tag{Equation 3}$$

In the case of an analog device, if the below-mentioned equations can be established, then the central processing unit 1001 (CPU) judges that the event occurs. It is so assumed that the preceding data 13857=d0, the input data=d1, and a boundary value=b.

In the case that the event sort 13855="when input data is increased to exceed boundary value", $$(d0 \leq b)\cdot(d1 > b) \tag{Equation 4}$$

In the case that the event sort 13855="when input data is decreased to exceed boundary value", $$(d0 \geq b)\cdot(d1 < b) \tag{Equation 5}$$

In the case that the event sort 13855="when input data exceeds boundary value irrespective of increased/decreased input data", $$(d0 \leq b)\cdot(d1 > b)+(d0 \geq b)\cdot(d1 < b) \tag{Equation 6}$$

When the central processing unit 1001 (CPU) judges that the event occurs, the time stamp is written in the time stamp memory 1387. If a valid bit 13871 of the time stamp memory 1387 indicated by a time stamp pointer 13856 is valid, then the central processing unit 1001 (CPU) adds the time stamp to the valid bit in order to be moved to a next time stamp storage address, and then writes the added valid bit into the time stamp pointer 13856. The central processing unit 1001 (CPU) writes "valid" in the valid bit 13871 of the time stamp memory 1387 indicated by the time stamp pointer 13856, writes input data in the data 13872, and writes such a time instant value read out from the input time instant buffer 1386 in the time instant 13873.

The central processing unit 1001 (CPU) writes the input data in the preceding data 13857 and "valid" in the preceding data valid bit 13858 irrespective of such a fact that the event occurs.

When a series of the above-described process operations is accomplished, a data input completion signal is transferred to the central processing unit 1001 (CPU).

Thereafter, at a time "ti5", when an input command of the central processing unit 1001 (CPU) is changed to a level "H", an input update command "R (1, IFR)" is transferred as an interrupt at a time instant "tc6" when the communication control unit 1003 (P0) accepts a communication command.

[Expression 41]

$$R(1, IFR) = \left( \begin{array}{|c|c|c|c|c|} \hline \text{Command} & \text{Send Key} & \text{Rcv. Key} & \text{Input Key} & \text{Input Device} \\ \hline \text{IFS} & \#0 & \#1 & (\text{IKey}) & (\text{Dev}) \\ \hline \end{array} \right) \tag{41}$$

IFR: Input Freeze Release

The input update command R (1, IFR) contains a device address (Dev) at which updating operation of an input buffer is wanted to be restarted.

The communication control unit 1004 (S1) recognizes that an instruction is issued for the own equipment, and transfers an echo "E (1, IFS)."

[Expression 42]

$$E(1, IFR) = \left( \begin{array}{|c|c|c|c|c|} \hline \text{Command} & \text{Send Key} & \text{Rcv. Key} & \text{Input Key} & \text{Input Device} \\ \hline \text{IFS} & \#1 & \#0 & (\text{IKey}) & (\text{Dev}) \\ \hline \end{array} \right) \tag{42}$$

Also, the communication control unit 1004 (S1) sets the input freeze signal line 1051 of the input/output bus 1005 (communication channel 2) to a level L. As a result, the input buffers 1092, 1102, 1112 (1 to n) of such input devices that input keys are under open statuses restart data input updating operation, and directly output the data of the input registers 1091,1101, 1111 (1 to n) to the input/output bus 1005 (communication channel 2).

In accordance with the above-described operation sequences, the input trigger command of the central processing unit 1001 (CPU) is transferred via the control bus 1002 (communication channel 1) and the input/output bus 1005 (communication channel 2) to the input unit so as to stop/permit the data updating operations of the input buffers. The communication control unit 1003 (P0) judges that the event occurs in the input device, and writes in the time stamp memory 1387, so that the central processing unit 1001 (CPU) can establish a relationship between the input data and the time stamp.

Fifth Embodiment

Figure 26:
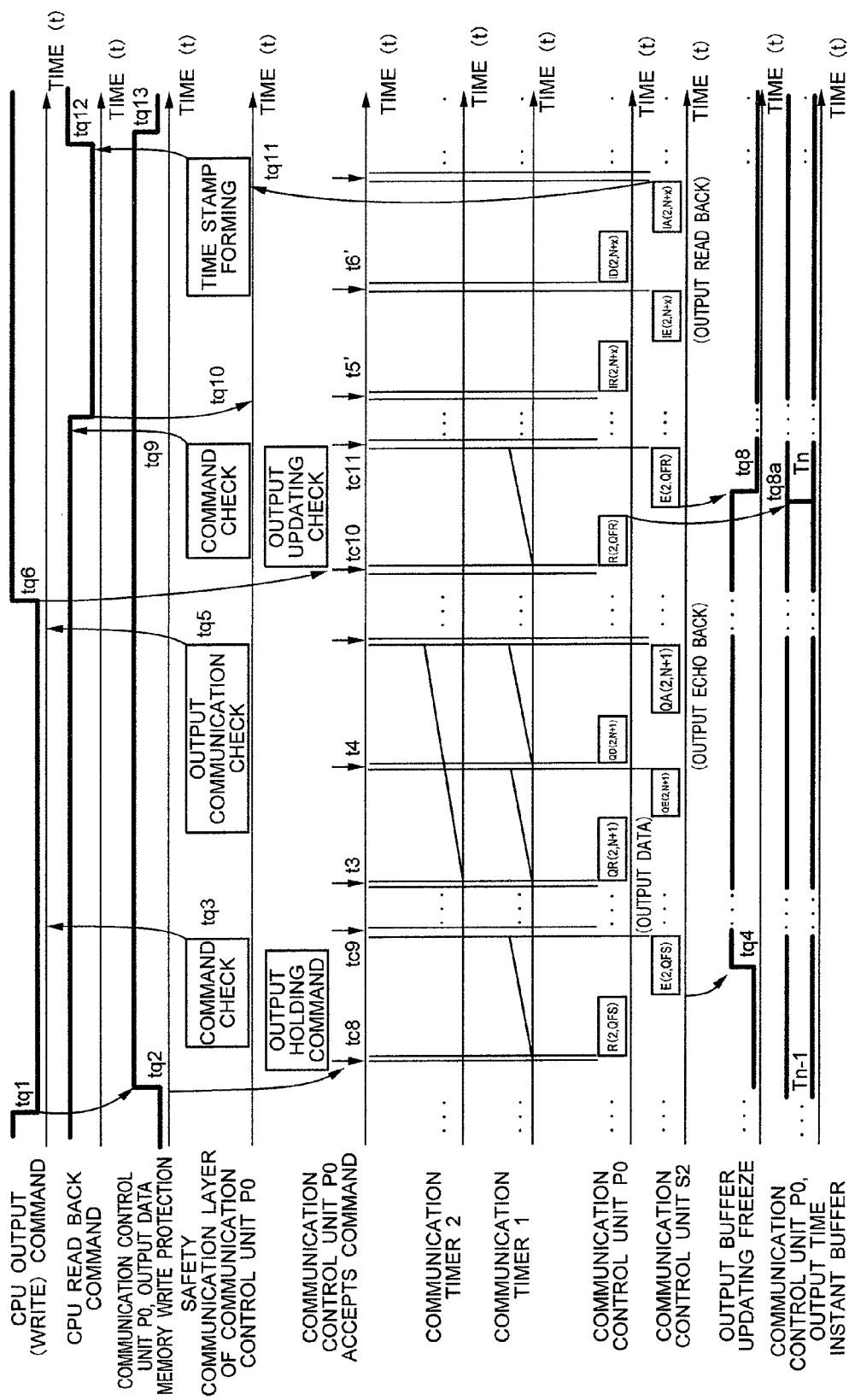
FIG. 26 is a time chart for representing an output operation according to the fifth embodiment of the present invention.

Referring now to FIG. 22, FIG. 15, and FIG. 26, a description is made of a method capable of realizing that a time stamp is added to read back data corresponding to output data, according to a fifth embodiment of the present invention.

FIG. 22 represents an internal arrangement of the communication control unit 1003 (P0). It should be noted that the same contents as explained in FIG. 22 are omitted.

An output time instant buffer 1389 corresponds to a buffer which temporarily saves an output time instant.

A detailed content of the output key-purpose memory region 13810 will be described with reference to FIG. 25.

Figure 25:
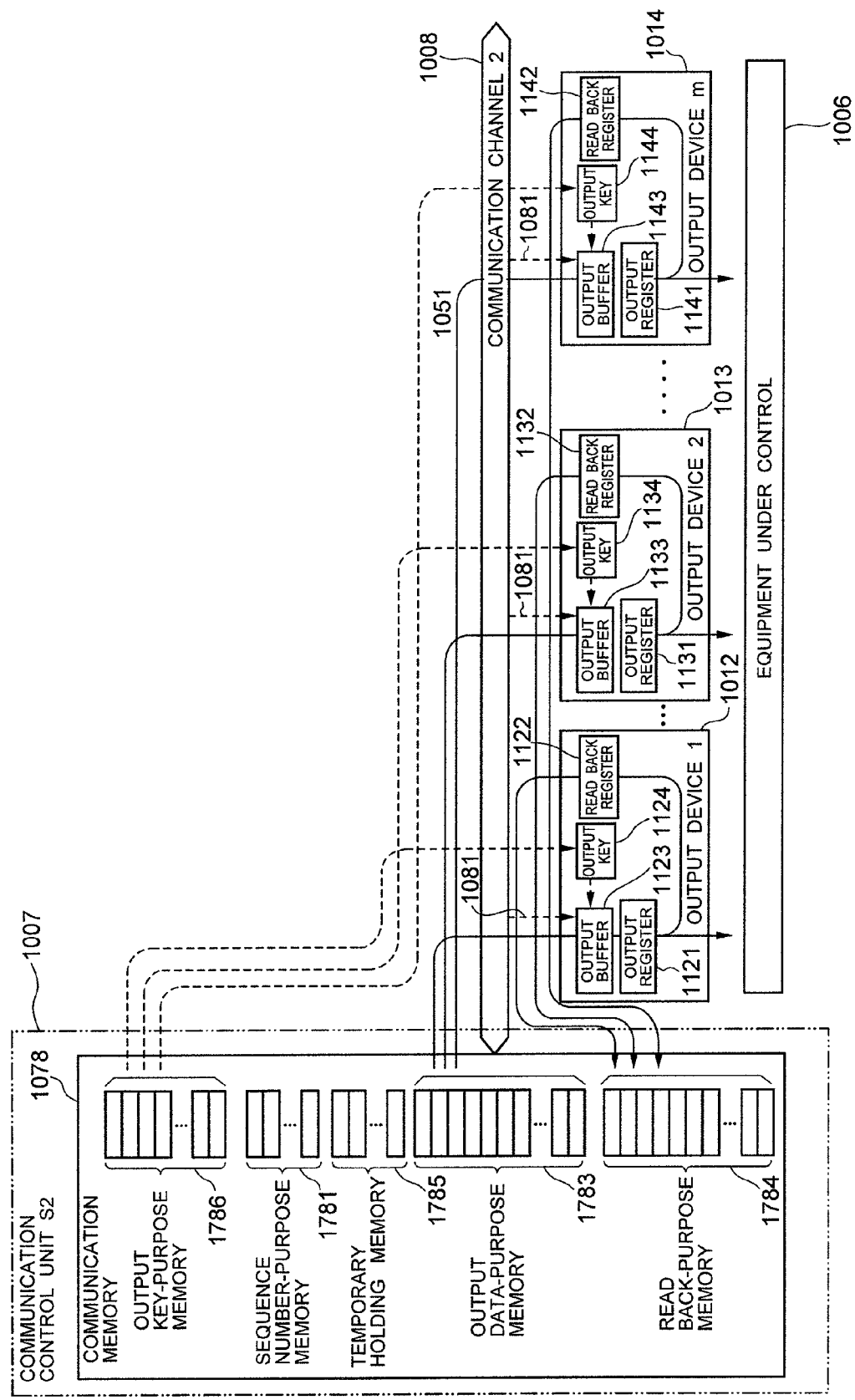
FIG. 25 is a block diagram for indicating an arrangement of an output unit according to a fifth embodiment of the present invention.

FIG. 25 shows a communication structure of a peripheral region of the input/output bus 1008 (communication channel 2). It should also be understood that the same reference numerals shown in FIG. 21 will be employed as those for denoting the same structural elements of FIG. 25, and descriptions thereof are omitted.

An output key-purpose memory region 1786 is provided in the communication memory 1048 of the communication control unit 1007 (S2). Next, a description is made of output keys. In addition to basic configuration information of the control apparatus, combinations of output devices among the output devices 1012, 1013, 1014 (1 to m), to which time stamps are wanted to be added to the equipment under control 1006, are also added to the configuration information. This information is indicated by a combination between an output key and a device address. When the control apparatus is initiated, the information is written via the control bus 1002 (communication channel 1) into the output key-purpose memory region 1786 of the communication control unit 1007 (S2). Furthermore, among the output keys 1124, 1134, 1144 (1 to m) which are provided in the respective output devices 1012, 1013, 1014 (1 to m) via the input/output bus 1008 (communication channel 2), statuses of output keys of such output devices to which the time stamps are wanted to be added are set to "opens." When the control apparatus is activated after the control apparatus has been set to the above-described statuses, if an output freeze signal line 1081 added to the input/output bus 1005 (communication channel 2) becomes a level "H", then only such an output device that an output key is under open status among the output buffers 1123, 1133, 1143 (1 to m) provided in the respective output devices 1012, 1013, 1014 (1 to m) stops updating operation of data output to the output registers 1121, 1131, 1141 (1 to m), and also, outputs such a data whose level is kept constant to the equipment under control 1006. It should also be understood that the output buffers 1123, 1133, 1143 (1 to m) themselves are continuously updated from the output data memory region 1783 via the input/output bus 1008 (communication channel 2). When the level of the data output freeze signal line 1081 becomes a level "L", the output registers 1121, 1131, 1141 (1 to m) of the output devices where the output keys are under open statuses also restart the data updating operations from the output buffers 1123, 1133, 1143 (1 to m), and thus, directly outputs the data of the output data memory region 1783 to the equipment under control 1006.

FIG. 26 indicates operation sequences for permitting/holding data updating with respect to the output buffers 1123, 1133, 1143 (1 to m) via the control bus 1002 (communication channel 1) and the input/output bus 1008 (communication channel 2).

Among data strings and symbols of time instants shown in the drawing, the same names imply the same contents as those shown in FIG. 19, and descriptions thereof are omitted.

At a time instant "tq1", when an output command of the central processing unit 1001 (CPU) is changed to a level L, a write protection of the communication control unit 1003 (P0) via a parallel transfer bus 0 (communication channel 0) becomes valid (level H). As a result, writing of data into the relevant memory region within the output data memory region 1383 of the communication memory 1038 can be protected. Next, at a time instant "tc8" when the communication control unit 1003 (P0) accepts a communication command, an output trigger command "R (2, QFS)" is transferred as an interrupt.

[Expression 43]

$$R(2, QFS) = \left( \begin{array}{|c|c|c|c|c|} \hline \text{Command} & \text{Send Key} & \text{Rcv. Key} & \text{Output Key} & \text{Input Device} \\ \hline \text{QFS} & \#0 & \#2 & (\text{QKey}) & (\text{Dev}) \\ \hline \end{array} \right) \quad (43)$$

QFS: Output Freeze Start

The output trigger command R (2, QFS) contains a combined output key (QKey) and a device address (Dev) of a device, which are wanted to be simultaneously outputted. The device address constitutes the m-bit ON/OFF data in the third embodiment of FIG. 17; for instance, when the device address is inputted from the output device 1001, data of a first bit is transferred as 1, whereas when the device address is not inputted from the input device 1002, data of a second bit is transferred as 0. These data have been previously written as the configuration information into the communication memory 1078 of the communication control unit 1007 (S2). However, every time these data are transferred, the transferred data are compared with each other, so that reliability can be increased.

The communication control unit 1007 (S2) recognizes that an instruction is issued for the own equipment, and transfers an echo "E (2, QFS)."

[Expression 44]

$$E(2, QFS) = \left( \begin{array}{|c|c|c|c|c|} \hline \text{Command} & \text{Send Key} & \text{Rcv. Key} & \text{Output Key} & \text{Input Device} \\ \hline \text{QFS} & \#2 & \#0 & (\text{QKey}) & (\text{Dev}) \\ \hline \end{array} \right) \quad (44)$$

Also, the communication control unit 1007 (S2) sets the output freeze signal line 1081 of the input/output bus 1008 (communication channel 2) to a level H. As a result, the output buffers 1123, 1133, 1143 (1 to m) of such output devices that output keys are under open statuses stop data output updating operation, and output the data kept constant to the equipment under control 1006.

In the fifth embodiment of FIG. 26, the control equipment is arranged as follows: That, in a safety communication layer provided in the communication control unit 1003 (P0), the output trigger command "R (2, QFS)" is compared with the echo command "E (2, QFR)." Assuming now that an abnormal condition occurs, an output update command R (2, QFR) (will be discussed later) is issued, and thus, updating of the output buffer is restarted.

Thereafter, at time instant t3 and t4, the output data is transferred from the communication control unit 1003 (P0) to the communication control unit 1007 (S2).

In the fifth embodiment of FIG. 26, at a time instant "tq5", the output data is compared with the output echo back so as to increase the safety characteristic of the data. When the input/output data comparison is accomplished, at a time instant "tq4", an output data completion signal is transferred to the central processing unit 1001 (CPU).

Thereafter, at a time instant "tq6", when an output command of the central processing unit 1001 (CPU) is changed to a level H, the write protection of the communication control unit 1003 (P0) is released (namely, level L) at a time instant "tc7." Also, an output update command "R (2, QFR)" is transferred as an interrupt at a time instant "tc10" when the communication control unit 1003 (P0) accepts a communication command.

[Expression 45]

$$R(2, QFR) = \left( \begin{array}{|c|c|c|c|c|} \hline \text{Command} & \text{Send Key} & \text{Rcv. Key} & \text{Output Key} & \text{Input Device} \\ \hline \text{QFR} & \#0 & \#2 & (\text{QKey}) & (\text{Dev}) \\ \hline \end{array} \right) \quad (45)$$

QFR: Output Freeze Release

The output update command R (2, QFR) contains a device address (Dev) at which updating operation of an output buffer is wanted to be restarted.

In order to save such a present time instant when the output updating operation is commenced in the input device after the transmission of the input trigger command R (2, QFR) is accomplished (namely, time instant "tq8a"), the communication control circuit 1039 stores the present time ("Tn") which has been stored in the time instant counter 1310 into the output time instant buffer 1389.

The communication control unit 1007 (S2) recognizes that an instruction is issued for the own equipment, and transfers an echo "E (2, QFR)."

[Expression 46]

$$E(2, QFR) = \left( \begin{array}{|c|c|c|c|c|} \hline \text{Command} & \text{Send Key} & \text{Rcv. Key} & \text{Output Key} & \text{Input Device} \\ \hline \text{QFR} & \#2 & \#0 & (\text{QKey}) & (\text{Dev}) \\ \hline \end{array} \right) \quad (46)$$

Also, the communication control unit 1007 (S2) sets the output freeze signal line 1081 of the input/output bus 1005 (communication channel 2) to a level H. As a result, the output buffers 1123, 1133, 11432 (1 to m) of such output devices that output keys are under open statuses restart data output updating operation, and directly output the updated data to the equipment under control 1006 via the output register input buffers 1121, 1131, 1141 (1 to m).

When the command comparing operation is accomplished at a time instant "tq9", the communication control unit 1007 (S2) transfers an output updating command completion signal to the central processing unit 1001 (CPU).

Thereafter, when the read back command of the central processing unit 1001 (CPU) is changed into a level "L", at a time instant "tq10", the safety communication layer of the communication control unit 1003 (P0) waits until the output read back data is received.

Thereafter, when the output read back is received, the communication control unit 1003 (P0) compares the read back data with the time stamp device setting information at a time instant "tq11." If the communication control unit 1003 (P0) judges that an event occurs, then a time stamp is written in the time stamp memory 1387. If a valid bit 13871 of the time stamp memory 1387 indicated by a time stamp pointer 13856 is valid, then the central processing unit 1001 (CPU) adds the time stamp to the valid bit in order to be moved to a next time stamp storage address, and then writes the added valid bit into the time stamp pointer 13856. The central processing unit 1001 (CPU) writes "valid" in the valid bit 13871 of the time stamp memory 1387 indicated by the time stamp pointer 13856, writes read back data in the data 13872, and writes such a time instant value read out from the output time instant buffer 1389 in the time instant 13873.

The central processing unit 1001 (CPU) writes the read back data in the preceding data 13857 and "valid" in the preceding data valid bit 13858 irrespective of such a fact that the event occurs.

When a series of the above-described process operations is accomplished, a read back data input completion signal is transferred to the central processing unit 1001 (CPU).

Thereafter, at a time "tq12", when an output command of the central processing unit 1001 (CPU) is changed to a level "H", at a time instant "tq13", the write protection of the communication control unit 1003 (P0) is released (namely, level "L").

In accordance with the above-described operation sequences, the output trigger command of the central processing unit 1001 (CPU) is transferred via the control bus 1002 (communication channel 1) and the input/output bus 1008 (communication channel 2) to the output unit so as to stop/permit the output data updating operations of the output buffers. The communication control unit 1003 (P0) judges that the event occurs in the output device, and writes in the time stamp memory 1387, so that the central processing unit 1001 can establish a relationship between the output data and the time stamp.

Sixth Embodiment

Figure 27:
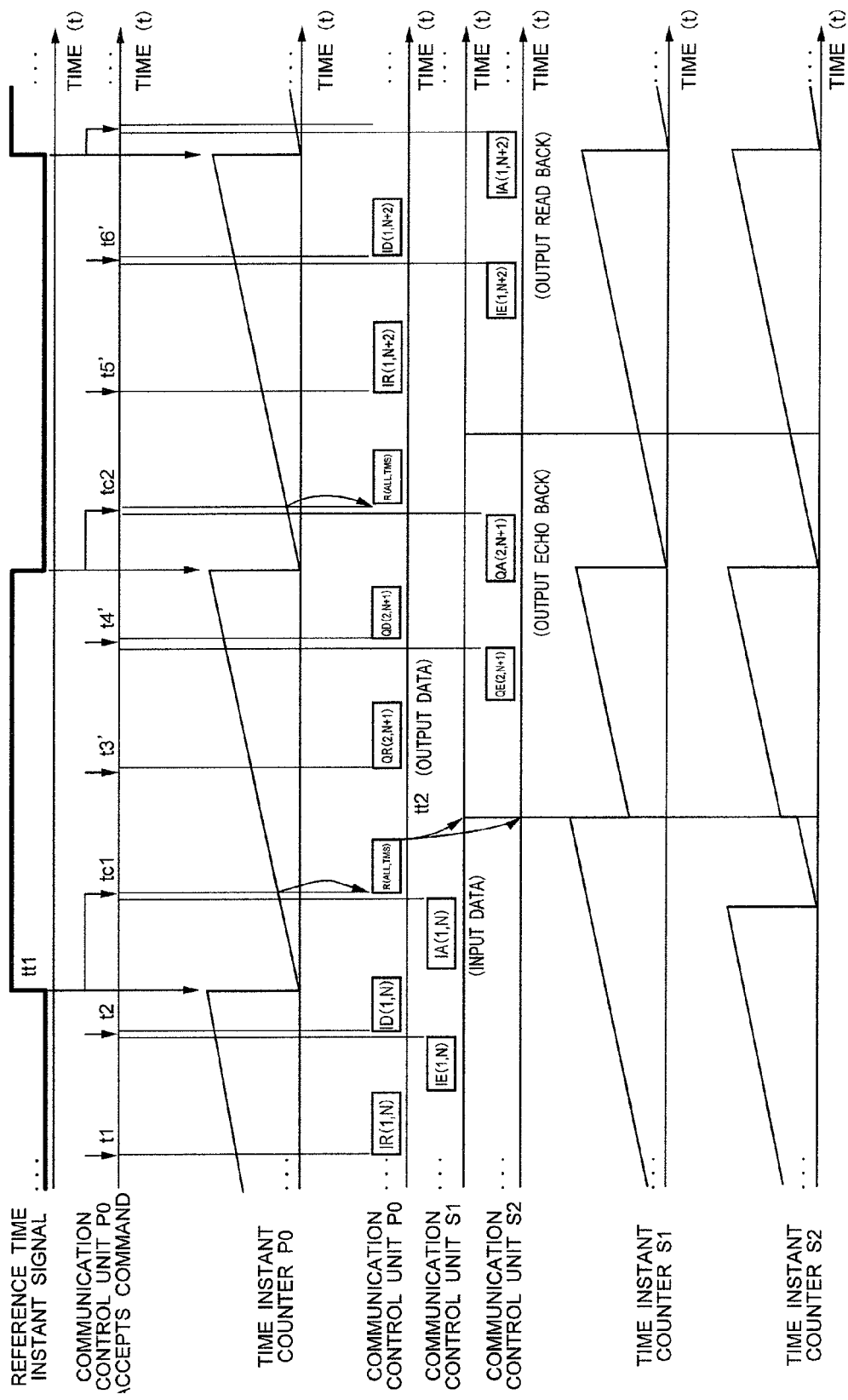
FIG. 27 is a time chart for representing a synchronizing method of time instants according to a sixth embodiment of the present invention.
Figure 28:
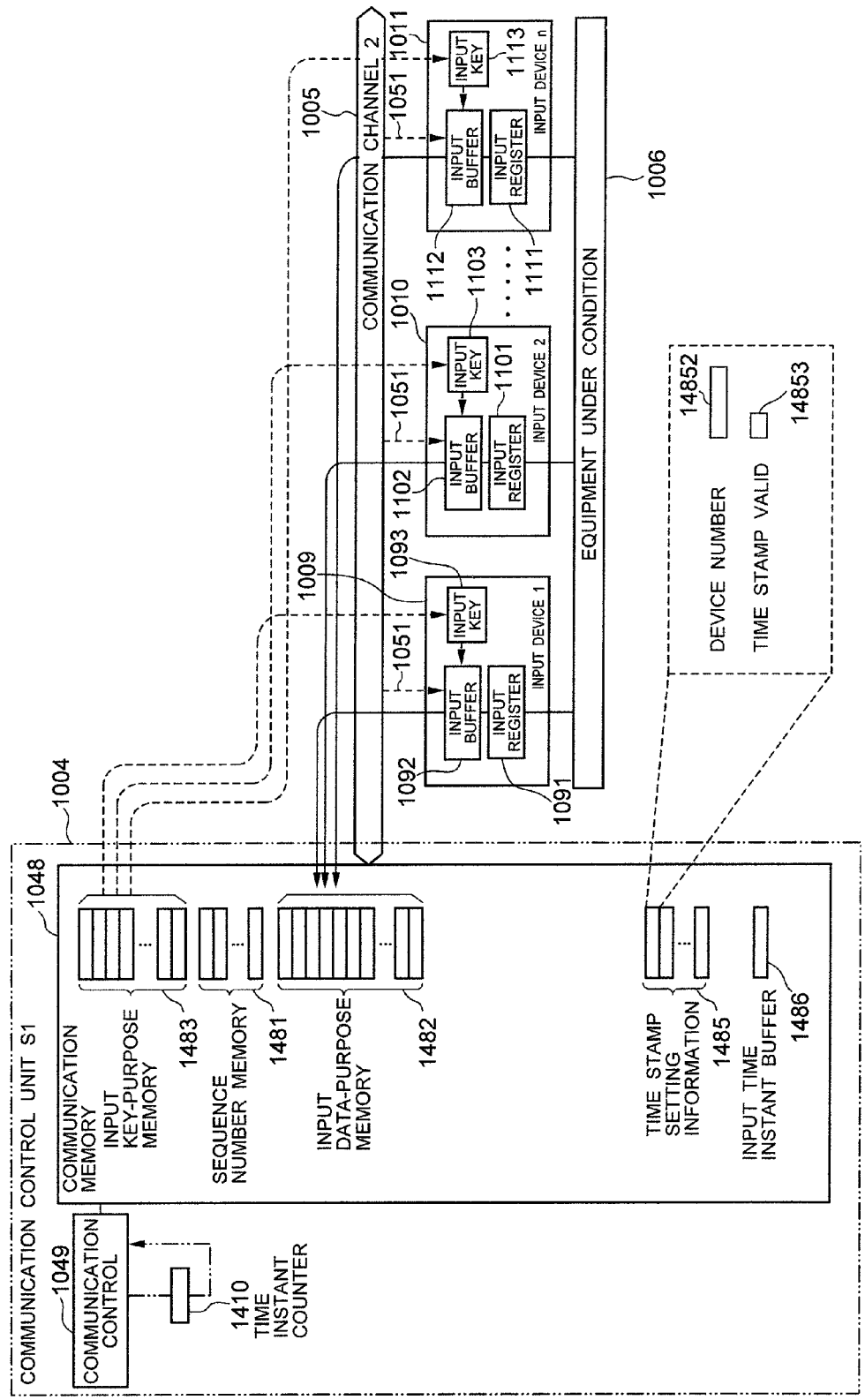
FIG. 28 is a block diagram for showing an arrangement of an input unit according to the sixth embodiment of the present invention.
Figure 29:
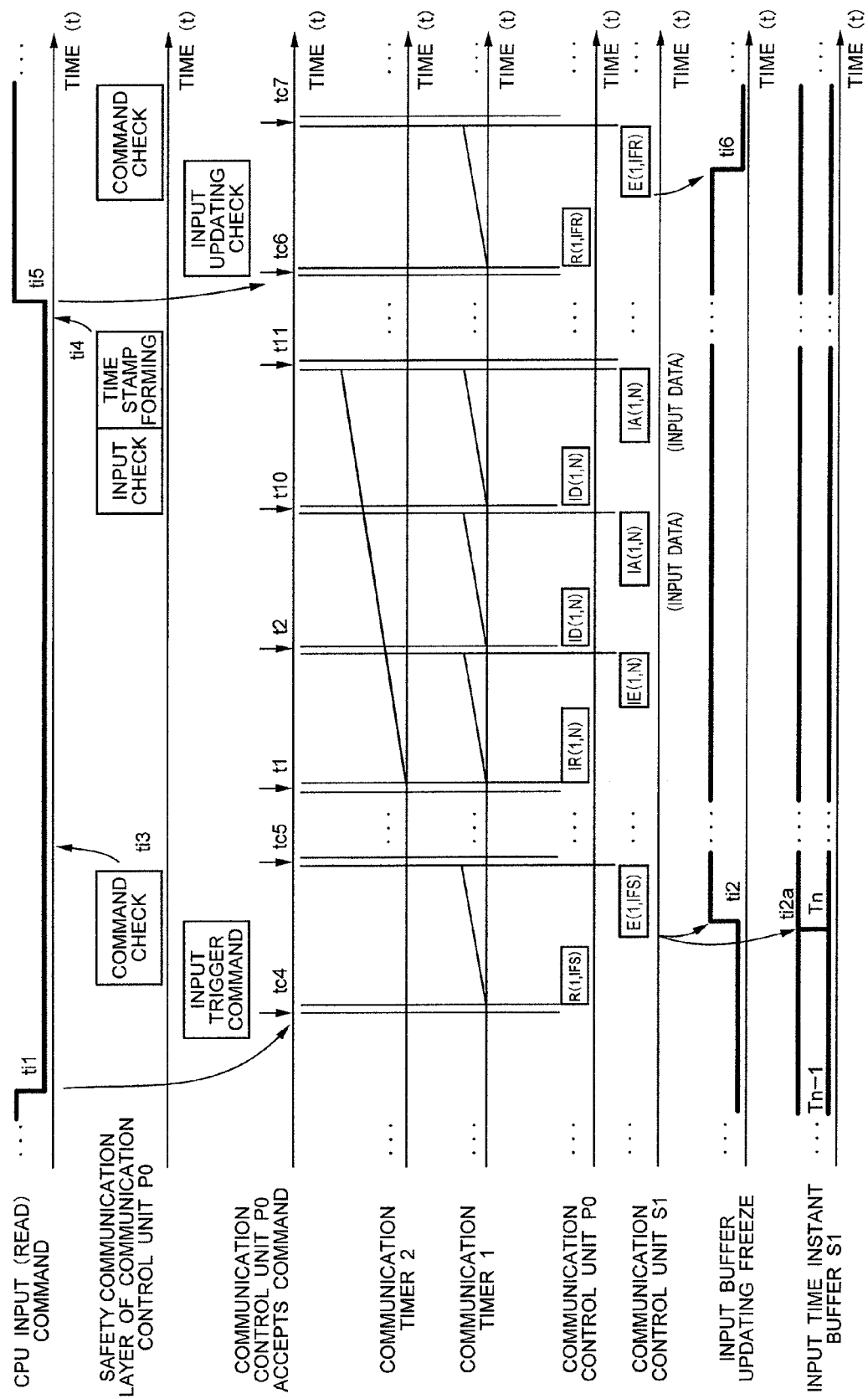
FIG. 29 is a time chart for representing an input operation according to the sixth embodiment of the present invention.

Referring now to FIG. 27, FIG. 28, and FIG. 29, a description is made of a method for capable of realizing that a time stamp is added to input data, according to a sixth embodiment of the present invention.

FIG. 22 indicates an internal arrangement of the communication control unit 1003 (P0). It should be understood that the same reference numerals shown in FIG. 22 will be employed as those for denoting the same, or similar structural elements of FIG. 27 to FIG. 29, and descriptions thereof are omitted. A different structural point of this sixth embodiment according to the present invention from the above-described fifth embodiment is given as follows: That is, an input time instant buffer 1486 is such a buffer which temporarily saves an input time instant received via the control bus 1002 (communication channel 1). Also, an output time instant buffer 1489 is such a buffer which temporarily save an output time instant received via the control bus 1002 (communication channel 1).

FIG. 27 shows a time chart for describing a time instant synchronizing method executed in the communication control unit 1003 (P0), the communication control unit 1004 (S1), and the communication control unit 1007 (S2) via the control bus 1002 (communication channel 1). The communication control unit 1003 (P0) contains a time instant counter 1310; the communication control unit 1004 (S1) contains a time instant counter 1410; and the communication control unit 1007 (S2) contains a time instant counter 1710.

A reference time instant is transmitted/received from the GPS receiver 1015 to the communication control unit 1003 (P0) via a reference time instant signal 1016. The reference time instant signal 1016 corresponds to such a signal whose bit is correctly inverted every 1 second. A time counter 1310 is such a counter which counts up a count value every 1 millisecond. The reference time instant signal 1016 is inputted to the time counter 1310, and is used in order to correct a time instant. When the reference time instant signal 1016 is changed at a time instant "tt1", digits of the time counter 1310, which are smaller than 1 second, are discarded, or rounded off so as to correct a time instant. Every time 1 second has elapsed, the communication counter 1310 requests the communication control circuit 1039 to transmit a time instant synchronization to the control bus 1002 (communication channel 1) one time. At a time instant "tc1" when the communication control circuit 1039 accepts a communication command, the communication control circuit 1039 transmits time instant synchronization "R (ALL, TMS)."

[Expression 47]

$$R(ALL, TMS) = \left( \begin{array}{|c|c|c|c|} \hline \text{Command} & \text{Send Key} & \text{Rcv. Key} & \text{Time} \\ \hline \text{TMS} & \#0 & \text{ALL} & (\text{Time}) \\ \hline \end{array} \right) \quad (47)$$

TMS: Time Synchronize

The time instant synchronization R (ALL, TMS) is constituted by a time instant synchronization command TMS, a send key (SendKey=0), a receive key (Rcv.Key=All), and a time instant (Time). The receive key (Rcv.Key=ALL) indicates that such a key is received by the communication control units 1004 (S1) and 1007 (S7), which are connected to the control bus 1002 (communication channel 1). The time instant (Time) corresponds to a value which is read out from the time counter 1310 at the time instant "tc1."

At a time instant "tt2", both the communication control units 1004 (S1) and 1007 (S2) recognize that an instruction is issued to the own equipments, and set the time instant (Time) to the time counters 1410 and 1710 so as to perform a time instant synchronization. Both the communication control units 1004 (S1) and 1007 (S2) do not echo back the time instant (Time). The communication control unit 1003 (P0) transmits next data.

FIG. 28 shows a communication structure of a peripheral region of the input/output bus 1005 (communication channel 2). It should also be understood that the same reference numerals shown in FIG. 23 will be employed as those for denoting the same structural elements of FIG. 28, and descriptions thereof are omitted. An input time instant buffer 1486 has been added to the structure shown in FIG. 23. Time stamp setting information 1485 is constituted by a device number 14852, and a time stamp validity 14853. Both the device number 14852 and the time stamp validity 14853 are set from the communication control unit 1003 (P0) via the control bus 1002 (communication channel 1) when the control apparatus is initiated.

FIG. 29 indicates operation sequences for permitting/stopping data updating operation with respect to the input buffers 1092, 1102, 1112 (1 to n) via the control bus 1002 (communication channel 1) and the input/output bus 1005 (communication channel 2). Among data strings and symbols of time instants shown in the drawing, the same names imply the same contents as those shown in FIG. 24, and descriptions thereof are omitted.

In order to save such a present time instant when an input freezing operation is commenced in the input device at a time instant "ti2a", the communication control unit 1004 (S1) stores the present time ("Tn") which has been stored in the time instant counter 1410 into the input time instant buffer 1486.

The communication control unit 1004 (S1) transmits input access data IA.

[Expression 48]

$$1A(1, N) = \begin{pmatrix} \text{Com-} & \text{Send} & \text{Rcv.} & \text{Seq.} & \text{Dev.} & \text{Data} & \text{Input} & \\ \text{mand} & \text{Key} & \text{Key} & \text{No.} & \text{Adr.} & \text{Size.} & \text{Device} & \text{Time} \\ \hline 1A & \#1 & \#0 & \#(N) & (DA) & (DS) & (Data) & (Time) \end{pmatrix} \quad (48)$$

If the relevant input device becomes a time stamp validity based upon the device number 14852 and the time stamp validity 14853, then the time instant (Time) is added.

When the communication control unit 1003 (P0) receives the input access data IA, if the relevant input device becomes a time stamp validity based upon the device number 14852 and the time stamp validity 14853, then the time instant (Time) is written in the input time instant buffer 1386 by the communication control unit 1003 (P0). Thereafter, the communication control unit 1003 (P0) forms a time stamp.

With execution of the above-described operation sequence, the central processing unit 1001 (CPU) can establish a relationship between the input data and the time stamp as follows: That is, the input trigger command of the central processing unit 1 (CPU) is transferred via the control bus 1002 (communication channel 1) and the input/output bus 1005 (communication channel 2) to the input unit so as to stop/permit the data updating operation of the input buffers; the communication control unit 1004 (S1) acquires that the event occurs in the input device as the time instant; and then, the communication control unit 1003 (P0) judges that the event occurs via the control bus 1002 (communication channel 2), and writes the time stamp in the time stamp memory 1387.

Seventh Embodiment

Figure 30:
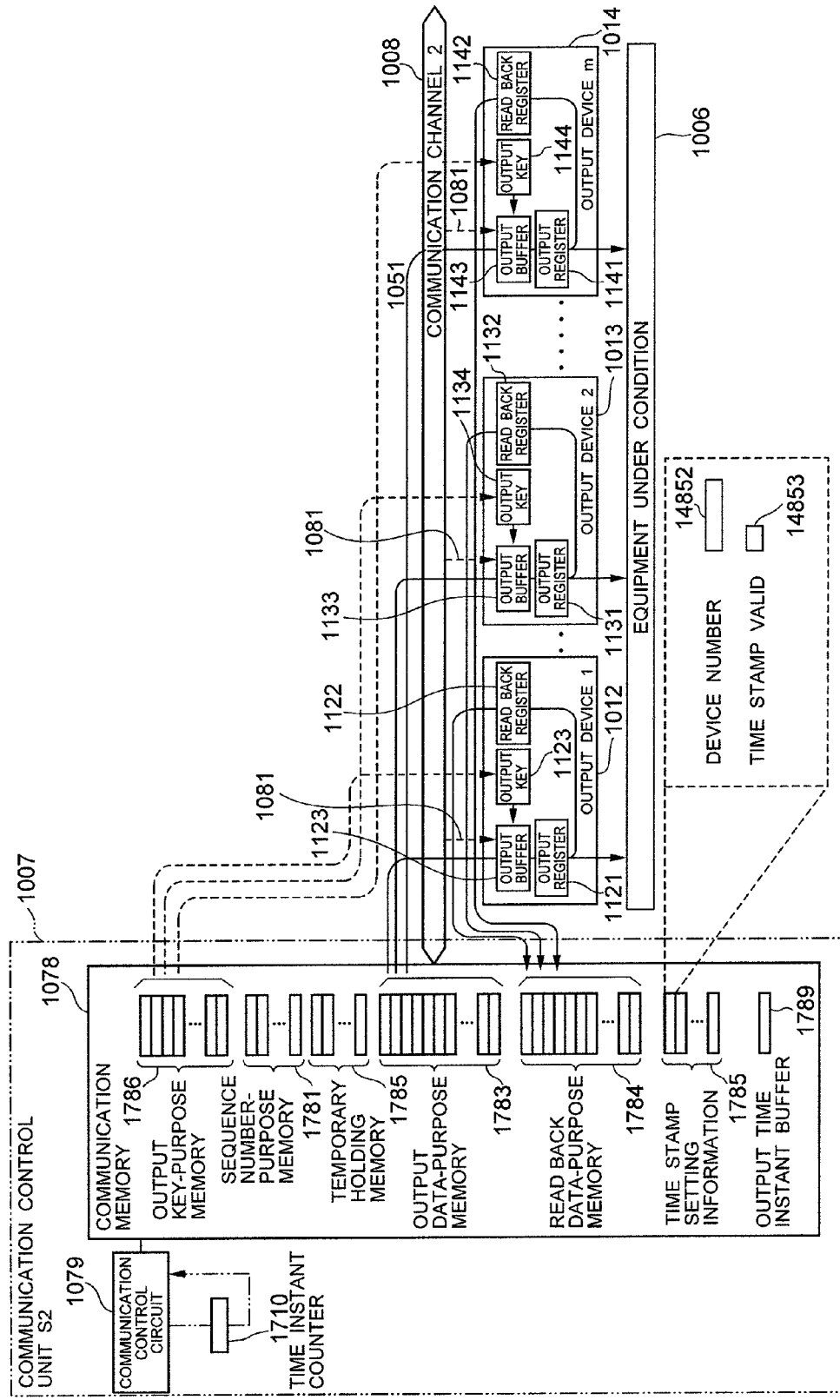
FIG. 30 is a block diagram for indicating an arrangement of an output unit according to a seventh embodiment of the present invention.
Figure 31:
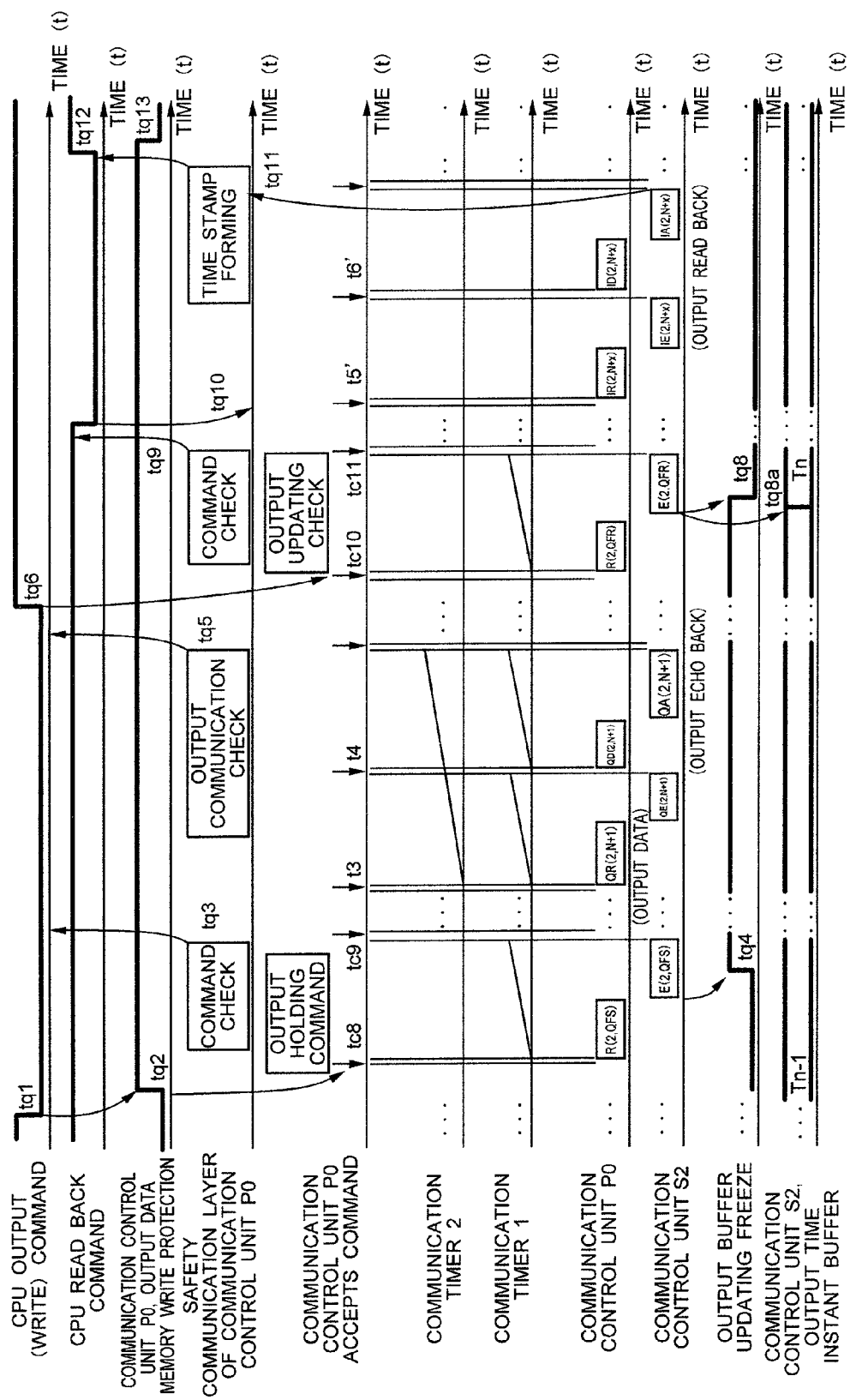
FIG. 31 is a time chart for representing an output operation according to the seventh embodiment of the present invention.

Referring now to FIG. 30 and FIG. 31, a description is made of a method capable of realizing that a time stamp is added to read back data corresponding to output data, according to a seventh embodiment of the present invention.

FIG. 30 shows a communication structure of a peripheral region of the input/output bus 1008 (communication channel 2). It should also be understood that the same reference numerals shown in FIG. 25 will be employed as those for denoting the same structural elements of FIG. 30, and descriptions thereof are omitted. An output time instant buffer 1789 has been added to the structure shown in FIG. 25. Time stamp setting information 1785 is constituted by a device number 17852, and a time stamp validity 17853. Both the device number 17852 and the time stamp validity 17853 are set from the communication control unit 1003 (P0) via the control bus 1002 (communication channel 1) when the control apparatus is initiated.

FIG. 31 indicates operation sequences for permitting/stopping data updating operation with respect to the output buffers 1123, 1133, 1143 (1 to n) via the control bus 1002 (communication channel 1) and the input/output bus 1008 (communication channel 2). Among data strings and symbols of time instants shown in the drawing, the same names imply the same contents as those shown in FIG. 26, and descriptions thereof are omitted.

In order to save such a present time instant when an output updating operation is commenced in the output device at a time instant "fq8a", the communication control unit 1007 (S2) stores the present time ("Tn") which has been stored in the time instant counter 1710 into the output time instant buffer 1789.

The communication control unit 1007 (S2) transmits output read back access data IA.

[Expression 49]

$$1A(2, N + x) = \begin{pmatrix} \text{Com-} & \text{Send} & \text{Rcv.} & \text{Seq.} & \text{Dev.} & \text{Data} & \text{Input} & \\ \text{mand} & \text{Key} & \text{Key} & \text{No.} & \text{Adr.} & \text{Size.} & \text{Device} & \text{Time} \\ \hline 1A & \#2 & \#0 & \#(N+x) & (DA) & (DS) & (Data) & (Time) \end{pmatrix} \quad (48)$$

If the relevant input device becomes a time stamp validity based upon the device number 17852 and the time stamp validity 17853, then the time instant (Time) is added.

When the communication control unit 1003 (P0) receives the output read back access data IA, if the relevant output device becomes a time stamp validity based upon the device number 13852 and the time stamp validity 13853, then the time instant (Time) is written in the output time instant buffer 1389 by the communication control unit 1003 (P0). Thereafter, the communication control unit 1003 (P0) forms a time stamp.

With execution of the above-described operation sequence, the central processing unit 1001 (CPU) can establish a relationship between the output data and the time stamp as follows: That is, the output updating command of the central processing unit 1 (CPU) is transferred via the control bus 1002 (communication channel 1) and the input/output bus 1008 (communication channel 2) to the output unit so as to stop/permit the data updating operation of the output buffers; the communication control unit 1007 (S2) acquires that the event occurs in the output device as the time instant; and then, the communication control unit 1003 (P0) judges that the event occurs via the control bus 1002 (communication channel 2), and writes the time stamp in the time stamp memory 1387.

The fourth, fifth, sixth, and seventh embodiments of the present invention have described such a system that the time stamps are acquired when the designated events occur. Next, a description is made of systems for repeatedly acquiring time stamps without especially designating an event.

Eighth Embodiment

Figure 32:
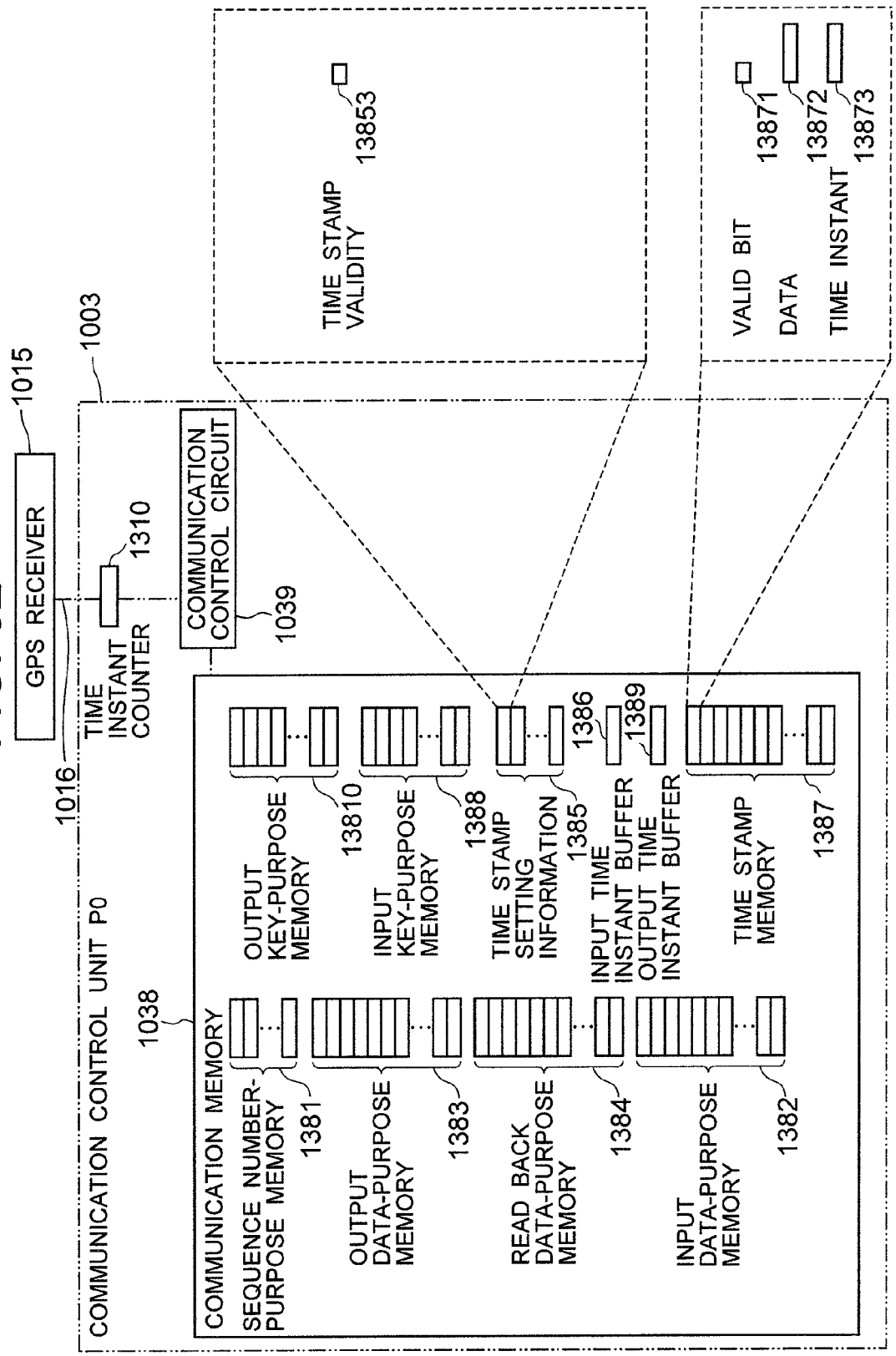
FIG. 32 is a block diagram for showing an arrangement of a communication control unit "P0" according an eighth embodiment of the present invention.

Referring now to FIG. 32, FIG. 23, FIG. 24, a description is made of an eighth embodiment according to the present invention.

A description is made of a different point with respect to the above-described fourth embodiment of the present invention.

FIG. 32 shows an internal arrangement of the communication control unit 1003 (P0). It should be noted that the same reference numerals shown in FIG. 22 will be employed as these for denoting the same structural elements shown in FIG. 32, and thus, explanations thereof are omitted.

Time stamp validities 13853 have been allocated to the time stamp setting information 1385 every input/output devices.

One set of a valid bit 13871, data 13872, and a time instant 13873 has been allocated to a time stamp memory 1387 every input/output devices.

FIG. 23 shows a communication structure of a peripheral region of the input/output bus 1008 (communication channel 2). It should also be understood that the same reference numerals shown in the fourth embodiment of FIG. 23 are employed and descriptions thereof are omitted.

FIG. 24 indicates a time chart for explaining input operations of the eighth embodiment. A different point of this eighth embodiment from the fourth embodiment is a judgement of a time stamp at a time instant "ti4", and a time stamp forming method.

In the time instant "ti4", if the input data comparison is made coincident with each other, when the time stamp validity 13853 becomes valid, then a device time stamp is formed in the time stamp memory 1387 to which the relevant input device has been allocated. A "valid" symbol is written in the valid bit 1371; input data is written in the data 13872; and a value read from the input time buffer 1386 is written in the time instant 13873.

In accordance with the above-described operation sequences, the input trigger command of the central processing unit 1001 (CPU) is transferred via the control bus 1002 (communication channel 1) and the input/output bus 1005 (communication channel 2), stop/permit the data updating operations of the input buffers, and the data inputted in the input device and the time instant are inputted in the time stamp memory 1387, so that the central processing unit 1001 can establish a relationship between the input data and the time stamp.

Ninth Embodiment

Referring now to FIG. 32, FIG. 25, FIG. 26, a description is made of a ninth embodiment according to the present invention.

A description is made of a different point with respect to the above-described fifth embodiment of the present invention.

FIG. 32 shows an internal arrangement of the communication control unit 1003 (P0). It should be noted that the same reference numerals shown in the eighth embodiment of FIG. 32 are the same structural elements of this ninth embodiment, and thus, explanations thereof are omitted.

FIG. 25 shows a communication structure of a peripheral region of the input/output bus 1008 (communication channel 2). It should also be understood that the same reference numerals shown in the fifth embodiment of FIG. 23 are employed, and descriptions thereof are omitted.

FIG. 26 indicates a time chart for explaining output operations of the ninth embodiment. A different point of this ninth embodiment from the fifth embodiment is a judgement of a time stamp at a time instant "tq11", and a time stamp forming method.

Both the time stamp judging operation and the time stamp forming operation of this ninth embodiment are identical to those of the eighth embodiment.

In accordance with the above-described operation sequences, the output updating command of the central processing unit 1001 (CPU) is transferred via the control bus 1002 (communication channel 1) and the input/output bus 1005 (communication channel 2), stop/permit the output data updating operations of the output buffers, and the time instant and the data (read back) outputted in the output device are inputted in the time stamp memory 1387, so that the central processing unit 1001 (CPU) can establish a relationship between the output data and the time stamp.

Tenth Embodiment

Figure 33:
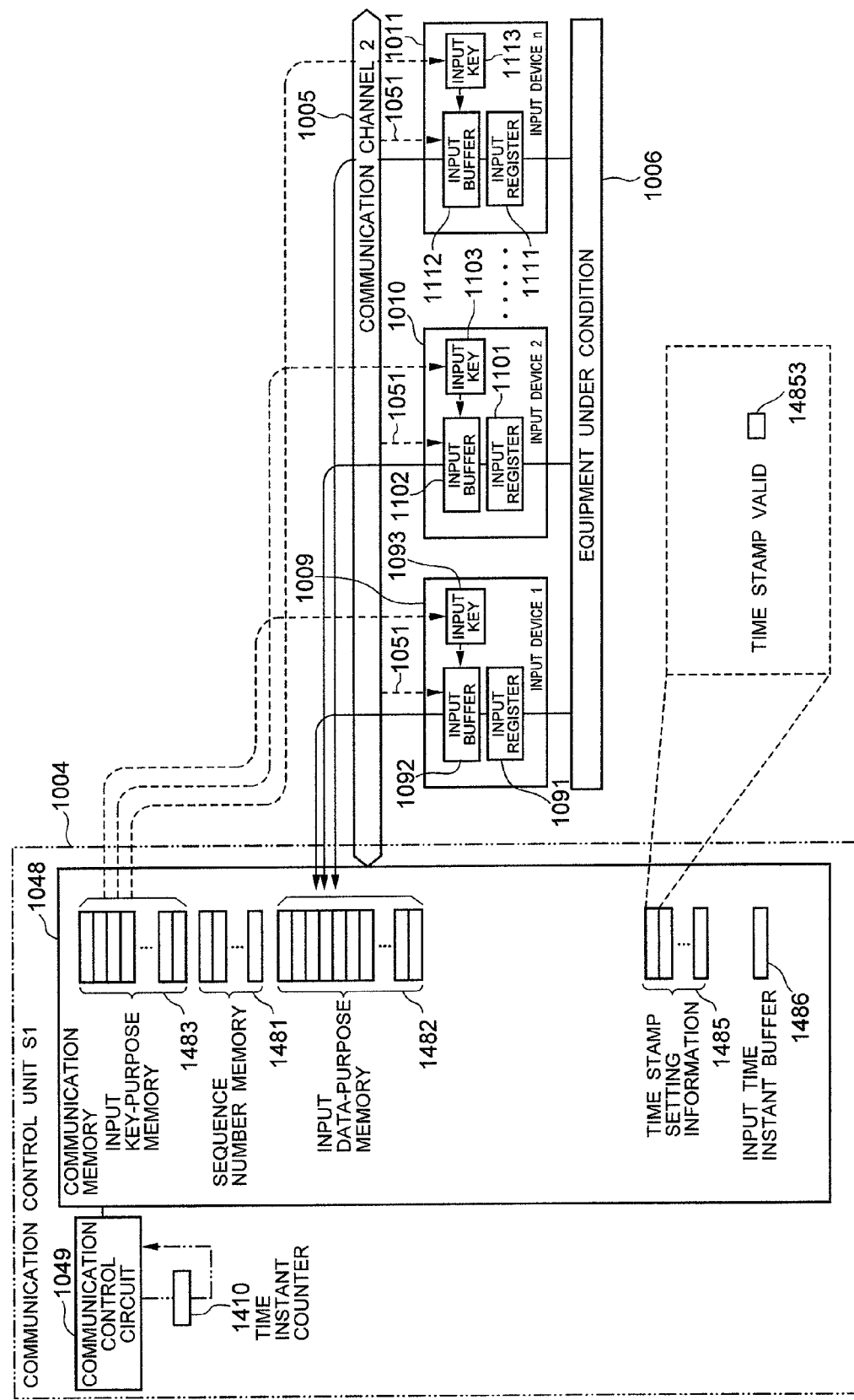
FIG. 33 is a block diagram for indicating an input/output bus (communication channel 2), and a data path of an input unit of a tenth embodiment of the present invention.

Referring now to FIG. 32, FIG. 33, FIG. 24, a description is made of a tenth embodiment according to the present invention.

A description is made of a different point with respect to the above-described sixth embodiment of the present invention.

FIG. 32 indicates an internal arrangement of the communication control unit 1003 (P0). It should be noted that the same reference numerals of the eighth embodiment shown in FIG. 32 are employed, and thus, explanations thereof are omitted.

FIG. 33 shows a communication structure of a peripheral region of the input/output bus 1008 (communication channel 2). The time stamp setting information 1485 of this tenth embodiment is different from that of FIG. 28. The time stamp setting information 1485 is constituted by the time stamp validity 14853.

FIG. 29 indicates a time chart for explaining input operations of the tenth embodiment. A different point of this tenth embodiment from the sixth embodiment is a judgement of a time stamp at a time instant "ti4", and a time stamp forming method.

Both the time stamp judging operation and the time stamp forming operation of this tenth embodiment are identical to those of the eighth embodiment.

In accordance with the above-described operation sequences, the input trigger command of the central processing unit 1001 (CPU) is transferred via the control bus 1002 (communication channel 1) and the input/output bus 1005 (communication channel 2), stop/permit the data updating operations of the input buffers, and the data and the time instant entered in the input device are inputted in the time stamp memory 1387, so that the central processing unit 1001 (CPU) can establish a relationship between the input data and the time stamp.

Eleventh Embodiment

Figure 34:
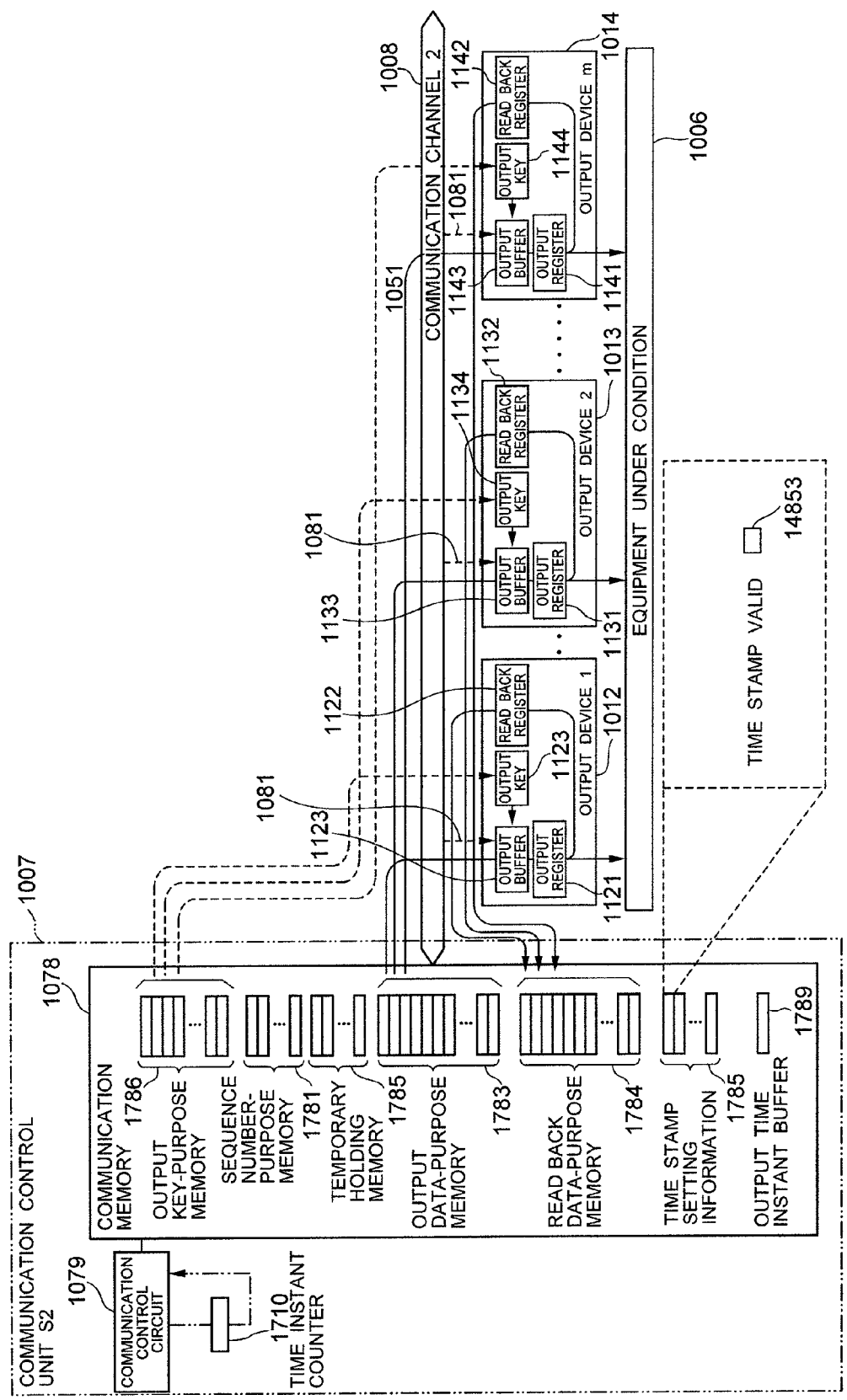
FIG. 34 is a block diagram for representing the input/output bus (communication channel 2), and a data path of an output unit of an eleventh embodiment of the present invention.

Referring now to FIG. 32, FIG. 34, and FIG. 31, a description is made of an eleventh embodiment according to the present invention.

A description is made of a different point with respect to the above-described seventh embodiment of the present invention.

FIG. 32 indicates an internal arrangement of the communication control unit 1003 (P0). It should be noted that the same reference numerals of the eighth embodiment shown in FIG. 32 are employed, and thus, explanations thereof are omitted.

FIG. 34 shows a communication structure of a peripheral region of the input/output bus 1008 (communication channel 2). The time stamp setting information 1485 of this eleventh embodiment is different from that of FIG. 28. The time stamp setting information 1485 is constituted by the time stamp validity 14853.

FIG. 31 indicates a time chart for explaining output operations of the eleventh embodiment. A different point of this eleventh embodiment from the seventh embodiment is a judgement of a time stamp at a time instant "tq11", and a time stamp forming method.

Both the time stamp judging operation and the time stamp forming operation of this eleventh embodiment are identical to those of the eighth embodiment.

In accordance with the above-described operation sequences, the output updating command of the central processing unit 1001 (CPU) is transferred via the control bus 1002 (communication channel 1) and the input/output bus 1005 (communication channel 2), stop/permit the output data updating operations of the output buffers, and the time instant and the data (read back) outputted in the output device are inputted in the time stamp memory 1387, so that the central processing unit 1001 (CPU) can establish a relationship between the output data and the time stamp.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus having a communication control unit communicatably connected to a first communication channel, at least a portion of which constitutes a serial transfer operation, in which said communication control unit at least one of transmits and receives information with respect to an equipment under control via a second communication channel, a portion of which constitutes a parallel transfer operation, said control apparatus comprising:

a communication channel diagnostic unit for diagnosing an abnormal event including an open and stuck-at of a parallel transfer portion of said second communication channel under such a condition that a data transfer operation in the second communication channel is interrupted;

wherein a signal for instructing an initiation of a diagnosis via said first communication channel is transmitted to said communication channel diagnostic unit;

wherein said control apparatus is further comprised of an intermediary station;

wherein at least any one of data transmitted from the communication control unit via said first communication channel being transmitted via said intermediary station to said equipment under control, and data sent from the equipment under control being transmitted via the intermediary station from the communication control unit to the first communication channel is available; and wherein said diagnosis corresponds to at least any one of the parallel transfer path between the communication control unit and the intermediary station, and the parallel transfer path between the intermediary station and said equipment under control.

2. A control apparatus having a communication control unit communicatably connected to a first communication channel, at least a portion of which constitutes a serial transfer operation, in which said communication control unit at least one of transmits and receives information with respect to an equipment under control via a second communication channel, a portion of which constitutes a parallel transfer operation, said control apparatus comprising:

a communication channel diagnostic unit for diagnosing an abnormal event including an open and stuck-at of a parallel transfer portion of said second communication channel under such a condition that a data transfer operation in the second communication channel is interrupted;

wherein a signal for instructing an initiation of a diagnosis via said first communication channel is transmitted to said communication channel diagnostic unit;

wherein said communication control unit receives the diagnosis instruction via said first communication channel so as to initiate said diagnosis; and wherein said communication control unit returns a message via said first communication channel with respect to the diagnosis instruction received via said first communication channel, and initiate said diagnosis.

3. The control apparatus as claimed in claim 2, wherein said communication control unit interrupts the data transmission and/or reception between the central processing unit and the equipment under control via said first communication channel, initiates said diagnosis, and restarts said data transmission and/or reception after said diagnosis is accomplished.

4. A control apparatus, comprising:

a communication control unit, communicatably connected to a first communication channel and second communication channel, configured to conduct a transfer operation through the first communication channel during which said communication control unit at least one of transmits and receives information with respect to an equipment under control via the second communication channel, and also configured to conduct a transfer operation through the second communication channel; and a communication channel diagnostic unit, configured to diagnose an abnormal event, including either of an open or a stuck-at parallel transfer operation through said second communication channel, when a data transfer operation in the second communication channel is interrupted;

wherein upon said communication channel diagnostic unit receiving an instruction, transmitted via said first communication channel, to initiate a diagnosis of an abnormal event in said second communication channel, said communication control unit is configured to return a message via said first communication channel that the diagnosis instruction has been received via said first communication channel, and to initiate said diagnosis.

5. The control apparatus as claimed in claim 4, wherein said communication control unit is configured to interrupt the data transmission and/or reception between the central processing unit and the equipment under control via said first communication channel, to initiate said diagnosis, and to restart said data transmission and/or reception after said diagnosis is accomplished.

* * * * *